United States Patent
Mancuso et al.

(10) Patent No.: US 12,367,051 B2
(45) Date of Patent: Jul. 22, 2025

(54) STORING AND RESTORING DESKTOP APPLICATION SCENES

(71) Applicant: Dropbox, Inc., San Francisco, CA (US)

(72) Inventors: Devin Mancuso, San Francisco, CA (US); Benjamin Joseph Calabrese, Portland, OR (US); Austin Sung, San Francisco, CA (US); Jason Stakelon, Sausalito, CA (US); Bonita Leung, Brooklyn, NY (US)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 18/612,262

(22) Filed: Mar. 21, 2024

(65) Prior Publication Data
US 2024/0231857 A1    Jul. 11, 2024

Related U.S. Application Data

(63) Continuation of application No. 18/068,186, filed on Dec. 19, 2022, now Pat. No. 11,960,911.

(51) Int. Cl.
*G06F 9/451* (2018.01)
*G06F 3/0481* (2022.01)
(Continued)

(52) U.S. Cl.
CPC ............ *G06F 9/451* (2018.02); *G06F 3/0481* (2013.01); *G06F 3/0484* (2013.01);
(Continued)

(58) Field of Classification Search
CPC ...... G06F 9/451; G06F 3/0481; G06F 3/0484; G06F 11/1469; G06F 2201/805; G06F 2203/04803
See application file for complete search history.

(56) References Cited

U.S. PATENT DOCUMENTS 5,694,561 A * 12/1997 Malamud ................ G06F 9/451
  715/805
7,386,801 B1 * 6/2008 Horvitz ................ G06F 3/0481
  715/767
(Continued)

FOREIGN PATENT DOCUMENTS

CN     104915268 A    9/2015
WO    2015106353 A1    7/2015
(Continued)

OTHER PUBLICATIONS

Notice of Allowance from U.S. Appl. No. 18/068,132, mailed Mar. 27, 2024, 8 pages.
(Continued)

*Primary Examiner* — Daniel Samwel
(74) *Attorney, Agent, or Firm* — Keller Preece PLLC

(57) ABSTRACT

The present disclosure is directed toward systems, methods, and non-transitory computer readable media for generating content clusters from topic data and focus data, generating content collections from content clusters, storing and restoring desktop scene layouts, and storing and arranging video call scenes. In some embodiments, the disclosed systems generate content clusters based on topic data and focus data associated with content items within a content management system and/or accessed via the internet. The disclosed systems can also generate content collections for a user account of the content management system from the content clusters. In some embodiments, the content scene system can further store and restore desktop scene layouts for arranging application windows presenting content items. Further, the disclosed systems can store and arrange particular desktop scene layouts for video call scenes.

20 Claims, 34 Drawing Sheets

(51) Int. Cl.
*G06F 3/0484* (2022.01)
*G06F 11/14* (2006.01)

(52) U.S. Cl.
CPC .... *G06F 11/1469* (2013.01); *G06F 2201/805* (2013.01); *G06F 2203/04803* (2013.01)

(56) References Cited

U.S. PATENT DOCUMENTS

| | | | |
|---|---|---|---|
| 7,698,335 | B1 | 4/2010 | Vronay |
| 8,468,244 | B2 | 6/2013 | Redlich et al. |
| 9,058,408 | B2 | 6/2015 | Hoffman et al. |
| 9,703,895 | B2 | 7/2017 | Wang et al. |
| 10,133,461 | B1* | 11/2018 | Roberts ............... H04M 3/5191 |
| 11,030,257 | B2 | 6/2021 | Dahl et al. |
| 11,126,647 | B2 | 9/2021 | Rollings et al. |
| 2004/0066414 | A1* | 4/2004 | Czerwinski ........... G06F 3/0481 715/781 |
| 2004/0093321 | A1 | 5/2004 | Roustant et al. |
| 2004/0153973 | A1 | 8/2004 | Horwitz |
| 2005/0097506 | A1 | 5/2005 | Heumesser |
| 2005/0203885 | A1 | 9/2005 | Chenevich et al. |
| 2005/0216918 | A1* | 9/2005 | Kuraishi ................ G06F 9/451 719/316 |
| 2006/0224991 | A1* | 10/2006 | Stabb ..................... G06F 9/451 715/781 |
| 2007/0094060 | A1 | 4/2007 | Apps et al. |
| 2008/0005693 | A1* | 1/2008 | Oliver ................ G06F 3/04845 715/802 |
| 2008/0155455 | A1 | 6/2008 | Balasubramanian |
| 2013/0297677 | A1 | 11/2013 | Wan et al. |
| 2014/0075004 | A1 | 3/2014 | Van Dusen et al. |
| 2014/0282217 | A1* | 9/2014 | Musa ................... G06F 3/0481 715/781 |
| 2014/0380201 | A1 | 12/2014 | Massand |
| 2015/0234558 | A1 | 8/2015 | Ichikawa et al. |
| 2016/0103793 | A1 | 4/2016 | Fang et al. |
| 2017/0161357 | A1 | 6/2017 | Bao et al. |
| 2018/0061259 | A1 | 3/2018 | Ng et al. |
| 2018/0188910 | A1 | 7/2018 | Ko et al. |
| 2019/0278627 | A1 | 9/2019 | Kapinos et al. |
| 2020/0028753 | A1 | 1/2020 | Powar et al. |
| 2020/0380051 | A1 | 12/2020 | Sadahiro et al. |
| 2021/0151056 | A1 | 5/2021 | Trim et al. |
| 2022/0269378 | A1 | 8/2022 | Joseph |
| 2022/0366131 | A1 | 11/2022 | Ekron |
| 2022/0382427 | A1 | 12/2022 | Zhang |
| 2023/0047383 | A1 | 2/2023 | Yushkina et al. |
| 2024/0346087 | A1 | 10/2024 | Quigley et al. |
| 2024/0428306 | A1 | 12/2024 | Sliwka et al. |

FOREIGN PATENT DOCUMENTS

| | | |
|---|---|---|
| WO | 2015144054 A1 | 10/2015 |
| WO | 2020063780 A1 | 4/2020 |

OTHER PUBLICATIONS

Invitation to Pay Additional Fees for International Application No. PCT/US2023/074499 mailed Dec. 21, 2023, 9 pages.

Kurniawan C., et al., "Clustering of Fine Art-Images as Digital Learning Content using Data Mining-Image Analysis Techniques," 2nd International Conference on Information Technology and Education (ICIT&E), 2012, pp. 37-42.

Lossio Ventura J.A., et al., "Evaluation of Clustering and Topic Modeling Methods Over Health-Related Tweets and Emails," Artif. Intell. Med., vol. 117, Jul. 2021, 50 pages.

Ma C., et al, "Visualizing and Analyzing Video Content With Interactive Scalable Maps," Oct. 20, 2016, IEEE Transactions on Multimedia, vol. 18, No. 11, pp. 2171-2183.

Non-Final Office Action from U.S. Appl. No. 18/068,132, mailed Dec. 22, 2023, 9 pages.

Non-Final Office Action from U.S. Appl. No. 18/068,186, mailed Jun. 6, 2023, 16 pages.

Notice of allowance from U.S. Appl. No. 18/068,186, mailed Dec. 26, 2023, 6 pages.

Notice of Allowance from U.S. Appl. No. 18/068,186, mailed Mar. 13, 2024, 2 pages.

Notice of Allowance from U.S. Appl. No. 18/068,198, mailed Feb. 8, 2024, 02 pages.

Notice of Allowance from U.S. Appl. No. 18/068,198, mailed Nov. 14, 2023, 10 pages.

Yu R., et al., "Layout-induced Video Representation for Recognizing Agent-in-Place Actions," Oct. 1, 2019, IEEE/CVF international Conference on Computer Vision, pp. 1262-1272.

Non-Final Office Action from U.S. Appl. No. 18/680,964, mailed Jan. 13, 2025, 22 pages.

Non-Final Office Action from U.S. Appl. No. 18/068,161, mailed Dec. 10, 2024, 17 pages.

Final Office Action from U.S. Appl. No. 18/068,161 mailed on Mar. 20, 2025, 17 pages.

Final Office Action from U.S. Appl. No. 18/680,964 mailed on Mar. 25, 2025, 17 pages.

* cited by examiner

STORING AND RESTORING DESKTOP APPLICATION SCENES

CROSS-REFERENCE TO RELATED APPLICATIONS

The present application is a continuation of U.S. application Ser. No. 18/068,186, filed on Dec. 19, 2022. The aforementioned application is hereby incorporated by reference in its entirety.

BACKGROUND

Advancements in computing devices and networking technology have given rise to a variety of innovations in cloud-based digital content storage and access. For example, online digital content systems can provide access to digital content items across devices all over the world. Existing systems can also synchronize changes to shared digital content across different types of devices operating on different platforms. Indeed, modern online digital content systems can provide access to digital content for users to collaborate across diverse physical locations and over a variety of computing devices. Despite these advances, however, existing digital content systems continue to suffer from a number of disadvantages, particularly in terms of accuracy and efficiency.

As just suggested, some existing digital content systems are inaccurate. In particular, many existing systems inaccurately group content items according to factors such as file type and access time, without considering other contextual factors. Indeed, due to the limited clustering capabilities of many existing systems, these systems are often simplistic in their determinations of clusters of content items. As a result of their inaccurate clustering, these existing systems also frequently generate content collections from clusters that include content items that do not belong together. Specifically, existing systems often generate content collections based on rudimentary clustering by title and/or access time, but these abecedarian collections provide no insight into particular themes or cohesive user activity patterns, much less provide insight for future application sessions.

Due at least in part to their inaccuracies in generating content collections, many existing digital content systems are also inefficient. To elaborate, because of their inaccurate grouping of content items, some existing systems require excessive numbers of user interactions to relocate misplaced content items (e.g., to add and/or remove content items within a collection). In addition, some existing systems provide inefficient user interfaces that require accessing grouped content items individually, opening each via a separate device interaction. Not only do existing systems require accessing content items through independent interactions, but these systems also often require locating and resizing application windows for presenting content items on an individual basis as well to place and size each window one by one. Processing the excessive numbers of user interactions involved in existing systems (e.g., in generating content groupings, accessing content items, and placing/sizing application windows) consumes computing resources such as processing power and memory that could otherwise be preserved with more efficient systems and/or user interfaces.

Thus, there are several disadvantages with regard to existing digital content systems.

SUMMARY

This disclosure describes one or more embodiments of systems, methods, and non-transitory computer readable storage media that provide benefits and/or solve one or more of the foregoing and other problems in the art. For instance, the disclosed systems provide a new method for generating clusters of digital content items based on topic data and focus data associated with digital content items within a content management system. In some embodiments, the disclosed systems determine topic data and focus data for content items to synthesize topic-based focus patterns of user activity while accessing various content items. From the topic data and the focus data, the disclosed systems can utilize a content cluster machine learning model (or a heuristic model) to group digital content items together into content clusters. In some cases, the disclosed systems generate content clusters by defining separate topic-based sessions where user activity indicates access of content items pertaining to respective topics or themes. In addition, the disclosed systems can generate and provide a user interface element for restoring an application session (e.g., a cluster of content items centered around a common topic) in a single click by accessing each of the content items within a corresponding content cluster and presenting them in respective tabs (or windows).

The disclosed systems also provide a new method for generating or creating a content collection from a digital content cluster. For example, the disclosed systems generate suggested content collections for a user account of a content management system by identifying content items from one or more content clusters (e.g., clustered by topic and focus) that are relevant or germane to the user account. In addition to suggesting content collections, the disclosed systems can provide and surface a collection creation element selectable to create and store a new content collection from a suggested collection. The disclosed systems can surface the collection creation element in a variety of user interfaces for fast, efficient generation of a content collection.

In addition, the disclosed systems can store and restore desktop application scenes. For instance, the disclosed systems can determine a desktop scene layout that indicates an arrangement (e.g., locations and dimensions) of application windows presented on a display of a client device. The disclosed systems can also provide a selectable option to save or store a desktop scene layout and a selectable option to restore a saved or stored desktop scene layout. Based on an indication to restore a desktop scene layout, the disclosed systems can automatically open and arrange application windows according to the stored desktop scene layout (e.g., to resume a previous application session).

Further, the disclosed systems can store and arrange desktop scene layouts for specific situations, such as for video call scene layouts. For example, the disclosed systems can detect a video call (e.g., an upcoming or scheduled video call) for a user account of a content management system. Based on detecting the video call, the disclosed systems can determine a video call scene that indicates an arrangement (e.g., locations and dimensions) of application windows specifically for the video call. The disclosed systems can set or stage the application windows for the video call and can also store video call scene layouts for later arrangement. Additionally, the disclosed systems can restore a desktop scene layout after a video call by arranging or configuring application windows to how they were presented before the video call.

BRIEF DESCRIPTION OF THE DRAWINGS

This disclosure will describe one or more example implementations of the systems and methods with additional specificity and detail by referencing the accompanying figures. The following paragraphs briefly describe those figures, in which.

DETAILED DESCRIPTION

Figure 1:
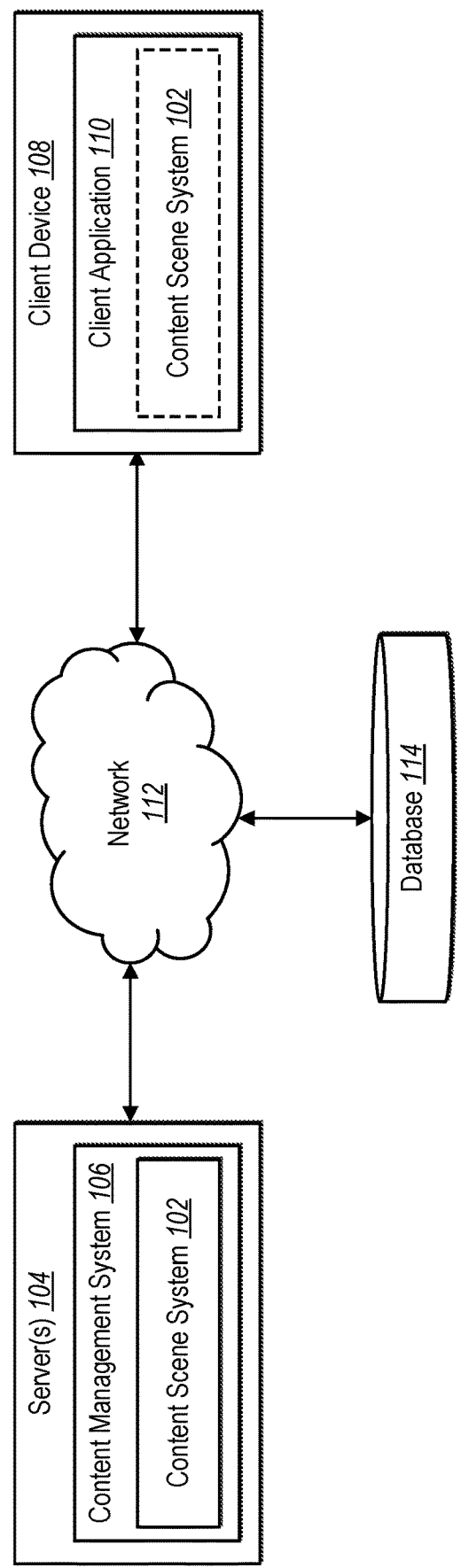
FIG. 1 illustrates a schematic diagram of an example environment of a content scene system in accordance with one or more embodiments.

This disclosure describes one or more embodiments of a content scene system that can utilize advanced content analysis and application window management techniques to generate content clusters, create content collections from content clusters, store and restore desktop application scenes, and/or store and arrange application windows for video call scenes. While this disclosure separates the discussion into overarching topics according to various functions or capabilities of the content scene system, the content scene system can also combine functions from each (or a subset) of the topical discussions. The following paragraphs provide an overview or an introduction to each of the following concepts in order: i) generating content clusters, ii) generating content collections from content clusters, iii) storing and restoring desktop scene layouts, and iv) storing and arranging video call scenes. Thereafter, additional detail regarding each of the main topics is provided in relation to the figures.

Introduction to Generating Content Clusters

To generate content clusters, the content scene system can analyze digital content items associated with a user account (e.g., within a cloud-based content management system) to determine topic data. For example, the content scene system can determine topic data that indicates topics or themes associated with digital content items, such as websites that are about learning to play the piano or digital images that depict tropical island scenery. Additionally, the content scene system can track or monitor user account activity to determine focus data for digital content items. For instance, the content scene system can determine focus data that indicates topic-specific activity patterns as a user navigates between webpages, digital documents, images, and other digital content items (e.g., within a content management system or elsewhere on the internet) over time.

Based on the topic data and the focus data, the content scene system can generate content clusters by grouping digital content items according to respective topic-specific activity patterns. For instance, the content scene system can generate content clusters that represent application sessions, where an application session indicates a set of content items that a user account accessed (e.g., viewed or clicked) as part of a particular focus period or activity pattern. In some cases, the content scene system can utilize one or more models (e.g., a content cluster machine learning model) to cluster content items based on topic data and focus data (or based on extrapolated topic-specific activity patterns).

From the content clusters, the content scene system can further generate and provide a content restore element representing a content cluster, where the content restore element is selectable to restore presentation of the content items within the cluster. To elaborate, the content scene system can receive an indication of a user interaction selecting the content restore element and, in response to the user interaction, the content scene system can access and present the each of the content items within the cluster (e.g., within respective tabs of a web browser). Thus, from a single user interaction, the content scene system can access and provide multiple digital content items from various storage locations within the content management system or elsewhere on the internet to restore a previous topic-specific application session (e.g., so a user account can pick up where they left off during a previous application session).

To illustrate by way of an example, the content scene system can generate a content cluster based on user account activity over a particular time period (or one or more application sessions) visiting a number of websites regarding, and taking notes in a digital notetaking application about, learning to play the piano. Based on generating the content cluster to include content items relating to learning to play the piano, the content scene system can further detect a new application session or a new tab of a browser and can present a selectable content restore element indicating the clustered content items (e.g., to re-access the previously accessing content items regarding the piano). Based on a user interaction selecting the content restore element, the content scene system can access each of the clustered content items and open each in its own tab (and/or separate application window).

Introduction to Generating Content Collections from Content Clusters

As mentioned above, in certain embodiments, the content scene system generates content collections from content clusters. In particular, the content scene system can generate content clusters according to topic-specific activity patterns, as indicated above, and can identify relevant content items from one or more content clusters to include within suggested content collections. More specifically, the content scene system can identify content items (e.g., web content items) that are relevant to a user account by determining and comparing relevance scores associated with clustered content items. In some cases, the content scene system determines relevance scores based on factors such as recency, frequency, and overall volume of user account activity pertaining to content items (e.g., clicks, scrolls, views, shares, comments, and receipts) from a user account's activity history (e.g., web activity history). From the relevance scores, the content scene system can select a set of (web) content items to include within a suggested content collections to provide to the user account.

In certain embodiments, the content scene system determines relevance scores in the form of return visit likelihood scores. To elaborate, based on activity patterns relating to certain topics and/or to individual content items, the content scene system can generate predictions of probabilities or likelihoods that a user account will re-access a content item. In some cases, the content scene system generates a return visit likelihood score to indicate a likelihood of a return visit at any future time, while in other cases, the content scene system generates return visit likelihood scores with more specificity to indicate likelihoods of return visits within a threshold timeframe and/or within the same (or within a particular number of subsequent) application session(s). Based on the return visit likelihood scores, the content scene system can generate a suggested content collection (e.g., to include a number of highest-ranked content items or a number of content items that satisfy a threshold relevance score/return visit likelihood score).

In one or more embodiments, the content scene system provides a collection creation element for display on a client device associated with a user account, where the collection creation element is selectable to create a new content collection for the user account from a suggested content collection. For instance, based on receiving an indication of a user interaction selecting the collection creation element, the content scene system creates a new content collection specific to the user account within the content management system and includes links or references to the content items within the suggested content collection as part of the newly created content collection. Thus, the content scene system can solve the cold start problem of generating a topic-specific content collection for a user account by: i) automatically determining a topic for a content collection based on topics associated with content items focused on by the user account; and ii) seeding the collection with auto-recommended content items from a user account's activity history.

Introduction to Storing and Restoring Desktop Scene Layouts

As also mentioned above, the content scene system can store and restore desktop scene layouts. More particularly, the content scene system can determine a desktop scene layout that indicates an arrangement (e.g., locations and/or dimensions) of application windows presented, depicted, or displayed on a client device. To store a desktop scene layout, the content scene system can provide a scene store interface for display on the client device whereby a user account can select which application windows (and their arrangements) to store as part of a desktop scene layout. In some cases, the content scene system can also determine or identify digital content presented within the application windows, along with arrangements (e.g., locations and dimensions) of the presented digital content.

In addition to storing a desktop scene layout, the content scene system can also restore a desktop scene layout. For example, the content scene system can receive a request to restore a stored desktop scene layout (e.g., to resume working within previously open application windows), whereupon the content scene system can open and arrange application windows according to the stored desktop scene layout. Specifically, the content scene system can place and size each of the application windows according to their respective locations and sizes stored as part of the desktop scene layout. In some cases, the content scene system can also restore digital content presented within the respective application windows to arrange the digital content according to locations and dimensions indicated by the stored desktop scene layout.

In some embodiments, the content scene system determines desktop content clusters. To elaborate, the content scene system can determine a desktop content cluster by grouping digital content items into clusters as indicated above and by further identifying clustered content items that are accessed or presented via one or more application windows within a desktop scene of a client device. For example, the content scene system can identify application windows presenting content corresponding to the topic of learning to play the piano. In addition, the content scene system can store a desktop cluster scene to indicate an arrangement of application windows presenting content items within a common (topic-specific and/or focus-specific) content cluster. The content scene system can further restore the desktop cluster scene to arrange application windows according to the desktop cluster scene.

Introduction to Storing and Arranging Video Call Scenes

As further mentioned above, in some embodiments the content scene system stores and arranges video call scenes. In particular, the content scene system can detect a video call associated with a user account of the content management system and can arrange application windows for the video call according to a video call scene. For example, the content scene system can analyze a digital calendar associated with a user account to identify an upcoming video call and, upon detecting that the video call is scheduled to take place within a threshold time period, the content scene system can provide a call setup element that is selectable to arrange application windows for the video call. For instance, the content scene system opens a video call application, opens a notetaking application, and places and sizes each application window according to a video call scene (e.g., a previously stored video call scene or a video call scene set by user account preferences).

As just suggested, in certain embodiments, the content scene system stores a video call scene. For example, the content scene system can store information indicating locations and dimensions of application windows for a video call. In some cases, the content scene system determines the application window locations and dimensions set via user interaction, while in other cases the content scene system determines default locations and dimensions for one or more application windows (e.g., a video call application window and any accompanying application window, such as a notetaking application window) according to application window arrangements previously set by the user account (and/or other user accounts of the content management system) for various video calls over time.

As mentioned, in some embodiments, the content scene system stages a desktop interface as presented on a client device by arranging application windows for a video call (e.g., according to an arrangement indicated by a video call scene). For example, the content scene system arranges application windows according to a previously stored video call scene or according to a default arrangement specifically for video calls. In some embodiments, the content scene system analyzes video call data to determine which applications to open (in addition to a video call application), and the content scene system further arranges application windows accordingly (e.g., based on which applications and how many application windows are open). The content scene system can further blur or otherwise obfuscate other (e.g., non-video-call-related) application windows during the video call.

Upon detecting that a video call has ended, the content scene system can further restore a desktop scene to a state as it appeared before the video call. For example, in response to detecting a start of a video call, the content scene system can store a desktop scene layout and can later restore the desktop scene layout after the video call by arranging application windows as they appeared before the video call (e.g., before rearranging application windows for the video call). In some embodiments, upon detecting the end of a video call, the content scene system can surface an inspection interface whereby a user account can select which application windows to store as part of a video call scene for the video call.

As suggested above, the content scene system can provide several improvements or advantages over existing digital content systems. For example, some embodiments of the content scene system can improve accuracy over prior systems. As opposed to existing systems that use simplistic rules for grouping content items, the content scene system can generate content clusters and corresponding content collections based on topic-specific activity patterns. As a result, the content scene system can provide more accurate content collections that reflect commonly themed content items accessed in shared application sessions (or within common timeframes). Indeed, the content scene system can generate suggested content collections that are related to shared topics and/or classifications while also reflecting commonality in activity patterns of user accounts.

In addition to improving accuracy over prior digital content systems, the content scene system can also improve efficiency. For example, by generating more accurate content collections, the content scene system can mitigate or reduce user interactions required to move content items in and out of various collections, thereby saving processing resources that prior systems waste processing the excessive user interactions.

Additionally, the content scene system can more efficiently restore desktop scene layouts. To elaborate, while some conventional systems utilize virtual machines (e.g., simulated operating systems) to store and restore desktop scene layouts (including positions and sizes of application windows), the content scene system can use less processing power and computer memory than such virtual-machine-based systems. Indeed, storing a desktop scene layout of a virtual machine requires substantial processing power and memory to save a copy of the entire state of the operating system. By contrast, the content scene system can store and restore a desktop scene layout using an efficient scene layout table that uses less processing power and memory. Specifically, the scene layout table can organize data for a desktop scene layout to store an arrangement of application windows, including a field to designate the name of an application window, the location of the application window, and the size of the application window. In some cases, the content scene system can further store a depth of the application window as well as the size and location of content open within the application window. Thus, the content scene system can avoid the need to save entire operating system states while still storing and restoring desktop scene layouts.

As another example, the content scene system can provide more efficient user interfaces that reduce the number of user interactions required to access desired data or functionality. Specifically, the content scene system can automatically arrange application windows on desktop interfaces to display or present digital content items (e.g., from content collections) with few (e.g., one) user interactions. Compared to prior systems that require many user interactions to individually place and size application windows for viewing separate content items in respective applications, or that require many user interactions to open individual tabs for separate webpages or other content items, the content scene system intelligently arranges application windows (and digital content therein) according to desktop scene layouts indicating locations and dimensions of each application window and the digital content presented therein. Consequently, the content scene system saves computing resources that prior systems expend processing larger numbers of user interactions for accessing or organizing content items.

As a further improvement over prior digital content systems, the content scene system can more accurately store and restore desktop scene layouts. Whereas prior systems often track open applications for restoring in subsequent sessions, these systems nevertheless struggle to (or are incapable of) accurately store arrangements of application windows, let alone digital content presented within the application windows. For instance, some existing operating systems can detect crashes and can attempt to restore applications that were open at the time of a crash. However, these existing operating systems are often only able to reopen applications that were running at the time of the crash, without any indication of the arrangement of the application windows (especially if multiple instances of an application were running in separate windows), much less any indication of content displayed within the application windows. The content scene system, by contrast, can store and restore desktop scene layouts that accurately indicate arrangements of application windows (including locations, dimensions, and depths, even for multiple instances of a single application open in different windows) as well as digital content presented within the application windows.

As illustrated by the foregoing discussion, the present disclosure utilizes a variety of terms to describe features and benefits of the content scene system. Additional detail is hereafter provided regarding the meaning of these terms as used in this disclosure. As used herein, the term "digital content item" (or simply "content item") refers to a digital object or a digital file that includes information interpretable by a computing device (e.g., a client device) to present information to a user. A digital content item can include a file such as a digital text file, a digital image file, a digital audio file, a webpage, a website, a digital video file, a web file, a link, a digital document file, or some other type of file or digital object. A digital content item can have a particular file type or file format, which may differ for different types of digital content items (e.g., digital documents. digital images, digital videos, or digital audio files). In some cases, a digital content item can refer to a remotely stored (e.g., cloud-based) item or a link (e.g., a link or reference to a cloud-based item or a web-based content item) and/or a content clip that indicates (or links/references) a discrete selection or segmented sub-portion of content from a webpage or some other content item or source. A digital content item can be editable or otherwise modifiable and can also be sharable from one user account (or client device) to another. In some cases, a digital content item is modifiable by multiple user accounts (or client devices) simultaneously and/or at different times.

As a subset of content items, a "web content item" refers to a content item accessible via the internet, such a webpage, a website, or a cloud-based content item not accessed locally. For example, a web content item can refer to an internet-based content item, such as a content item identified by, or located at, a URL address. A web content item can include a content item coded or defined by HTML, JavaScript, or another internet language. In some cases, a web content item can include a content item accessible via HTTP(S) protocol (or some other internet protocol) via a web browser.

Relatedly, the term "content cluster" refers to a cluster or grouping of content items that share a relationship with one another and/or that share at least one content attribute. In particular, a content cluster refers to a set of content items that are determined to have a relationship based on topic data and focus data associated with the content items. For example, a content cluster includes content items that share a common (or a similar) topic or theme and/or that are part of a common activity pattern or focus session. As a subset of content clusters, a "web content cluster" refers to a content cluster that includes (or consists entirely of) web content items. Along these lines, the term "topic data" refers to information or data that indicates, corresponds to, or signifies a topic or theme associated with a content item. For example, topic data includes signals extracted or determined from content items, such as titles, headers, keywords, object classifications, and/or video transcripts. Additionally, the term "focus data" refers to information or data that indicates, corresponds to, or signifies an activity pattern or a focus session associated with a content item. For example, focus data includes timestamps (and/or time durations) of user account activity such as clicks, shares (to or from), comments, views, scrolls, selections, copies (of URLs representing content items or of content within content items), pastes, moves, deletions, or other interactions with content items. Focus data can also (or alternatively) include pattern information that indicates navigational patterns between content items (or between different topics) over time and/or over one or more application sessions.

As used herein, the term "content collection" refers to a collection or grouping of content items associated with a user account of a content management system. For example, a content collection includes content items stored in one or more locations on a device or cloud-based network servers. In some cases, a content collection includes content items arranged together or otherwise associated with one another while stored in different locations. For instance, a content collection can refer to a grouping of content items associated with a user account of a content management system and/or that share certain attributes such as access patterns, topics, or classifications. In some embodiments, a content collection can include additional content collections therein, each containing different content items. Relatedly, the term "suggested content collection" refers to a content collection that is not yet formed or established for a user account within a content management system but that is suggested or recommended and that can be established in response to approval or a request by the user account.

As mentioned above, the content scene system can select seed content items and generate content clusters using one or more machine learning models. As used herein, the term "machine learning model" refers to a computer algorithm or a collection of computer algorithms that automatically improve for a particular task through iterative outputs or predictions based on use of data. For example, a machine learning model can utilize one or more learning techniques to improve in accuracy and/or effectiveness. Example machine learning models include various types of neural networks, decision trees, support vector machines, linear regression models, and Bayesian networks.

As described in further detail below, the content scene system utilizes a "content cluster machine learning model" that can include, for example, one or more neural networks, to select or predict content clusters. For instance, a content cluster machine learning model refers to a machine learning model that determines probabilities or likelihoods that content items belong on a common cluster based on topic data and/or focus data. In certain embodiments, a content cluster machine learning model generates content clusters according to topic-based activity patterns or topic-based focus sessions, where content related to a common topic accessed within a shared focus session (e.g., within a threshold time period, within a common application session, and/or within a threshold number of navigational inputs) are clustered together. In some cases, the content cluster machine learning model can refer to a spectral clustering model that clusters content items according to a spectral clustering technique.

Relatedly, the term "neural network" refers to a machine learning model that can be trained and/or tuned based on inputs to determine classifications, scores, or approximate unknown functions. For example, a neural network includes a model of interconnected artificial neurons (e.g., organized in layers) that communicate and learn to approximate complex functions and generate outputs (e.g., generated recommendation scores) based on a plurality of inputs provided to the neural network. In some cases, a neural network refers to an algorithm (or set of algorithms) that implements deep learning techniques to model high-level abstractions in data. A neural network can include various layers such as an input layer, one or more hidden layers, and an output layer that each perform tasks for processing data. For example, a neural network can include a deep neural network, a convolutional neural network, a recurrent neural network (e.g., an LSTM), a graph neural network, or a generative adversarial neural network. Upon training as described below, such a neural network may become a content clustering neural network.

As used herein, the term "application session" (or sometimes simply "session") refers to an instance of use within a client application or within a particular collection or folder or content item using a client application. For example, an application session refers a set of activities performed within a single login of a client application or an application of a content management system. As another example, an application session refers to a set of activities performed within a single visit of an application or a single access of a content collection or folder. In some cases, a session requires a login while in other cases, a session does not require a login and instead indicates an instance of use between closures or terminations (of an application or webpage) or between visits that are at least a threshold period of time apart (or separated by a device power off or sleep mode).

As mentioned above, the content scene system can store and restore desktop scene layouts. As used herein, the term "desktop scene layout" (or simply "desktop scene") refers to an appearance or an arrangement of application windows presented or displayed within a desktop interface of a client device. For example, a desktop scene layout includes an arrangement that defines locations and dimensions of one or more application windows displayed on a client device. In some cases, a desktop scene layout also defines or indicates an arrangement (including locations and dimensions) of digital content presented within one or more application windows, including websites in respective browser tabs, images presented in image viewing applications, and/or digital documents presented within document editing applications.

As specific examples of desktop scene layouts, the content scene system can store and restore desktop cluster scenes and/or video call scenes. As used herein, the term "desktop cluster scene" refers to a desktop scene layout for a particular content cluster or set of content items belonging to a common cluster. Relatedly, a "desktop content cluster" refers to a content cluster of content items corresponding to a common topic-specific activity pattern or focus session and that are presented within one or more application windows displayed on a client device. As further used herein, the term "video call scene" refers to a desktop scene layout specifically for video calls. For instance, a video call scene includes an arrangement of application windows associated with a video call presented on a client device.

Additional detail regarding the content scene system will now be provided with reference to the figures. For example, FIG. 1 illustrates a schematic diagram of an example system environment for implementing a content scene system 102 in accordance with one or more implementations. An overview of the content scene system 102 is described in relation to FIG. 1.

Thereafter, a more detailed description of the components and processes of the content scene system 102 is provided in relation to the subsequent figures.

As shown, the environment includes server(s) 104, a client device 108, a database 114, and a network 112. Each of the components of the environment can communicate via the network 112, and the network 112 may be any suitable network over which computing devices can communicate. Example networks are discussed in more detail below in relation to FIGS. 32-33.

As mentioned above, the example environment includes a client device 108. The client device 108 can be one of a variety of computing devices, including a smartphone, a tablet, a smart television, a desktop computer, a laptop computer, a virtual reality device, an augmented reality device, or another computing device as described in relation to FIGS. 32-33. The client device 108 can communicate with the server(s) 104 and/or the database 114 via the network 112. For example, the client device 108 can receive user input from a user interacting with the client device 108 (e.g., via the client application 110) to, for instance, access, generate, modify, or share a content item, to collaborate with a co-user of a different client device, or to select a user interface element. In addition, the content scene system 102 on the server(s) 104 can receive information relating to various interactions with content items and/or user interface elements based on the input received by the client device 108 (e.g., to access content items, generate content collections, store or restore desktop scene layouts, or perform some other action).

As shown, the client device 108 can include a client application 110. In particular, the client application 110 may be a web application, a native application installed on the client device 108 (e.g., a mobile application, a desktop application, etc.), or a cloud-based application where all or part of the functionality is performed by the server(s) 104. Based on instructions from the client application 110, the client device 108 can present or display information, including a user interface that includes a suggested content collection element for adding a suggested content collection to a user account of the content management system 106 and/or user interface elements for storing and restoring desktop scene layouts.

As illustrated in FIG. 1, the example environment also includes the server(s) 104. The server(s) 104 may generate, track, store, process, receive, and transmit electronic data, such as digital content items, topic data, focus data, interface elements, interactions with digital content items, interactions with interface elements, and/or interactions between user accounts or client devices. For example, the server(s) 104 may receive data from the client device 108 in the form of a selection of a particular content item relating to a certain topic. In addition, the server(s) 104 can transmit data to the client device 108 in the form of a content item, a suggested content collection, a desktop scene layout, or some other information. Indeed, the server(s) 104 can communicate with the client device 108 to send and/or receive data via the network 112. In some implementations, the server(s) 104 comprise(s) a distributed server where the server(s) 104 include(s) a number of server devices distributed across the network 112 and located in different physical locations. The server(s) 104 can comprise one or more content servers, application servers, communication servers, web-hosting servers, machine learning server, and other types of servers.

As shown in FIG. 1, the server(s) 104 can also include the content scene system 102 as part of a content management system 106. The content management system 106 can communicate with the client device 108 to perform various functions associated with the client application 110 such as managing user accounts, managing content collections, managing content items, and facilitating user interaction with the content collections and/or content items. Indeed, the content management system 106 can include a network-based smart cloud storage system to manage, store, and maintain content items and related data across numerous user accounts, including user accounts in collaboration with one another. In some embodiments, the content scene system 102 and/or the content management system 106 utilize the database 114 to store and access information such as digital content items, topic data, focus data, content clusters, content collections, and desktop scene layouts.

Although FIG. 1 depicts the content scene system 102 located on the server(s) 104, in some implementations, the content scene system 102 may be implemented by (e.g., located entirely or in part) on one or more other components of the environment. For example, the content scene system 102 may be implemented by the client device 108, and/or a third-party device. For example, the client device 108 can download all or part of the content scene system 102 for implementation independent of, or together with, the server(s) 104.

In some implementations, though not illustrated in FIG. 1, the environment may have a different arrangement of components and/or may have a different number or set of components altogether. For example, the client device 108 may communicate directly with the content scene system 102, bypassing the network 112. As another example, the environment may include multiple client devices, each associated with a different user account for managing digital content items. In addition, the environment can include the database 114 located external to the server(s) 104 (e.g., in communication via the network 112) or located on the server(s) 104 and/or on the client device 108.

As mentioned above, the content scene system 102 can perform methods or functions relating to: i) generating content clusters, ii) generating content collections from content clusters, iii) storing and restoring desktop scene layouts, and iv) storing and arranging video call scenes. The following description separates the discussion and the corresponding figures for each of these four concepts into individual sections, each with its own heading. While these sections are divided for clarity, the content scene system 102 is not limited in its functionality or performance according to such division or separation. Rather, the content scene system 102 can perform all or some of the acts or methods associated with one or more of the following sections separately or in combination together. Indeed, some sections below may borrow from or rely on the descriptions of other sections.

Generating Content Clusters

Figure 2:
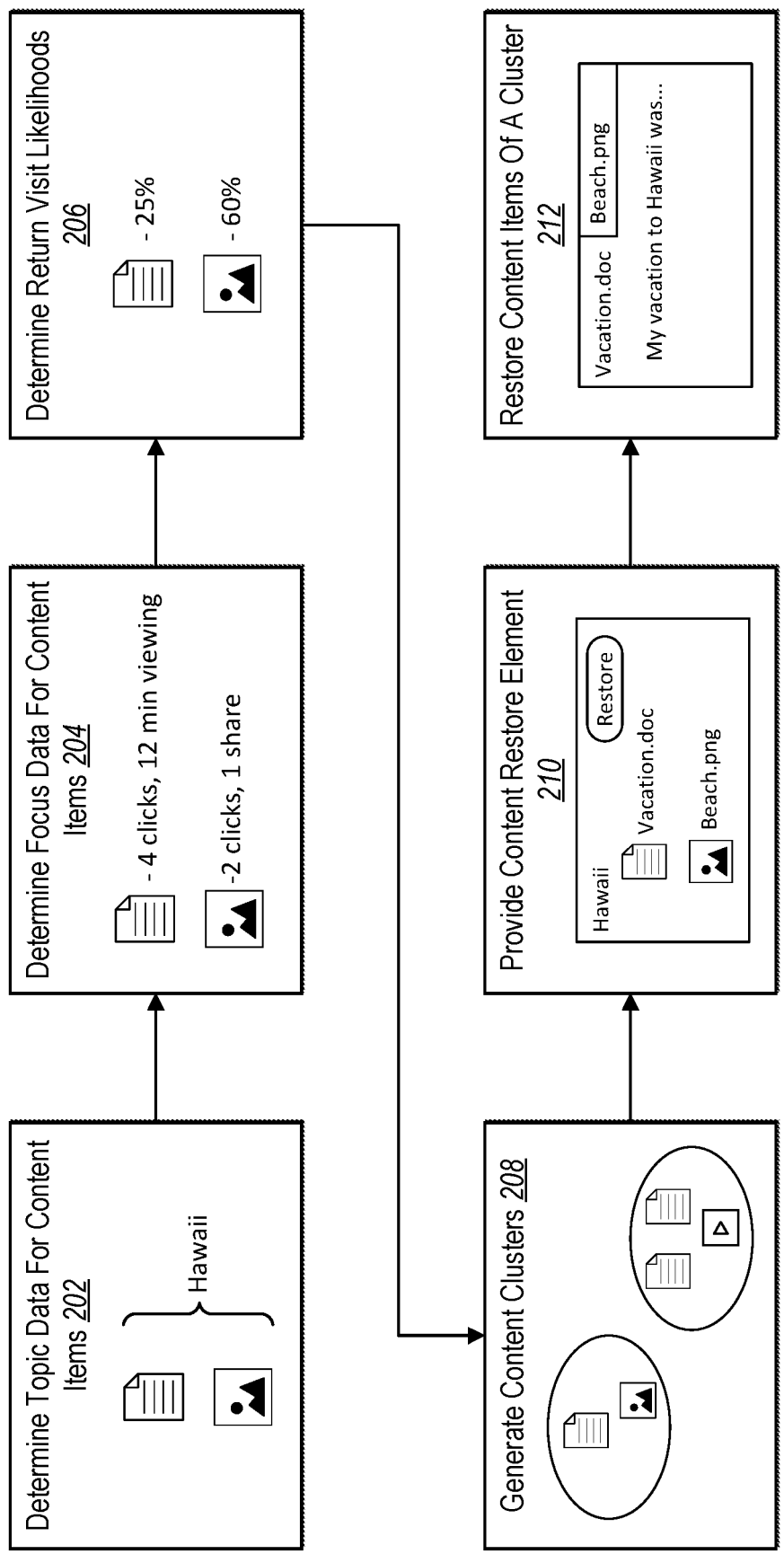
FIG. 2 illustrates an example overview of generating and restoring a content cluster in accordance with one or more embodiments.

As mentioned above, in certain described embodiments, the content scene system 102 generates or predicts content clusters. In particular, the content scene system 102 determines or identifies content items (associated with a user account of the content management system 106) that belong together in a content cluster. Based on determining a content cluster, the content scene system 102 can further restore one or more content items of a cluster for presentation or display on a client device. FIG. 2 illustrates an example overview of generating a content cluster and restoring content items from the content cluster in accordance with one or more embodiments. Thereafter, additional detail regarding the various acts of FIG. 2 is provided with reference to subsequent figures.

As illustrated in FIG. 2, the content scene system 102 performs an act 202 to determine topic data for content items associated with a user account of the content management system 106. In particular, the content scene system 102 determines topic data by analyzing content items or select portions of content items. For example, the content scene system 102 analyzes topic data such as file names, titles, headers, images, text, video content, subtitles, and data fields. In addition, the content scene system 102 can analyze topic data in the form of metadata associated with content items, including author/creator information, affiliated organizations, storage locations (e.g., within file hierarchies on the client device 108 or as cloud-based content items within the database 114), creation timestamps, and/or other metadata. In some cases, the content scene system 102 can determine a topic or a theme for a digital image by combining analysis of its file name in conjunction with recognition of one or more objects or scenes depicted in the digital image as well as a determination that the image is located with other content items relating to a particular topic (as determined according to their respective topic data). As shown, the content scene system 102 determines a topic of "Hawaii" for two content items, a digital document and a digital image.

As also illustrated in FIG. 2, the content scene system 102 performs an act 204 to determine focus data for content items associated with a user account of the content management system 106. To elaborate, the content scene system 102 determines focus data that indicates an activity pattern or a focus session. For instance, the content scene system 102 determines focus data such as timestamps for (and durations of) various user account activity, including user account activity for collaborative user accounts in collaboration with the user account (e.g., within a common team or part of a shared project within the content management system 106). Such focus data can include clicks, shares (to or from a user account), comments, views, scrolls, selections, copies, pastes, moves, and deletions.

From the timestamps and/or durations of user account activity, the content scene system 102 can further extrapolate additional focus data. For instance, the content scene system 102 can determine or detect navigation between various content items (e.g., back-and-forth or among several content items) as a signal of user focus. Specifically, as a user account repeatedly switches between viewing two (or three or more) different content items, the content scene system 102 can designate the repeated navigation as focus data. As another example, the content scene system 102 can determine or detect navigation from one content item that branches out like a hub to several other content items. The content scene system 102 can designate the hub-and-peripheral relationship between content items as focus data. Additional detail and examples regarding determining focus data are provided below with reference to subsequent figures.

Additionally, the content scene system 102 performs an act 206 to determine return visit likelihoods. More specifically, the content scene system 102 determines return visit likelihood scores that indicate a likelihood or a probability that a user account will revisit a content item. In some embodiments, the content scene system 102 determines return visit likelihood scores for a particular return visit timeframe (e.g., within the next day or week or within the next threshold number of application sessions). For example, the content scene system 102 determines a return visit likelihood score for a content item based on topic data and/or focus data. In some cases, the content scene system 102 utilizes a return visit likelihood machine learning model (e.g., a neural network) to generate or predict a return visit likelihood for a user account (e.g., from user account attributes, topic data, and/or focus data). As shown, the content scene system 102 determines a return visit likelihood score of 25% for a digital document and a return visit likelihood score of 60% for a digital image. Additional detail regarding determining return visit likelihood scores is provided below with reference to subsequent figures.

As further shown in FIG. 2, the content scene system 102 performs an act 208 to generate content clusters. More particularly, the content scene system 102 generates content clusters to include content items that are related to one another according to topic data and/or focus data. For example, the content scene system 102 can compare the topics and/or classifications of the content items with each other. In some cases, the content scene system 102 can cluster content items by topic-specific activity session clusters according to the one or more topics and activity patterns associated with the various content items. In some embodiments, the content scene system 102 utilizes a content cluster machine learning model to extract feature vectors from topic data and/or focus data of content items to compare within a latent feature space. The content scene system 102 can further cluster content items according to distances of the feature vectors from one another within the latent space (e.g., according to a clustering algorithm). In some cases, the content scene system 102 generates content clusters (and/or content collections) using one or more methods or techniques described by Jongmin Baek and Jiarui Ding in U.S. patent application Ser. No. 17/815,478, entitled SEEDING AND GENERATING SUGGESTED CONTENT COLLECTIONS, filed Jul. 27, 2022, which is hereby incorporated by reference in its entirety.

As further illustrated in FIG. 2, the content scene system 102 performs an act 210 to provide a content restore element. In particular, the content scene system 102 generates and provides a content restore element that is selectable to restore for presentation one or more content items within a content cluster. In some cases, the content scene system 102 provides a content restore element that represents a content cluster (or a topic-specific focus session), where the content restore element indicates the content items within the cluster. As shown, the content scene system 102 generates a content restore element that indicates two content items—"Vacation.doc" and "Beach.png"—and that includes a selectable "Restore" option to restore the content items for presentation on a client device.

Additionally, the content scene system 102 can perform an act 212 to restore content items of a cluster. More specifically, the content scene system 102 can receive an indication of a user interaction selecting a content restore element to restore content items from a content cluster. Based on the selection of the content restore element, the content scene system 102 can access each of the content items within the corresponding cluster and can present each content items for display on the client device (e.g., by opening a browser tab for each respective content item and/or by opening an application window for each respective content item). As shown, the content scene system 102 opens two browser tabs, one for "Vacation.doc" and one for "Beach.png."

Figure 3:
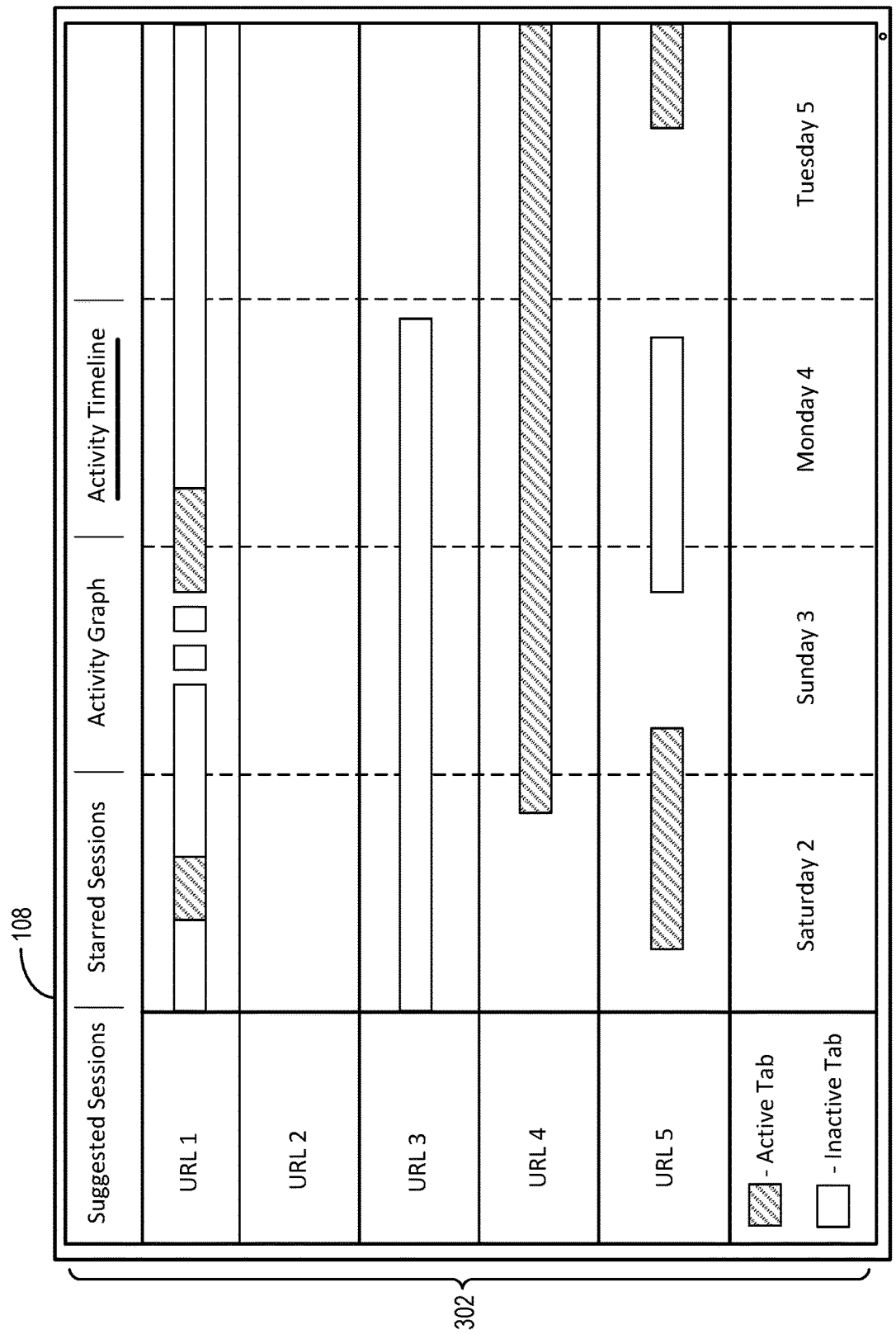
FIG. 3 illustrates an example activity timeline interface associated with determining topic data and focus data in accordance with one or more embodiments.

As mentioned above, in certain embodiments, the content scene system 102 determines focus data associated with content items of a user account. In particular, the content scene system 102 analyzes user account activity, such as a web access history, as well as other user account actions to determine focus signals in relation to content items. FIG. 3 illustrates an example activity timeline representing focus data associated with a user account in accordance with one or more embodiments.

As illustrated in FIG. 3, the client device 108 displays or presents an activity timeline interface 302. Indeed, in some cases, the content scene system 102 generates and provides the activity timeline interface 302 for display on a device, such as the client device 108 or an administrator device. As shown, the activity timeline interface 302 includes activity timelines for five different content items, each represented by its own URL. Indeed, whether web-based or stored within the content management system 106, content items can (usually) be represented by URLs indicating their access/storage locations.

To determine the focus data associated with each content item, the content scene system 102 monitors or analyzes user account activity that indicates actions, such as clicks, shares (to or from a user account), comments, views, scrolls, selections, copies, pastes, moves, and deletions. Indeed, the content scene system 102 can monitor or analyze such actions as performed by a subject user account (e.g., a user account for which content clusters are generated) as well as those performed by user accounts in collaboration with the subject user account (and/or performed by user accounts that are similar to, or within a common group, domain, or organization of, a particular user account). As part of the focus data, in one or more embodiments, the content scene system 102 determines numbers of, frequencies of, and/or recencies of user account activity.

In certain embodiments, the content scene system 102 can extrapolate further focus data from user account activity. For example, the content scene system 102 can extrapolate or determine activity patterns or focus sessions based on actions, including navigational actions and other actions. For instance, the content scene system 102 can identify clicks or other navigational input between various content items and can identify patterns based on repeated actions or navigation. In some embodiments, the content scene system 102 determines an activity pattern or a focus session that includes a set of content items, where a user account navigates between the content items in the set (and does so periodically at certain intervals). The content scene system 102 can also determine activity patterns or focus sessions based on other actions, such as comments and shares, where, for example, a user account frequently shares or receives (or comments on) content items with (or accessible by) the same set of collaborative user accounts.

In some cases, the content scene system 102 determines topic-based activity patterns or topic-based focused sessions based on navigational actions and other user account activity with content items associated with shared topics or themes. For example, the content scene system 102 identifies or detects user account activity associated with content items corresponding to a shared topic or theme. Specifically, the content scene system 102 determines an activity pattern or a focus session that includes a set of content items on a particular topic, where a user account navigates among the topic-specific content items or performs some other actions with respect to the topic-specific content items (e.g., copies content from the topic-specific content items, shares the topic-specific content items, and/or comments on the topic-specific content items).

In some cases, the content scene system 102 determines different weights for different focus data, where higher weights indicate greater likelihoods of belonging to an activity pattern or a focus session (or carry more emphasis in a machine learning prediction), and lower weights indicate lower likelihoods of belonging to an activity pattern or a focus session (or carry less emphasis in a machine learning prediction). For example, the content scene system 102 can determine focus data weights based on numbers, frequencies, and/or recencies of user account activity, where higher numbers, higher frequencies, and/or more recent actions are weighted more heavily. The content scene system 102 can also determine heavier weights (or more emphasis) for user account activity performed by a subject user account, and the content scene system 102 can determine lighter weights (or less emphasis) for user account activity performed by other user accounts (e.g., collaborative user accounts). The content scene system 102 can further weight focus data based on durations of viewing a content item, where longer durations are weighted heavier than shorter durations.

As shown in FIG. 3, the content scene system 102 determines or analyzes focus data for five different content items to generate activity timelines. Specifically, based on the focus data, the content scene system 102 determines or generates an activity timeline for the content items represented by each of the URLs, URL 1 through URL 5. For example, the content scene system 102 generates the activity timeline for URL 1 to indicate various focus data associated with URL 1. As shown, the user account accessed URL 1 and maintained the access to URL 1 for a few consecutive days with some intermittent breaks (e.g., tab closures in a browser where URL 1 was presented). The activity timeline of URL 1 further indicates timeframes where URL 1 was actively viewed (e.g., in an active tab presented via the client device 108) or otherwise open but not actively viewed (e.g., in an inactive tab or in a background window on the client device 108).

Similarly, the content scene system 102 provides activity timelines for URL 2 through URL 5 as well. As shown, the activity timeline for URL 2 indicates no access or open tabs for the corresponding content item over the four represented days (Saturday 2 through Tuesday 5). Likewise, the content scene system 102 generates and provides the activity timelines for the other URLs as well, each with its own pattern of access in browser tabs or windows.

Figure 4:
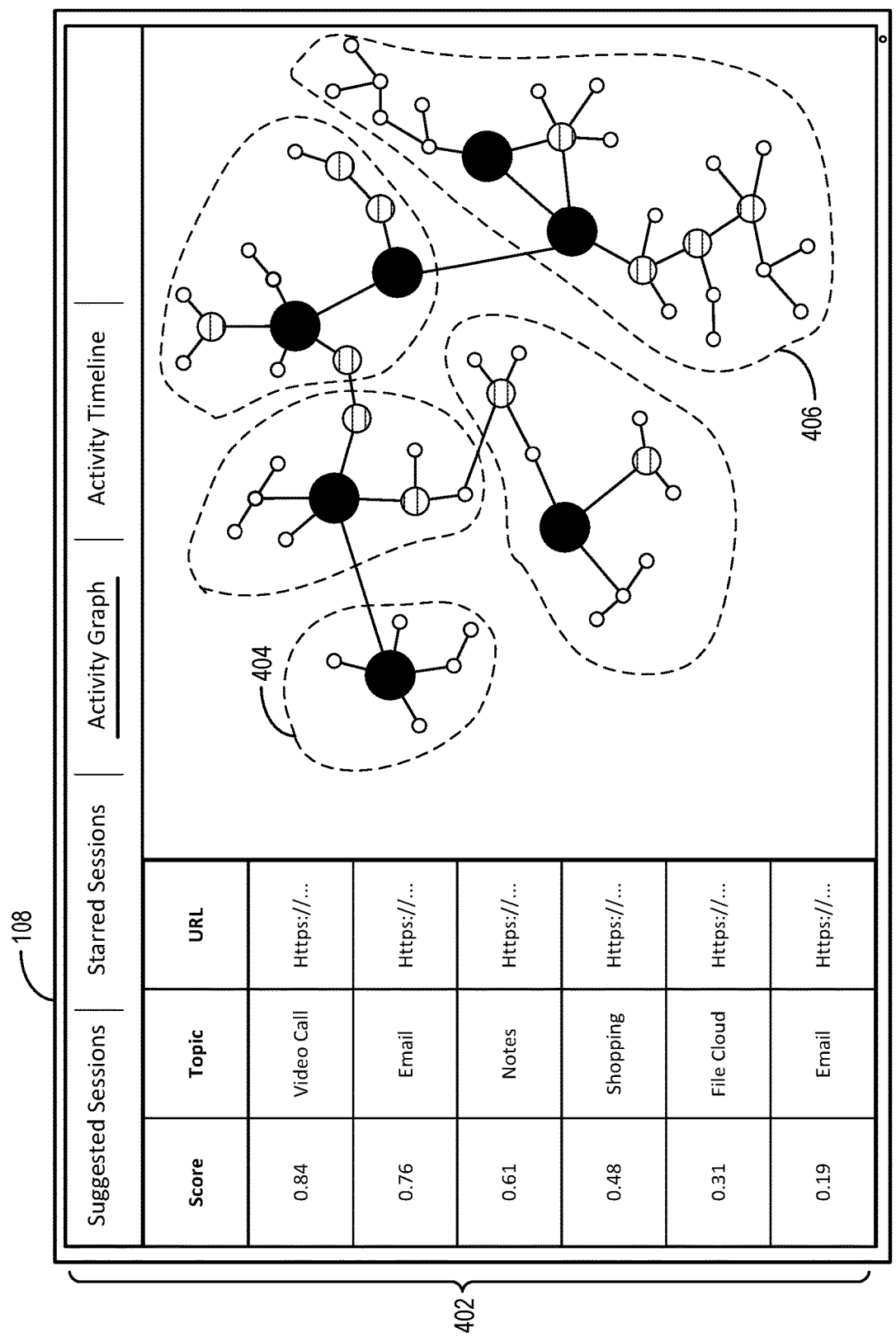
FIG. 4 illustrates an example activity graph associated with determining topic data and focus data in accordance with one or more embodiments.

As mentioned above, in certain embodiments, the content scene system 102 determines topic data associated with content items. In addition, the content scene system 102 generates content clusters that represent topic-specific activity patterns or topic-specific focus sessions associated with content items. FIG. 4 illustrates an example activity graph representing content clusters based on topic-specific activity patterns or topic-specific focus sessions in accordance with one or more embodiments.

As mentioned above, in some cases, the content scene system 102 determines topic-specific activity patterns or topic-specific focus sessions based on a combination of topic data and focus data. More specifically, the content scene system 102 determines focus data as described above, and the content scene system 102 further determines topic data. To determine topic data, in some cases, the content scene system 102 analyzes digital content items to identify titles, keywords, headers, objects, and other information. In some cases, the content scene system 102 determines a topic indicated by a title and/or keywords of a content item (e.g., using natural language processing). In these or other cases, the content scene system 102 determines a topic associated with one or more depicted objects within a digital image. For instance, the content scene system 102 utilizes an object detection machine learning model to analyze pixels of the digital image to predict classifications of depicted objects.

From a combination of object classifications, titles, keywords, and/or headers, the content scene system 102 can determine a topic or theme for a content item. For example, the content scene system 102 can utilize heuristic models to determine relevance scores or similarity scores for content items in relation to various topics based on titles, keywords, and/or object classifications. For instances, the content scene system 102 can determine numbers of mentions of a topic (or terms associated with a topic), numbers of objects corresponding to a topic, and/or locations within the content item where the mentions/objects occur (e.g., in the title, in a text body, or in a footnote). The content scene system 102 can further determine a topic relevance score for a content item based on the mentions and their locations, where more mentions in more prominent locations corresponds to a higher topic relevance score and where fewer mentions in less prominent locations corresponds to a lower topic relevance score.

As another example, the content scene system 102 can utilize a topic prediction machine learning model to generate predictions of topic classifications associated with a content item based on inputting the object classifications, titles, keywords, and/or headers of the content item into the topic prediction machine learning model. In turn, the topic prediction machine learning model can analyze the inputs to generate probabilities of the content item belonging to various topic classifications. For example, the topic prediction machine learning model can generate a topic vector for a content item and can determine distances of the topic vector to topic classification vectors in a vector space. In some cases, the content scene system 102 selects a closest topic classification vector as representing a topic for the content item.

As shown in FIG. 4, the content scene system 102 determines topics for a number of content items corresponding to (or located at) various URLs. Indeed, as illustrated in FIG. 4, the client device 108 displays or presents an activity graph interface 402. The content scene system 102 can provide the activity graph interface 402 for display on the client device 108 and/or on an administrator device. As shown, the activity graph interface 402 includes a table indicating topics (e.g., "Video Call," "Email," "Notes," etc.), URLs and return visit likelihood scores for various content items. The activity graph interface 402 also includes a graph portion depicting content clusters represented by dashed lines surrounding nodes of the graph, where each node represents a content item (or a visit of a content item) and each edge represents a navigational input (e.g., a click of a link, a selection of a tab, or a scroll) from one content item to another.

As just mentioned, the content scene system 102 determines return visit likelihood scores for content items. Indeed, to identify content items for including within content clusters, and to also identify content items to exclude from content clusters, the content scene system 102 can determine cluster relevance scores in the form of return visit likelihood scores that indicate a likelihood or a probability that a user account will re-access a content item. The content scene system 102 can thus omit or exclude content items that are less important or less relevant to the user account insofar as the user account is not likely to access the content item again. In some cases, a return visit likelihood score indicates a likelihood of re-access at any future time, while in other cases a return visit likelihood score is more specific and indicates a likelihood of re-access within a threshold time period or within a threshold number of application sessions (e.g., within the next session or the next three sessions).

To determine return visit likelihood scores for content items, the content scene system 102 utilizes topic data and/or focus data. For example, the content scene system 102 determines activity patterns where a user account accesses a particular content item at regular intervals throughout the week or at the start of each workday (or based on some other determined pattern). The content scene system 102 thus determines a high return visit likelihood score for the content item given its focus data. As another example, the content scene system 102 determines a high return visit likelihood score for a content item with a topic relating to a collaborative work project that the user account is part of. Conversely, the content scene system 102 determines a low return visit likelihood score for a content item that is visited only a single time for a short duration and/or that is related to a topic independent of other topics for other content items.

In some cases, the content scene system 102 utilizes a return visit likelihood machine learning model to generate or predict return visit likelihood scores from topic data and/or focus data input into the model. For example, the content scene system 102 can train a return visit likelihood machine learning model to generate or predict return visit likelihood scores based on training data including sample topic data, sample focus data, and ground truth indications of whether a user account returned to visit or access a content item. Specifically, the content scene system 102 can input sample topic data and sample focus data from a content item into the return visit likelihood machine learning model, whereupon the return visit likelihood machine learning model generates a predicted return visit likelihood score. The content scene system 102 can further utilize a loss function to compare the predicted return visit likelihood score with a ground truth indication of whether or not a user account (e.g., the same user account or a user account within a threshold similarity of the user account according to profile information, demographic information, and geographic information) re-accessed the content item. To reduce a measure of loss associated with the loss function, the content scene system 102 can perform a model fitting process to adjust internal parameters (e.g., weights and biases) of the return visit likelihood machine learning model for more accurate predictions on subsequent iterations. After multiple iterations (e.g., once the return visit likelihood machine learning model satisfies a threshold measure of loss), the content scene system 102 can utilize the trained return visit likelihood machine learning model to generate return visit likelihood scores for content items.

As shown, the activity graph interface 402 depicts an activity graph to represent content clusters based on topic-specific activity patterns or topic-specific focus sessions. To generate the activity graph, the content scene system 102 generates content clusters, such as content cluster 404 and content cluster 406 (as well as the other content clusters indicated by nodes encompassed by dashed lines). In some cases, the content scene system 102 generates content clusters based on topic data and focus data that indicate content items that share topic-specific activity patterns or topic-specific focus sessions. Indeed, the content scene system 102 can generate content clusters based on topic data, where content items relating to a topic shared by other (e.g., at least a threshold number of) content items accessed by the user account (and/or collaborative user accounts) are more likely to be clustered together than content items relating to their own one-off topics independent of topics corresponding to other content items. The content scene system 102 can further cluster content items based on focus data where content items accessed together or from one another (e.g., via embedded links) or within a threshold timeframe of one another or within a common application session are more likely to be clustered together than content items accessed far apart (e.g., on different sessions, days, weeks, or months).

Based on generating content clusters, the content scene system 102 generates and provides the activity graph interface 402 that depicts a graph of nodes and edges indicating content items (or visits of content items) and their respective clusters. Within the activity graph, the content scene system 102 sizes nodes for content clusters according to an amount of time spent viewing or focused on a content item during a particular visit, where larger nodes indicate longer focus time and smaller nodes indicate shorter focus time. In addition, the content scene system 102 adjusts a color, opacity, or pattern for each of the nodes in the graph according to a number of connected nodes (e.g., neighbor nodes). For example, the dark nodes in FIG. 4 have the most neighbor nodes or the most edges connecting other nodes, while the lightest nodes have the fewest and the nodes with the lined pattern are somewhere in between. In some cases, the dark nodes represent hub content items (e.g., websites) that a user account uses to navigate back and forth to access other content items.

In some cases, as part of generating the activity graph and/or generating content clusters, the content scene system 102 combines content items into composite content items representing multiple content items, such as content items of a shared topic (e.g., webpages that are part of a larger website or repeated browser searches for the same or similar terms) or shared focus data. For instance, the content scene system 102 generates a composite content item to represent multiple content items that share a common root domain, a common storage location, and/or a common root website. By combining content items into composite content items, the content scene system 102 avoids or prevents overcrowding and overcomplicating the activity graph interface 402 with excessive numbers nodes for repetitive/duplicative content items. The content scene system 102 can also simplify content restore elements by including composite content items rather than each individual content item.

Along these lines, the content scene system 102 can simplify activity graphs and content restore elements by further identifying and removing superfluous content items. To elaborate, the content scene system 102 can identify content items that a user account accesses by accident unintentionally by, for instance, detecting an access of the content item and a return navigation to a previous content item (or a closure/exit of the content item) within a threshold timeframe (e.g., 3 seconds or five seconds). In addition, the content scene system 102 can identify content items (e.g., sequences of content items) that a user account accesses as part of a sidetrack or a tangential series of user account actions where each content item is accessed for less than a threshold duration and/or is associated with a different topic than the content item before it (e.g., as a result of a user account quickly clicking through webpages while bored or sidetracked). In some cases, the content scene system 102 identifies the tangential sequence of content items based on a total time duration of the tangential navigation (e.g., five minutes or less), the time duration of each content item within the tangential navigation, and/or the topics associated with the accessed content items.

Figure 5:
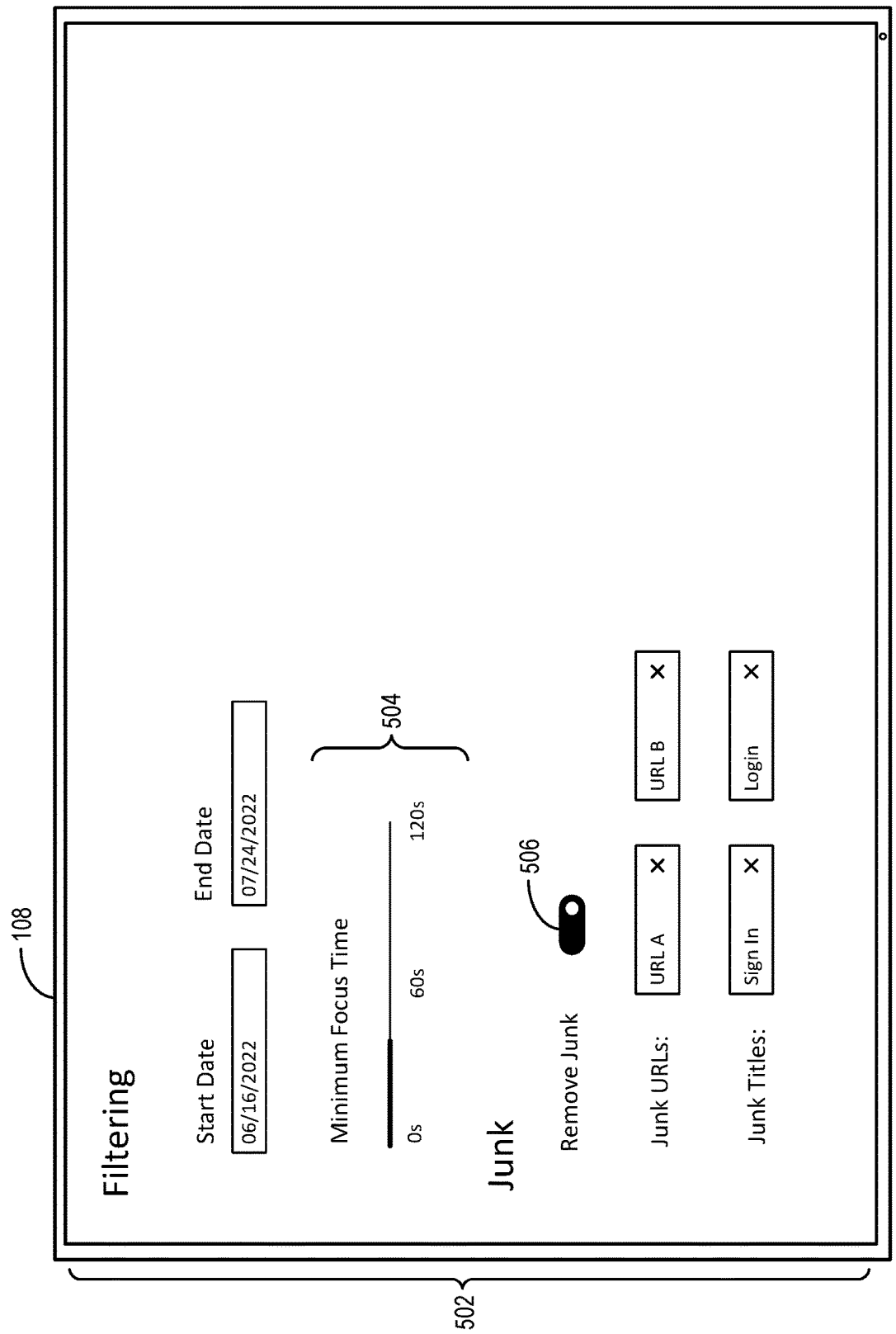
FIG. 5 illustrates an example filtering interface for filtering content items associated with content clusters in accordance with one or more embodiments.

In certain described embodiments, the content scene system 102 generates and provides filtering tools for modifying or customizing the generation of content clusters. In particular, the content scene system 102 provides a filtering interface to the client device 108 or to an administrator device for customizing parameters used for generating content clusters. FIG. 5 illustrates an example filtering interface in accordance with one or more embodiments.

As illustrated in FIG. 5, the client device 108 displays or presents a filtering interface 502 that includes selectable options for filtering content items according to certain parameters. For example, the filtering interface 502 includes options for setting a start date and an end date for generating content clusters (or for visualizing content clusters within an activity graph). Based on the start date and the end date, the content scene system 102 analyzes only content items accessed within the specified time window to determine topic data and focus data for generating content clusters.

In addition, the content scene system 102 provides a focus time element 504 that is selectable and modifiable to change a minimum focus time as a parameter for considering content items to cluster. For example, in some embodiments, the content scene system 102 can only generate content clusters from content items that satisfy the minimum focus time indicated by the focus time element 504. The content scene system 102 thus omits or excludes content items focused on, engaged with, or viewed for less than the indicated duration of time. Based on changes to the minimum focus time (e.g., in response to user interaction with the focus time element 504), the content scene system 102 can add or remove content items for consideration in generating content clusters.

As further illustrated in FIG. 5, the filtering interface 502 includes interface elements for adjusting junk parameters. To elaborate, the content scene system 102 can identify or designate certain content items as junk to remove, omit, or exclude those content items from consideration as part of content clusters (and/or as part of an activity graph visualization). For instance, the content scene system 102 provides elements for designated URLs, titles (or other aspects) of content items to filter out as junk content items, thereby removing them from content clusters and/or visualizations of content clusters such as activity graphs. The content scene system 102 can also provide a selectable junk option 506 to apply (or not apply) the junk filter for removing junk content items. Thus, the content scene system 102 provides tools for a user account (or an administrator account) to filter specific content items and/or content items relating to particular URLs, titles, or topics.

In one or more embodiment, the content scene system 102 learns what content items are junk for a user account. For example, if the user account adds a particular title or URL to a junk designation at least a threshold number of times, the content scene system 102 can determine that corresponding content items are junk and can automatically add them to the junk designation for filtering. In addition, the content scene system 102 can adapt the junk parameters based on user account activity for different profiles (e.g., a work profile versus a home profile) of the user account, different client devices used by the user account (e.g., a work computer versus a home computer), different dates and times, and or different locations associated with the user account. For instance, the content scene system 102 can intelligently determine (based on topic data and/or focus data) content items to designate as junk when the user account is active on one client device versus another or via one profile versus another (e.g., at work or at home).

Based on changes to focus time parameters, junk parameters, and/or start/end date parameters, the content scene system 102 modifies which content items are considered for generating content clusters. In addition (or alternatively), the content scene system 102 modifies which content items are displayed or presented as part of content clusters within various user interfaces, such as an activity graph interface (as shown in FIG. 4). In certain cases, the content scene system 102 further adjusts the size of nodes within an activity graph based on changes to minimum focus time. For instance, increasing the minimum focus time results in not only reducing which content items are considered/displayed (excluding those that do not satisfy the minimum time) but also results in modifying the node sizes so that nodes are required to be viewed longer (relative to content items under the previous minimum focus time) to be sized larger.

In some embodiments, the filtering interface 502 includes elements for tuning or weighting specific factors as part of generating content clusters. For example, the filtering interface 502 can include an element to bias clusters toward specific types of content items (e.g., websites versus images) so that certain content items are more likely to be part of a cluster than others. In some cases, the tuning or weighting elements can enable a user to set a specific weight (or a relative weight) for other factors, such as recency of visit, frequency of visit, topic, and/or other factors associated with content items. In these or other cases, the filtering interface 502 can include options for selecting a particular clustering model, such as a neural network or a spectral clustering model (or some other clustering model described herein).

Figure 6:
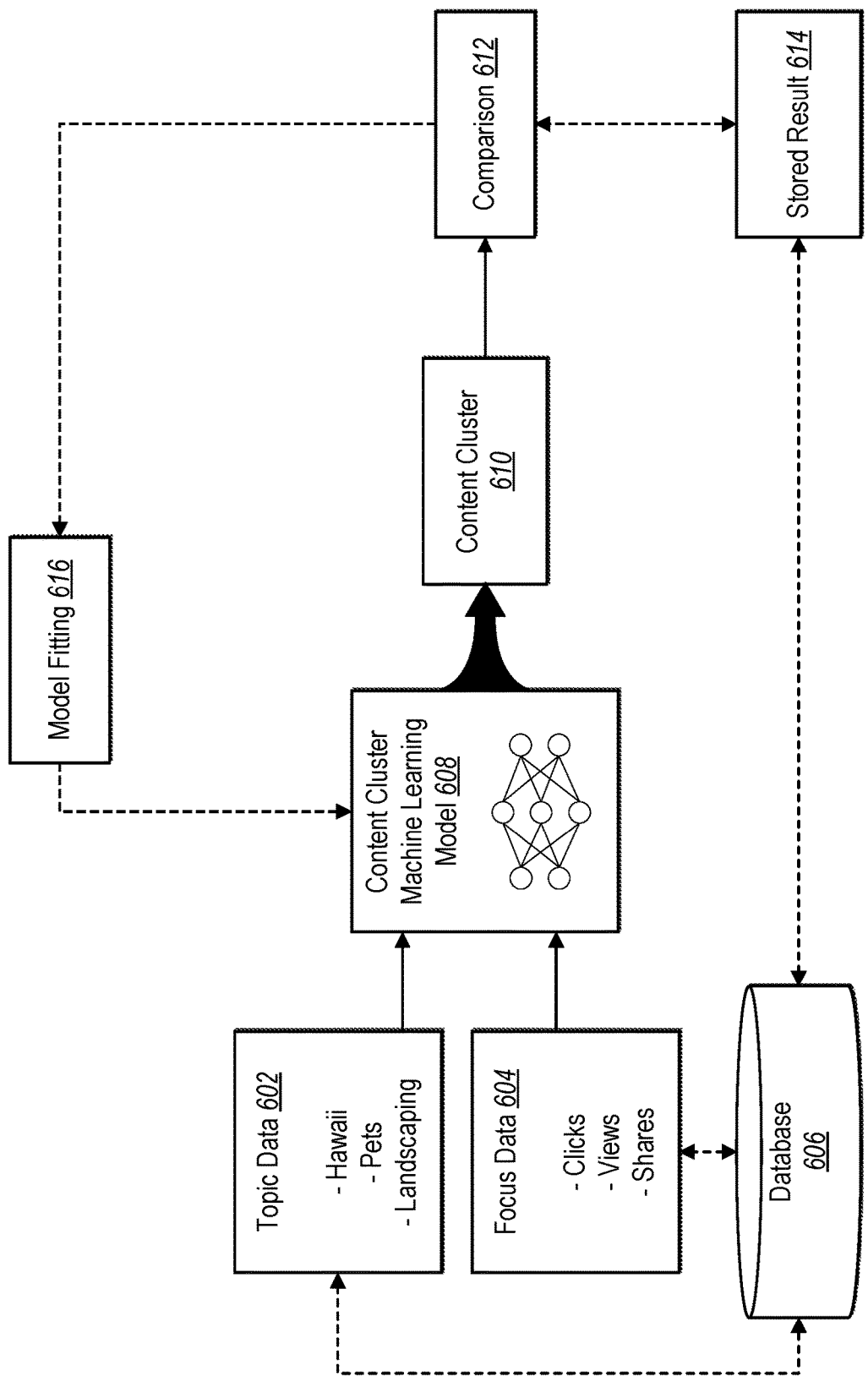
FIG. 6 illustrates an example diagram for training and implementing a content cluster machine learning model in accordance with one or more embodiments.

As mentioned above, in certain embodiments, the content scene system 102 generates content clusters based on topic data and focus data. For example, the content scene system 102 utilizes a content cluster machine learning model to generate content clusters from topic data and focus data. In some cases, the content cluster machine learning model refers to a clustering algorithm, such as a Density-Based Spatial Clustering of Applications with Noise ("DBSCAN") algorithm or a spectral clustering algorithm. In other cases, the content cluster machine learning model refers to a neural network that learns to cluster content items based on training with training data. FIG. 6 illustrates an example diagram for training and utilizing a content cluster machine learning model in accordance with one or more embodiments.

As illustrated in FIG. 6, the content scene system 102 the content scene system 102 trains a content cluster machine learning model 608. As shown, the dashed lines correspond to training steps while the solid lines correspond to steps that are part of training and implementation of the content cluster machine learning model 608. As part of training the content cluster machine learning model 608, the content scene system 102 accesses sample data from a database 606 (e.g., the database 114). For example, the content scene system 102 identifies sample data such as topic data 602 and focus data 604. In some embodiments, the content scene system 102 inputs the sample data into the content cluster machine learning model 608 and utilizes the content cluster machine learning model 608 to generate a prediction from the sample data. Specifically, the content cluster machine learning model 608 generates a content cluster 610 from the topic data 602 and the focus data 604 according to internal model parameters.

As part of training the content cluster machine learning model 608, the content scene system 102 also performs a comparison 612. Specifically, the content scene system 102 compares the content cluster 610 with a stored result 614 (e.g., a ground truth content cluster that is designated as corresponding to a content item from which the topic data 602 and the focus data 604 were extracted). Indeed, the content scene system 102 accesses the stored result 614 from the database 606, where the stored result 614 is designated as corresponding to the topic data 602 and the focus data 604. In some cases, the content scene system 102 performs the comparison 612 using a loss function such as a mean squared error loss function or a cross entropy loss function to determine an error or a measure of loss associated with the content cluster machine learning model 608 (or a loss/distance between the content cluster 610 as predicted and the stored result 614).

In one or more embodiments, the content scene system 102 further performs a model fitting 616. Based on the comparison 612, the content scene system 102 modifies parameters of the content cluster machine learning model 608. For example, the content scene system 102 modifies parameters of the content cluster machine learning model 608 to reduce a measure of error or a loss associated with the content cluster machine learning model 608. The content scene system 102 can further repeat the process illustrated in FIG. 6 for many iterations or epochs until the content cluster machine learning model 608 satisfies a threshold measure of loss. For each iteration, the content scene system 102 generates new predictions from new sample data, performs a comparison, and modifies parameters (e.g., via back propagation) to improve predictions for subsequent iterations.

Once training is complete, the content scene system 102 can utilize or implement the content cluster machine learning model 608. In particular, the content scene system 102 can utilize the content cluster machine learning model 608 to generate or predict content clusters for content items. For instance, the content scene system 102 determines or extracts topic data and focus data from a content item and further determines a content cluster for the content item based on inputting the topic data and the focus data into the content cluster machine learning model 608. Indeed, the content cluster machine learning model 608 generates, from the topic data and focus data, content item vectors representing content items in a vector space. The content cluster machine learning model 608 further determines distances of the content item vectors from one another in the vector space. The content cluster machine learning model 608 can further utilize a clustering technique to determine content clusters based on relative distances between vectors within the vector space (e.g., where vectors close to one another are grouped or clustered together). In some cases, the content cluster machine learning model 608 uses a spectral clustering algorithm to generate content clusters.

Figure 7:
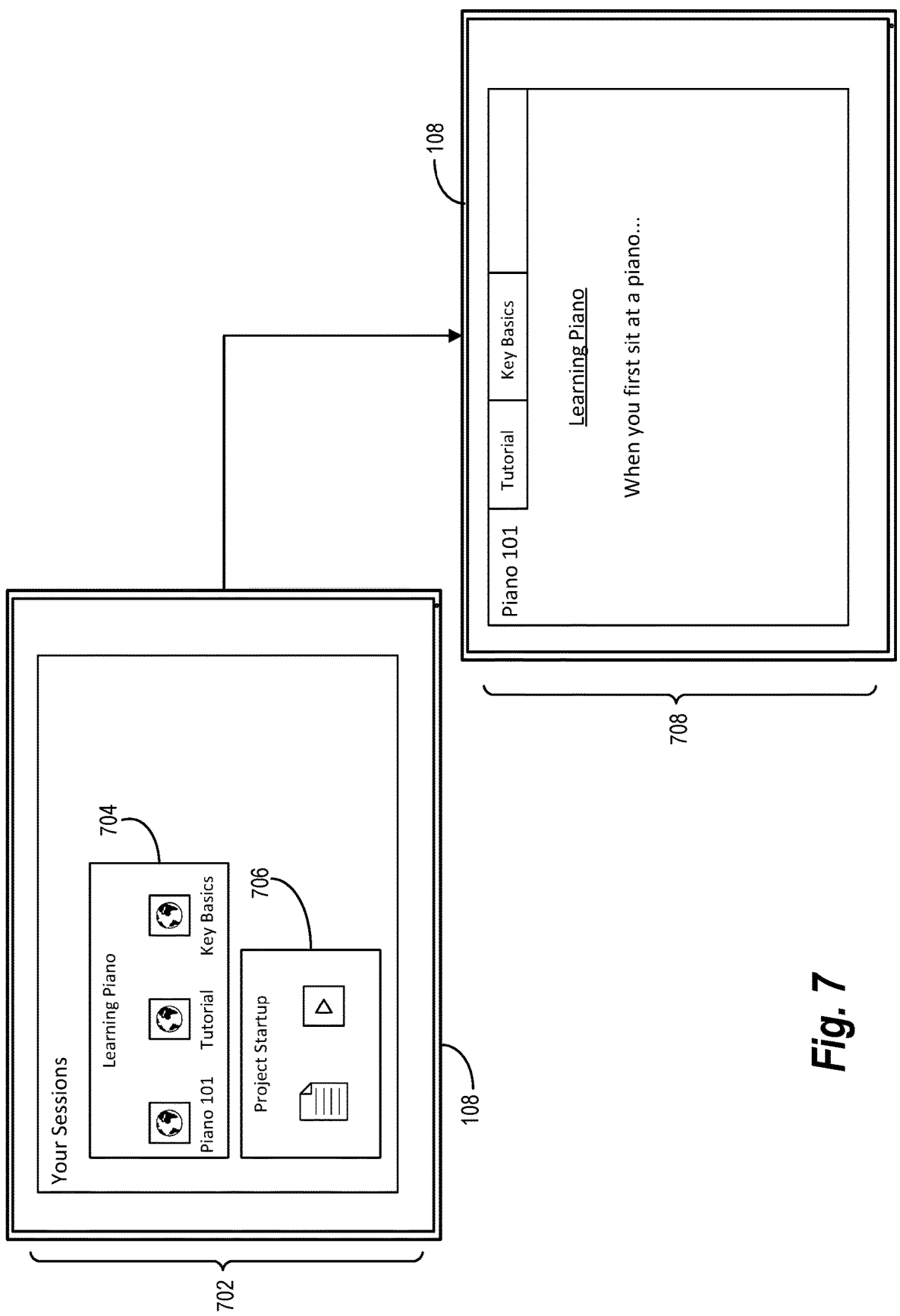
FIG. 7 illustrates an example diagram for restoring content items from a content cluster in accordance with one or more embodiments.

As mentioned above, in certain described embodiments, the content scene system 102 generates and provides a content restore elements for a content cluster. In particular, the content scene system 102 generates a content restore element that represents a content cluster (and which corresponds to a particular topic-specific activity pattern or a particular topic-specific focus session) and which is selectable to access all of the content items associated with the content cluster (e.g., to open individual tabs for each via a single user interaction). FIG. 7 illustrates an example flow diagram for providing a content restore element and restoring content items from a content cluster in accordance with one or more embodiments.

As illustrated in FIG. 7, the content scene system 102 generates and provides a desktop interface 708 presenting content items of a content cluster in response to receiving a user interaction within a content cluster interface 702. In particular, the content scene system 102 generates a content cluster interface 702 that includes one or more content restore elements, such as the content restore element 704 and the content restore element 706, that summarize or indicate content items belonging to a corresponding content cluster or topic-specific focus session. For example, the content scene system 102 can generate the content cluster interface 702 as a modified version of a web history interface to depict previous focus sessions or content clusters. As another example, the content scene system 102 can generate the content cluster interface 702 as a separate interface within (or separate from) a web browser.

In some embodiments, the content scene system 102 surfaces content restore elements in interfaces other than content cluster interfaces. For example, the content scene system 102 provides a content restore element within a new tab interface (e.g., a homepage interface) or within a content management interface for accessing and managing content items within the content management system 106. As shown, the content scene system 102 provides the content restore element 704 focused on the topic of "Learning Piano" and also provides the content restore element 706 focused on the topic of "Project Startup."

As further illustrated in FIG. 7, the content scene system 102 accesses or provides the content items within a content cluster (or within a topic-specific focus session) based on user interaction with a content restore element. For example, the content scene system 102 receives an indication of user interaction selecting the content restore element 704 via the client device 108. In response (to this single input), the content scene system 102 opens or accesses each of the content items within the content cluster represented by the content restore element 704. In some cases, the content scene system 102 provides each of the content items in its own respective tab within a web browser. Thus, the content scene system 102 restores access to previously accessed content items to resume a prior focus session and quickly pick up where a user left off. As shown, the content scene system 102 opens a first content item ("Piano 101") in a first tab, a second content item ("Tutorial") in a second tab, and a third content item ("Key Basics") in a third tab.

FIGS. 1-7, the corresponding text, and the examples provide a number of different systems and methods for generating content clusters and restoring content items within content clusters using content restore elements. In addition to the foregoing, implementations can also be described in terms of flowcharts comprising acts steps in a method for accomplishing a particular result. For example, FIG. 8 illustrates an example series of acts for generating content clusters and restoring content items within content clusters using content restore elements.

Figure 8:
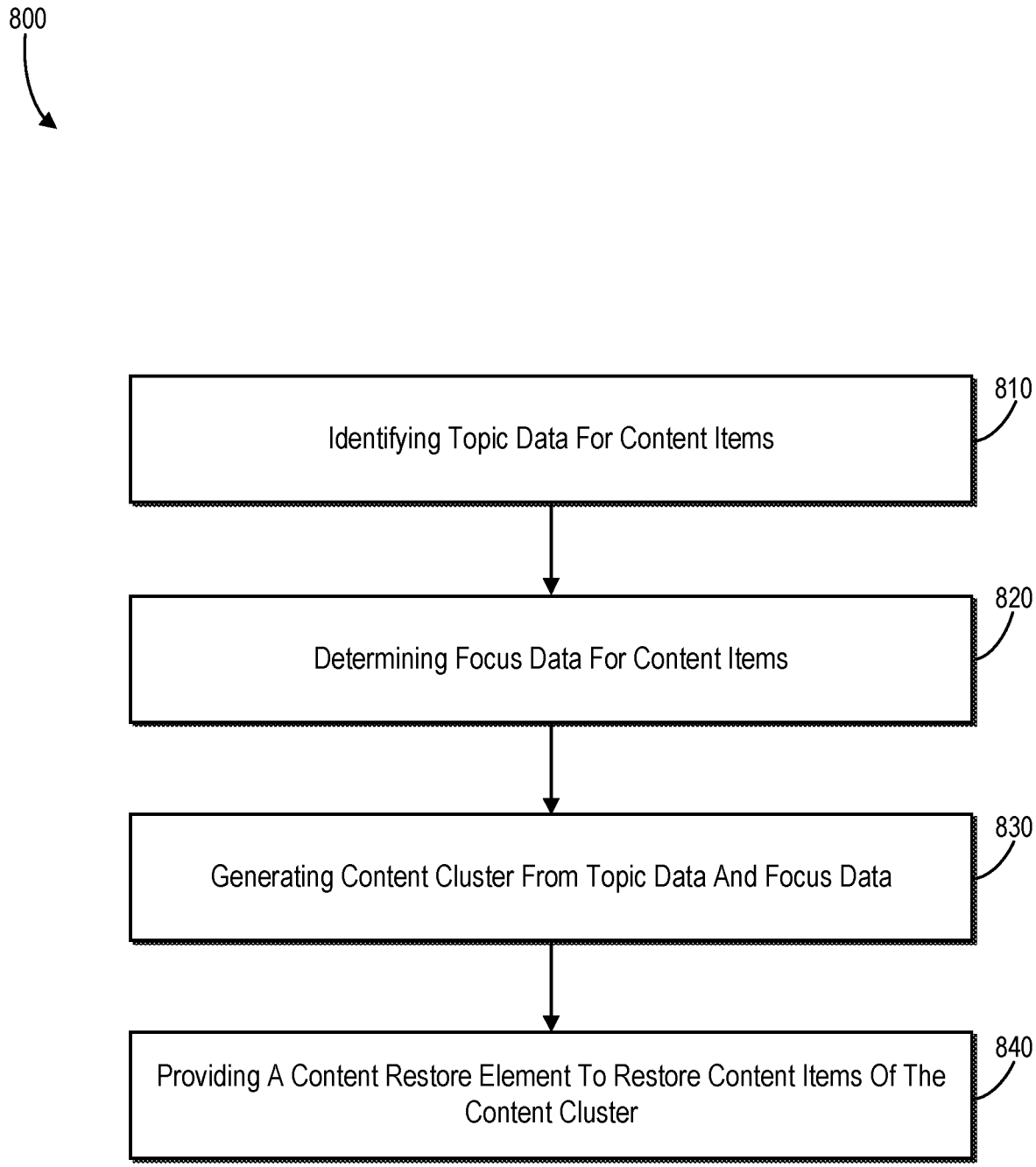
FIG. 8 illustrates an example flowchart of a series of acts for generating and restoring content clusters in accordance with one or more embodiments.

While FIG. 8 illustrates acts according to certain implementations, alternative implementations may omit, add to, reorder, and/or modify any of the acts shown in FIG. 8. The acts of FIG. 7 can be performed as part of a method. Alternatively, a non-transitory computer readable medium can comprise instructions, that when executed by one or more processors, cause a computing device to perform the acts of FIG. 8. In still further implementations, a system can perform the acts of FIG. 8.

As illustrated in FIG. 8, the series of acts 800 may include an act 810 of identifying topic data for content items. For example, the act 810 involves identifying topic data associated with a plurality of digital content items from an access history of a user account of a content management system. The series of acts 800 may also include an act 820 of determining focus data for content items. For example, the act 820 involves determining focus data indicating activity patterns associated with the plurality of digital content items from the access history of the user account. In addition, the series of acts 800 may include an act 830 of generating a content cluster from topic data and focus data. For example, the act 830 involves generating, from the topic data and the focus data, a content cluster by grouping two or more digital content items of the plurality of digital content items together according to their respective topic data and focus data. Further, the series of acts 800 may include an act 840 of providing a content restore element to restore content items of the content cluster. For example, the act 840 involves providing, for display on a client device associated with the user account, a content restore element representing the content cluster and selectable to restore the two or more digital content items of the content cluster by accessing the two or more digital content items via the client device.

In some embodiments, the series of acts 800 includes an act of identifying the topic data associated with the plurality of digital content items by: determining titles of the plurality of digital content items, detecting keywords within the plurality of digital content items, and identifying objects depicted within the plurality of digital content items. In these or other embodiments, the series of acts 800 includes an act of determining the focus data for the plurality of digital content items comprises determining data that indicate topic-specific activity patterns of the user account across one or more application sessions by: identifying a subset of digital content items from the plurality of digital content items that relate to a common topic and detecting user account activity associated with the subset of digital content items relating to the common topic.

In one or more embodiments, the series of acts 800 includes an act of generating the content cluster by utilizing a content cluster machine learning model to group the two or more digital content items according to the topic data and the focus data. Additionally, the series of acts 800 can include acts of determining return visit likelihood scores for the two or more digital content items within the content cluster based on the focus data and, based on the return visit likelihood scores, generating the content restore element to visually indicate content items from the content cluster that satisfy a threshold return visit likelihood score.

In some embodiments, the series of acts 800 includes an act of receiving an indication of a user interaction selecting the content restore element via the client device and an act of in response to the indication of the user interaction, restoring the two or more digital content items within the content cluster by providing the two or more digital content items within respective tabs of a web browser on the client device. In the same or other embodiments, the series of acts 800 includes an act of providing, for display on the client device, a content cluster interface depicting a visual representation of the content cluster together with visual representations of a plurality of additional content clusters within a cluster graph comprising nodes representing content items and edges representing navigation between content items.

Generating Content Collections from Content Clusters

Figure 9:
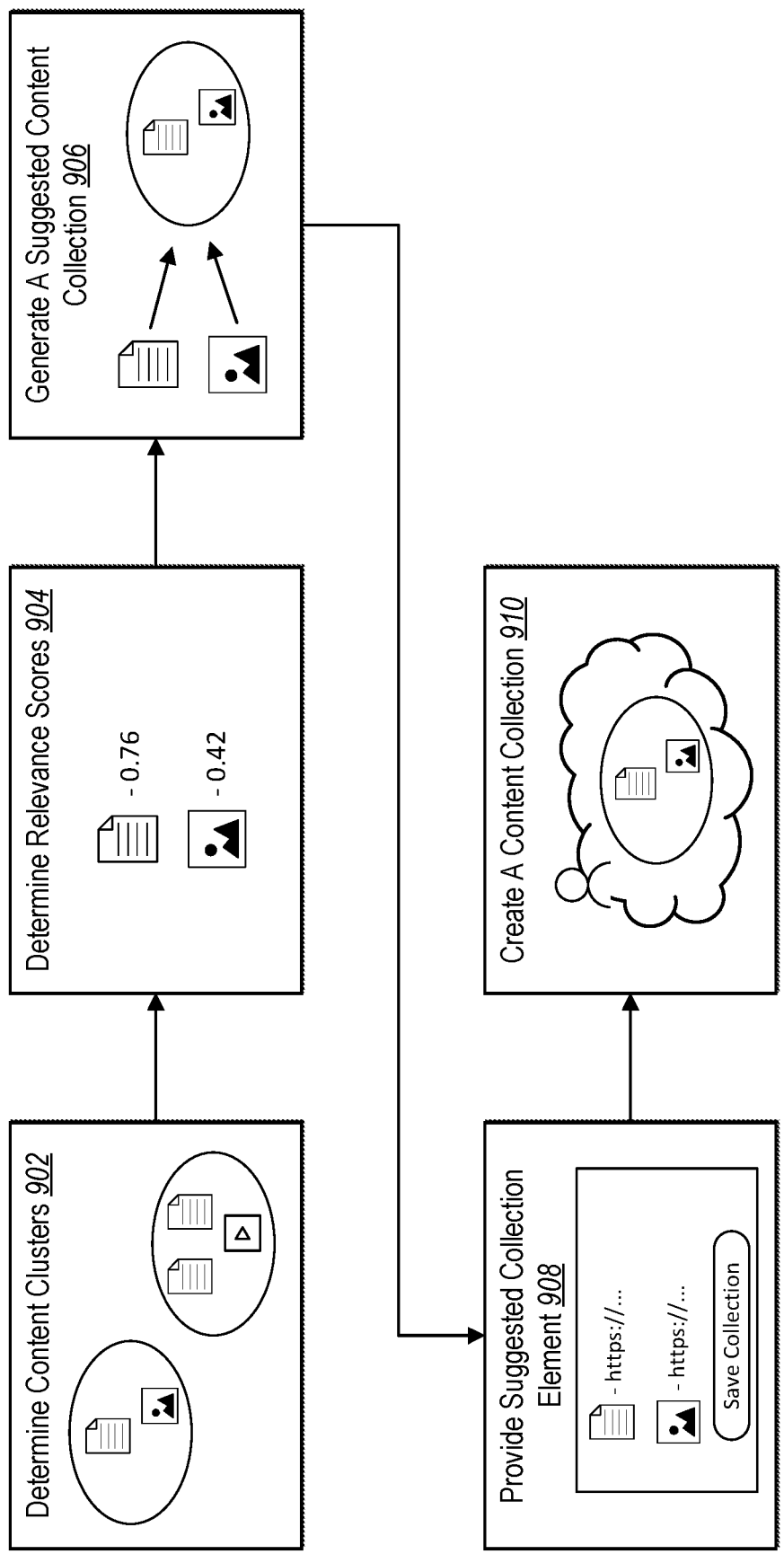
FIG. 9 illustrates an example overview of generating content collections from content clusters in accordance with one or more embodiments.

As mentioned above, in certain embodiments, the content scene system 102 generates content collections from content clusters. Indeed, the content scene system 102 can generate content clusters as described above in relation to FIGS. 1-8. From the content clusters, the content scene system 102 can further generate and provide content collections for user accounts within the content management system 106. FIG. 9 illustrates an example overview of generating a content collection from a content cluster in accordance with one or more embodiments. Thereafter, additional detail regarding the various acts of FIG. 9 is provided with reference to subsequent figures.

As illustrated in FIG. 2, the content scene system 102 performs an act 902 to determine content clusters. More specifically, the content scene system 102 determines content clusters by extracting topic data and focus data from content items (e.g., content items associated with a user account of the content management system 106). As described above, the content scene system 102 groups content items into content clusters based on the topic data and the focus data. For instance, the content scene system 102 generates content clusters that represent topic-specific focus sessions where a user account accesses content items related to a particular topic during a focus session defined by a threshold time period and/or a threshold number of navigational inputs.

As further illustrated in FIG. 2, the content scene system 102 performs an act 904 to determine relevance scores. Particularly, the content scene system 102 determines relevance scores for content clusters and/or content items in relation to a user account. For example, the content scene system 102 determines relevance scores indicating a measure of relevance or importance of content items based on historical user account activity (e.g., within a web access history). To determine a relevance score, the content scene system 102 can determine historical topic-specific focus sessions from a web access history and can determine how a content item (or a content cluster) relates to (or with fit in with) one or more of the historical topic-specific focus sessions. In some embodiments, the content scene system 102 compares individual content items (e.g., from a content cluster) to individual content items within a web access history. Additional detail regarding determining relevance scores for content clusters and/or content items is provided below with reference to subsequent figures.

Additionally, the content scene system 102 performs an act 906 to generate a suggested content collection. In particular, the content scene system 102 generates a suggested content collection based on the relevance scores for content clusters and individual content items within the content clusters. For example, the content scene system 102 identifies one or more relevant content clusters and further identifies relevant content items within the relevant content clusters. In some cases, the content scene system 102 selects a top number of relevant content items from the one or more relevant content clusters to include with a suggested content collection. Additional detail regarding generating a suggested content cluster is provided below with reference to subsequent figures.

As further illustrated in FIG. 9, the content scene system 102 performs an act 908 to provide a collection creation element. To elaborate, the content scene system 102 generates and provides a collection creation element that is selectable to save the suggested content collection as a new content collection associated with a user account of the content management system 106. For instance, the content scene system 102 can provide a collection creation element that indicates or represents a suggested content collection that includes content items from one or content clusters.

Based on receiving a user interaction with the collection creation element, as shown in FIG. 9, the content scene system 102 can perform an act 910 to create a content collection. More specifically, the content scene system 102 can generate a new content collection that includes the content items (or links to the content items) identified within the suggested content collection. In some cases, the content scene system 102 generates a new content collection and associates the new content collection with a user account within the content management system 106. For instance, the content scene system 102 creates a new cloud-based file directory for the user account and stores the new content collection (including its content items or links to content items) at the new directory.

Figure 10:
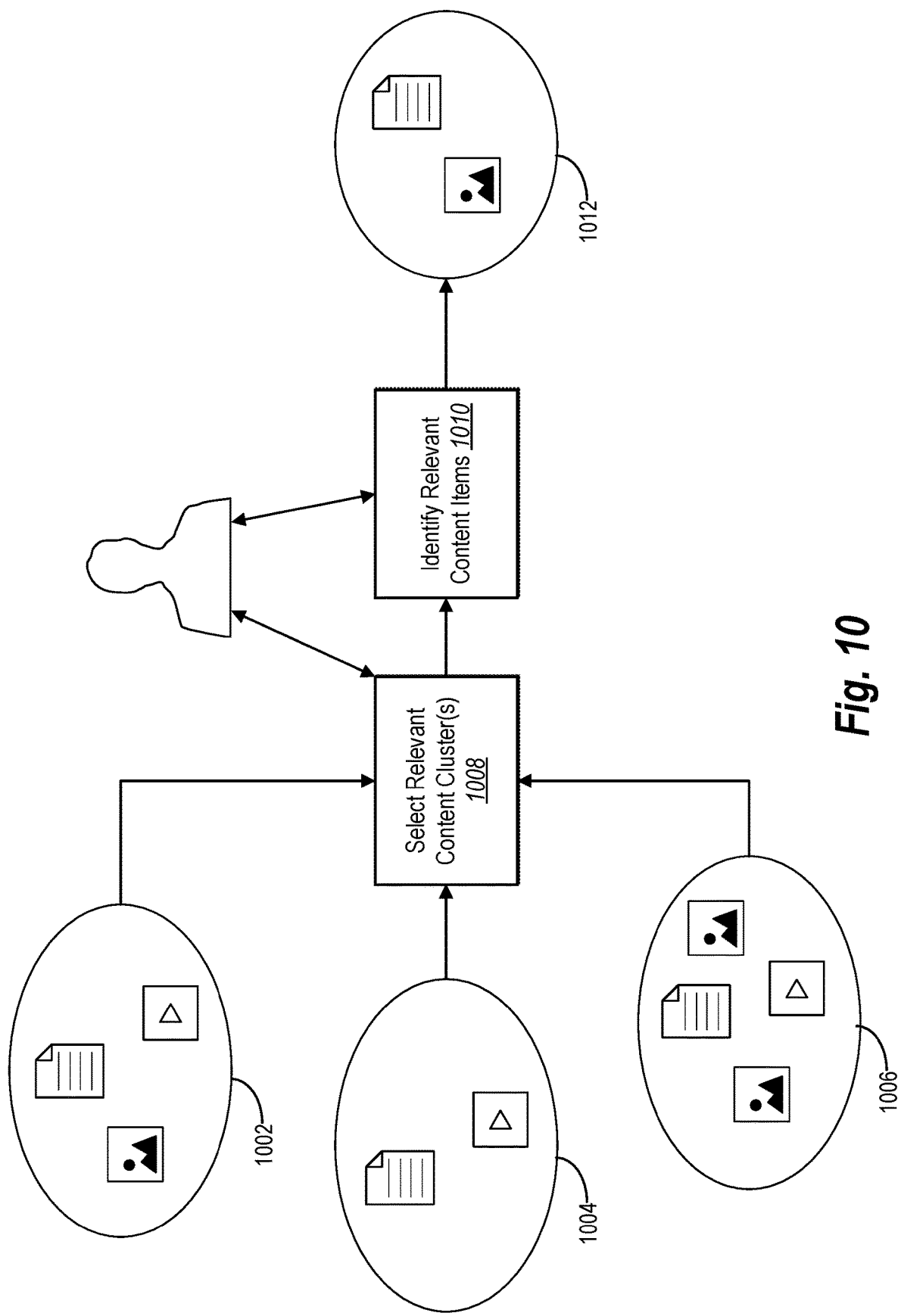
FIG. 10 illustrates an example diagram for generating a suggested content collection for a user account based on identifying relevant content items from content clusters in accordance with one or more embodiments.

As mentioned above, in certain described embodiments, the content scene system 102 generates a suggested content cluster for a user account. In particular, the content scene system 102 determines relevance scores for content items and/or content clusters to identify content items that are relevant to a user account. From the relevant content items, the content scene system 102 selects content items to include within a suggested content collection. FIG. 10 illustrates an example diagram for generating a suggested content collection in accordance with one or more embodiments.

As illustrated in FIG. 10, the content scene system 102 identifies a plurality of candidate content clusters, including the content cluster 1002, the content cluster 1004, and the content cluster 1006. From the candidate content clusters, the content scene system 102 can perform an act 1008 to select relevant content clusters based on relevance scores. To determine a relevance score for a content cluster, in some embodiments, the content scene system 102 compares the topic data and focus data for the content cluster to that of content items with a web access history.

To elaborate, the content scene system 102 can determine representative or composite topic data and focus data for a content cluster by, for example, determining a cluster center based on feature vectors extracted from content items in the cluster. For example, the content scene system 102 can determine a cluster center for a content cluster by determining a representative content item closest to the center of the cluster or by determining a geometric center of content item vectors extracted from (topic data and focus data of) content items within the content cluster. The content scene system 102 can further compare the cluster center with feature vectors of content items in the web access history (e.g., by determining distances in vector space). In some cases, the content scene system 102 compares the cluster center with a cluster center generated from a historical topic-specific focus session (e.g., by averaging feature vectors or identifying a representative feature vector from content items in the historical topic-specific focus session).

The content scene system 102 can further generate a relevance score based on the comparison (e.g., the distance) between the content cluster and the historical topic-specific focus session. In some cases, shorter distances correspond to higher relevance scores while longer distances correspond to lower relevance scores. In one or more embodiments, the content scene system 102 identifies a relevant content cluster as a content cluster whose relevance score satisfies a relevance threshold. In certain cases, the content scene system 102 identifies a content cluster as relevant if the relevance score for the cluster is within a top number of relevance scores among scored clusters.

As further illustrated in FIG. 10, the content scene system 102 performs an act 1010 to identify relevant content items. In particular, the content scene system 102 identifies relevant content items from one or more relevant content clusters (as determined via the act 1008). To identify relevant content items, the content scene system 102 compares topic data and/or focus data associated with content items with that of content items within a user account's web access history. Although FIG. 10 illustrates performing the act 1010 after the act 1008, in some embodiments, the content scene system 102 performs the act 1010 without necessarily performing the act 1008 to identify relevant content clusters. In either case, the content scene system 102 identifies relevant content items associated with a user account.

For example, the content scene system 102 analyzes focus data associated with content items, including factors such as recency, frequency, and overall volume of user account activity pertaining to content items (e.g., clicks, scrolls, views, shares, comments, and receipts) from a user account's activity history (e.g., a web access history). The content scene system 102 thus determines which content items (and which topics) are more recently interacted with, more frequently interacted with, and/or interacted with more in number. In some embodiments, the content scene system 102 generates a relevance score for a content item based on the number, frequency, and/or recency of user account actions performed in relation to the content item. In some cases, the content scene system 102 weights different user account activities differently, where, for example, shares and comments indicate can indicate a stronger relevance to the user account than clicks. The content scene system can thus 102 determine a relevance score for a content item to indicate how similar the content item is to content items in a user account's web access history.

In one or more embodiments, the content scene system 102 can also identify user account activity associated with content items across different applications. In particular, the content scene system 102 can access an application programming interface ("API") for one or more applications that a user account accesses or uses to interact with a content item, such as a messaging application API, an image editing application API, an email application API, a calendar application API, and/or a file management application API. The content scene system 102 can access the APIs to determine different uses of, or interactions with, a content item. For example, the content scene system 102 can access a messaging application API to identify mentions of a particular topic of a content item (or the content item itself) by the user account and/or by collaborative user accounts. The content scene system 102 can further determine a number, a frequency, and/or a recency of the various cross-application activity to determine a relevance score for a content item. In some cases, the content scene system 102 weights different cross-application activity differently in determining a relevance score where, for instance, a sharing a content item via a first application is weighted more heavily than sharing the content item via a second application.

As just suggested, in some embodiments, the content scene system 102 determines similarities between a content item and individual content items within a web access history of a user account. For instance, the content scene system 102 extracts feature vectors from the content items and compares the feature vectors within a vector space (e.g., by determining distances between the vectors) using a relevance prediction machine learning model. The content scene system 102 can determine higher relevance scores for content items that are more similar (e.g., whose vectors are closer in a vector space) to previously accessed content items. The content scene system 102 also determine higher relevance scores for content items that satisfy at least a threshold similarity (e.g., a threshold distance in vector space) relative to more previously accessed content items.

In some embodiments, the content scene system 102 selects or determines relevant content items (or content clusters) by identifying, based on topic data and/or focus data, one or more content clusters that correspond to topics relevant to a user account. To determine a topic relevant to a user account, in one or more embodiments, the content scene system 102 analyzes a web access history associated with the user account. More specifically, the content scene system 102 analyzes previously accessed content items (e.g., using a topic prediction machine learning model) to determine topics associated with the previously accessed content items within the web access history. In some cases, the content scene system 102 determines relevant topics as topics associated with at least a threshold number of previously accessed content items (e.g., within a threshold recency and/or with at least a threshold frequency) and/or as topics mentioned at least a threshold number of times (e.g., within a threshold recency) across the previously accessed content items of the web access history. Based on determining a topic relevant to a user account, the content scene system 102 can further compare topics of content items with the relevant topic (e.g., by determining distances in vector space).

In one or more embodiments, the content scene system 102 determines a relevance score for a content item (or a content cluster) in the form of a return visit likelihood score. More specifically, the content scene system 102 determines a return visit likelihood score as described above. Based on the relevance scores for content clusters and/or content items, the content scene system 102 further generates a suggested content collection 1012 for a user account. In particular, the content scene system 102 can selects a set of content items to include within the suggested content collection 1012. For instance, the content scene system 102 selects content items whose relevance scores satisfy a threshold relevance score. As another example, the content scene system 102 ranks content items according to relevance scores and selects a threshold number of top-ranked content items to include within the suggested content collection 1012. In some embodiments, the content scene system 102 determines relevance scores and/or generates suggested content collections using techniques described by Jongmin Baek et al. in U.S. patent application Ser. No. 17/815,478 cited above.

Figure 11:
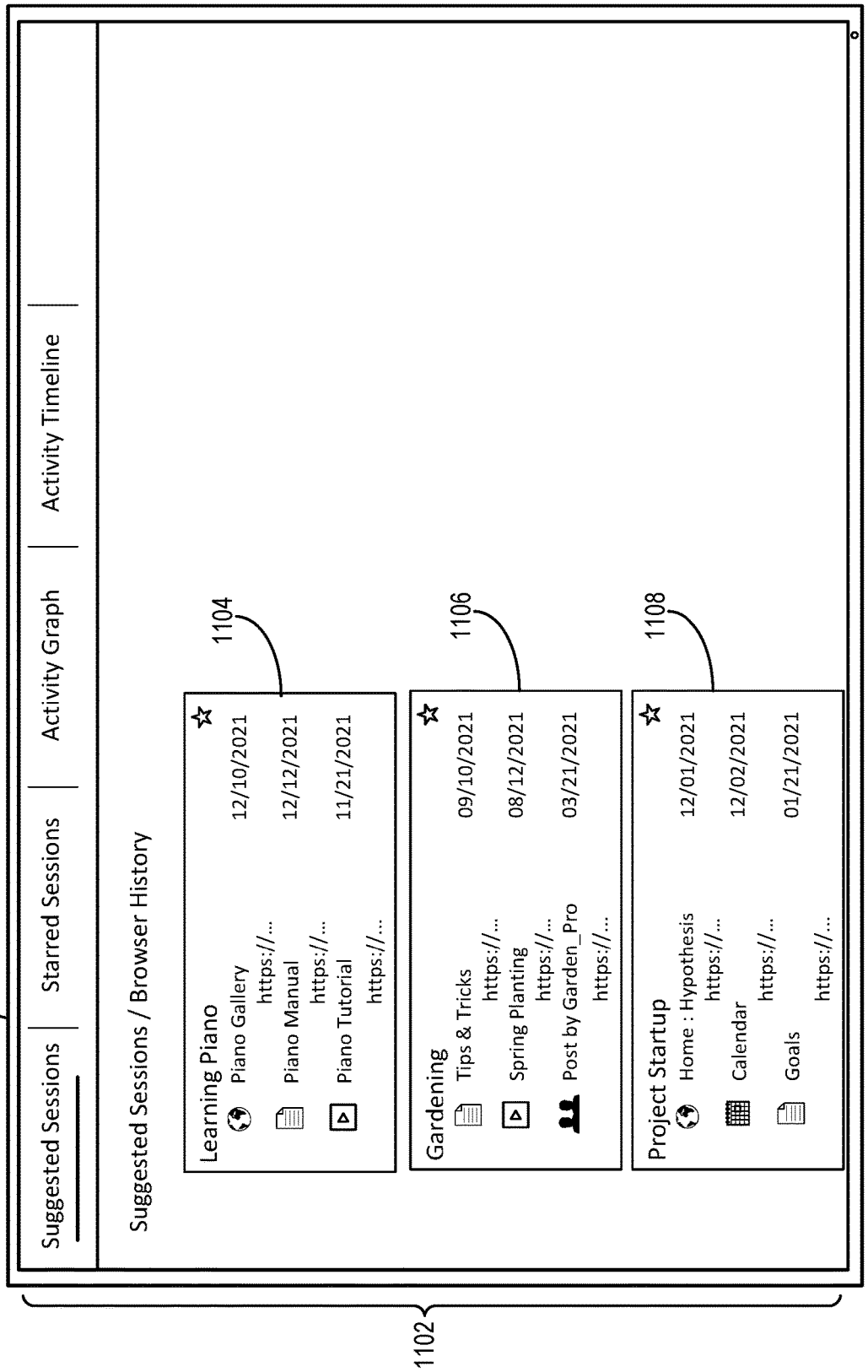
FIG. 11 illustrates an example suggested collection interface for suggested content collections in accordance with one or more embodiments.

As mentioned above, in certain described embodiments, the content scene system 102 generates and provides a collection creation element. In particular, the content scene system 102 provides a collection creation element that is selectable to create and store a new content collection from a suggested content collection (or from a web access history). FIG. 11 illustrates an example presentation of collection creation elements in accordance with one or more embodiments.

As illustrated in FIG. 11, the client device 108 displays or presents a suggested collection interface 1102. In particular, the suggested collection interface 1102 includes a set of collection creation elements, including the collection creation element 1104, the collection creation element 1106, and the collection creation element 1108. In some embodiments, the suggested collection interface 1102 can refer to a modified version of a web history interface that includes the collection creation elements instead of (or in addition to) a standard chronological listing of historical web activity. For instance, the content scene system 102 can organize a web activity history into collection creation elements, where elements for more relevant suggested content collections are listed higher up.

As shown, each of the collection creation elements represents a different suggested content collection that includes content items from one or more content clusters (e.g., relevant content items). In addition, the collection creation elements include selectable options to save the suggested content collection as a new content collection for the user account (e.g., the star icons for designated starred or saved collections). In some cases, the collection creation elements can also serve as content restore elements. For instance, based on a user interaction selecting the collection creation element (e.g., in a portion other than the save option), the content scene system 102 can access and provide each of the corresponding content items within the suggested collection (e.g., within respective browser tabs).

As shown, the content scene system 102 generates a first suggested collection for "Learning Piano" represented by the collection creation element 1104. The content scene system 102 also generates a second suggested collection for "Gardening" and a third suggested collection for "Project Startup." Within each of the collection creation elements, the content scene system 102 provides visual indications of content items pertaining to each of the topics. In some cases, the content scene system 102 automatically (e.g., without user interaction for prompting) generates the titles or topics for each of the collection creation elements. In these or other cases, the content scene system 102 receives user interaction to name the collection creation elements. Thus, based on receiving a user interaction to save a suggested content collection as a new content collection, the content scene system 102 can automatically generate a new folder or directory for the user account with the content management system 106 to match the corresponding title/topic of the collection creation element.

Figure 12:
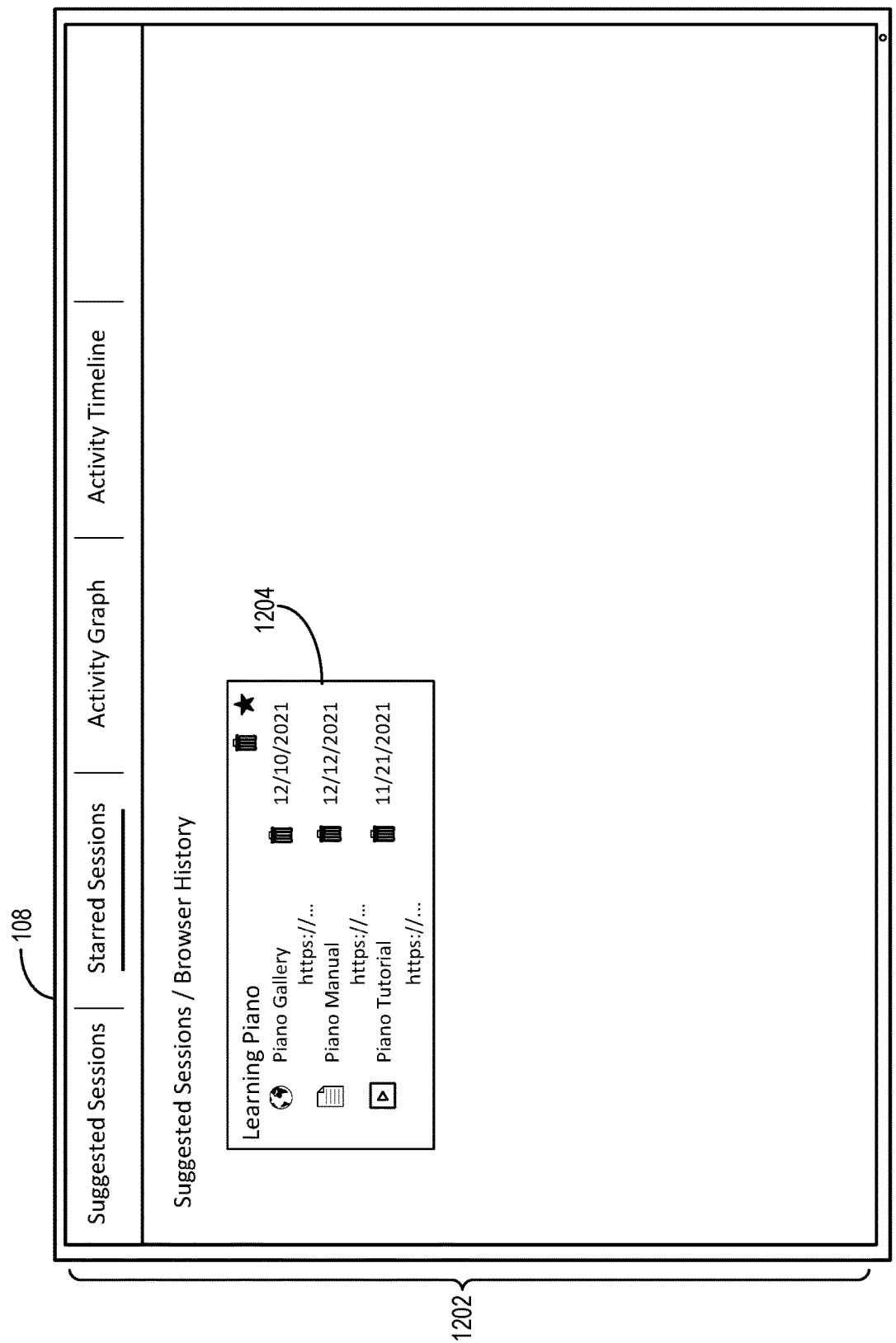
FIG. 12 illustrates an example saved collection interface for content collections saved from suggested content collections in accordance with one or more embodiments.

As mentioned, in one or more embodiments, the content scene system 102 saves content collections for a user account based on detecting an indication of user interaction with a collection creation element. In particular, the content scene system 102 can save content collections for a user account with the content management system 106 and can further provide saved collection elements for display within a web browser. FIG. 12 illustrates an example saved collection interface in accordance with one or more embodiments.

As illustrated in FIG. 12, the client device 108 displays or presents a saved collection interface 1202. The saved collection interface 1202 includes a saved collection element 1204. In some cases, the content scene system 102 provides the saved collection interface 1202 within a modified version of a web history interface of a web browser or within another application window. In addition, the content scene system 102 generates and provides the saved collection element 1204 for display within the saved collection interface 1202 (e.g., within a saved collection tab or a saved collection portion of a web history interface). For example, based on receiving an indication of a user interaction selecting the collection creation element 1104 from FIG. 11, the content scene system 102 generates the new content collection for the user account and provides the saved collection element 1204 for display on the client device 108.

In one or more embodiments, the content scene system 102 facilitates editing or modifying the saved content collection via edits made to the saved collection element 1204. For example, the content scene system 102 receives a user input to rename the saved collection element 1204, whereupon the content scene system 102 automatically renames the corresponding folder or directory for the content collection of the user account within the content management system 106. In some cases, the content scene system 102 also facilitates renaming individual content items within the saved collection element 1204. Based on renaming a content item within the saved collection element 1204, the content scene system 102 further modifies a corresponding filename (or browser tab label) for the content item renamed within the saved collection element 1204.

In addition, the content scene system 102 can provide selectable options to delete the content collection and/or to remove individual content items from the content collection. For instance, based on receiving an indication of user interaction selecting a delete option for a content item within the saved collection element 1204, the content scene system 102 can further delete or remove the corresponding content item from the content collection associated with the user account within the content management system 106.

Figure 13:
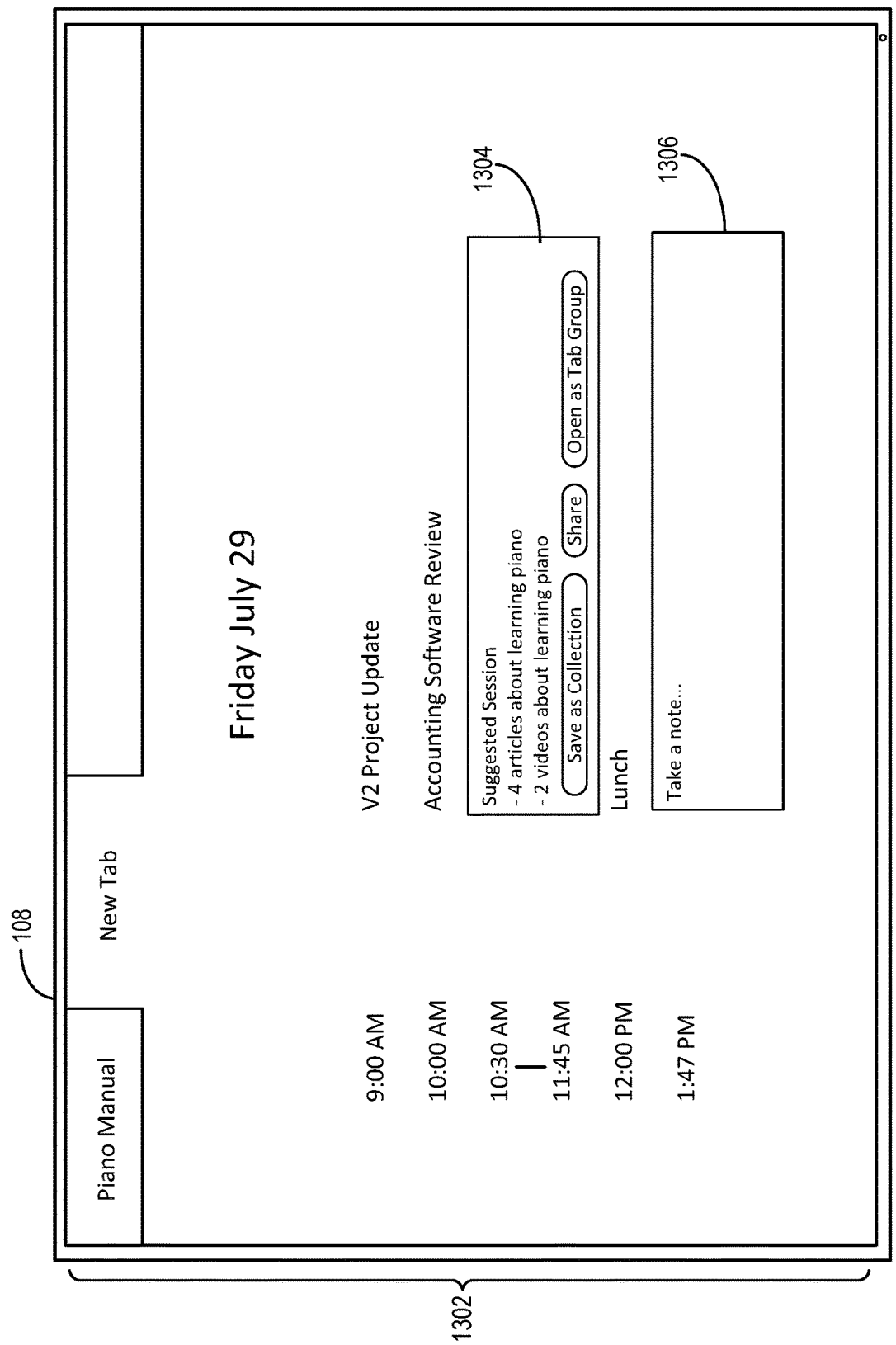
FIG. 13 illustrates an example smart homepage interface for presenting suggested content collections in accordance with one or more embodiments.

As mentioned above, in certain embodiments, the content scene system 102 provides a collection creation element within a smart homepage interface. In particular, the content scene system 102 generates a smart homepage interface displayable for new tabs of a web browser (e.g., before navigating to a URL) that includes a collection creation element for a user account. FIG. 13 illustrates an example smart homepage interface including a collection creation element in accordance with one or more embodiments.

As illustrated in FIG. 13, the client device 108 displays or presents a smart homepage interface 1302 that includes a timeline view for a calendar day associated with a user account. For instance, the content scene system 102 can generate and provide the smart homepage interface 1302 for display in a new tab of a web browser. Within the timeline view, the content scene system 102 provides indications of scheduled events, such as video calls, meetings, and appointments. In addition, the content scene system 102 provides indications of past actions that a user account has performed for previous hours of the day as well, including accessed content items, projects worked on, and/or video calls completed. Further, the content scene system 102 provides a current time element 1306 that represents a current time of day, where past events appear above the current time element 1306 and where future events appear below the current time element 1306. In some cases, the current time element 1306 is interactive to enter a note or create some other type of content (e.g., take a picture or link a content item) or interact with other user accounts directly from the smart homepage interface 1302.

As further illustrated in FIG. 13, the content scene system 102 generates and provides a collection creation element 1304 for display within the smart homepage interface 1302. More specifically, the content scene system 102 generates the collection creation element 1304 to represent or indicate relevant content items that a user account as previously accessed. Indeed, the content scene system 102 can place the collection creation element 1304 within the timeline view of the smart homepage interface 1302 at a location corresponding to when the user account accessed one or more of the content items indicated by the collection creation element 1304.

In some cases, the content scene system 102 generates the collection creation element 1304 to indicate a suggested content collection based on accesses of common-topic content items that occurred within a particular timeframe (e.g., within the same day or the same hour), even if the accesses of the common-topic content items occurred sporadically throughout the timeframe (e.g., one access at 9:00 am and another access at 11:00 am). As part of generating the collection creation element 1304 (or a suggested content collection), the content scene system 102 can identify certain interruptions in content browsing as part of generating a content cluster. For example, the content scene system 102 can determine that a break in time between accesses of common-topic content items occurred because of a scheduled meeting or an incoming video call and that, therefore, the interruption can be omitted or weighted less heavily than a different shift in topic-specific focus. As further shown, the content scene system 102 can provide selectable options to save the suggested content collection, to share the suggested content collection (e.g., with one or more other user accounts of the content management system 106), and/or to open the indicated content items within respective tabs in a tab group (e.g., "Open as Tab Group").

Figure 14:
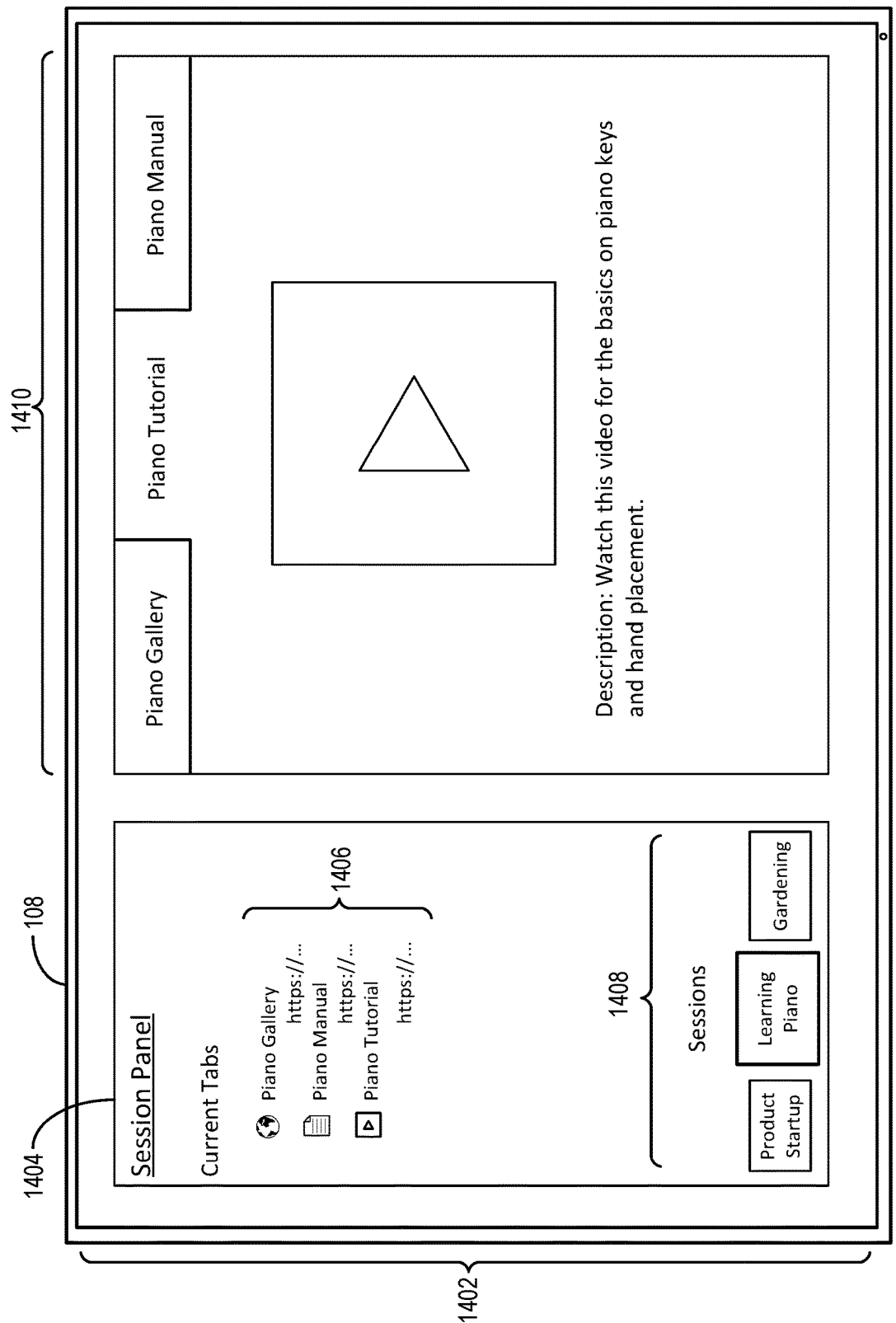
FIG. 14 illustrates an example session panel for navigating between content collections in accordance with one or more embodiments.

In one or more embodiments, the content scene system 102 provides a session panel interface for navigating among different content collections (e.g., suggested content collections and/or saved content collections). In particular, the content scene system 102 provides a session panel interface that includes selectable options for opening tabs to access content items, as well as selectable options to switch between different content collections that each have their own content items. FIG. 14 illustrates an example session panel interface in accordance with one or more embodiments.

As illustrated in FIG. 14, the client device 108 displays or presents a desktop interface 1402 that includes a session panel interface 1404 and a browser interface 1410. Within the session panel interface 1404, the content scene system 102 provides a visual indication of content items within a particular (e.g., selected or saved) content collection. Specifically, the content scene system 102 receives a selection of a suggested or saved content collection from a collection carousel 1408 that includes a number of collection elements selectable to view the constituent content items within each content collection (e.g., "Product Startup," "Learning Piano," and "Gardening").

Based on the selection of the "Learning Piano" collection, for instance, the content scene system 102 provides a collection tab portion 1406 of the session panel interface 1404 to present selectable options for content items within the collection. For example, in response to the selection of the "Learning Piano" collection from the collection carousel 1408, the content scene system 102 accesses or opens each of the content items within the corresponding collection within respective tabs, as shown in the browser interface 1410. In some embodiments, the content scene system 102 opens or accesses the content items within respective tabs in response to receiving selections from the collection tab portion 1406.

In at least one embodiment, the content scene system 102 creates new content collections from the session panel interface 1404. To elaborate, the content scene system 102 can provide the collection tab portion 1406 to indicate a set of topic-related tabs currently open in the browser interface 1410 (e.g., excluding or omitting open tabs unrelated to the topic). In some cases, the content scene system 102 provides multiple collection tab portions that each correspond to a different topic. For instance, if the browser interface 1410 includes ten open tabs, where five of the tabs relate to learning piano and five of the tabs relate to the topic of Hawaii, the content scene system 102 can provide two collection tab portions for the different sets of topic-related tabs open in the browser. In addition, the content scene system 102 can provide a selectable save option for each of the collection tab portions. Thus, the content scene system 102 can save and create a new content collection to include content items corresponding to tabs open within the browser interface 1410.

In some embodiments, the content scene system 102 can open tabs within the browser interface 1410 based on user interaction with the collection carousel 1408. More particularly, the content scene system 102 can receive a user interaction selecting a collection element from the collection carousel 1408. In response to the user interaction, the content scene system 102 can update the collection tab portion 1406 to reflect the content items of the selected collection element and/or can automatically open tabs within the browser interface 1410 to present or provide each of the constituent content items within the collection.

FIGS. 9-14, the corresponding text, and the examples provide a number of different systems and methods for generating and providing content collections from content clusters. In addition to the foregoing, implementations can also be described in terms of flowcharts comprising acts and steps in a method for accomplishing a particular result. For example, FIG. 15 illustrates an example series of acts for generating and providing content collections from content clusters.

Figure 15:
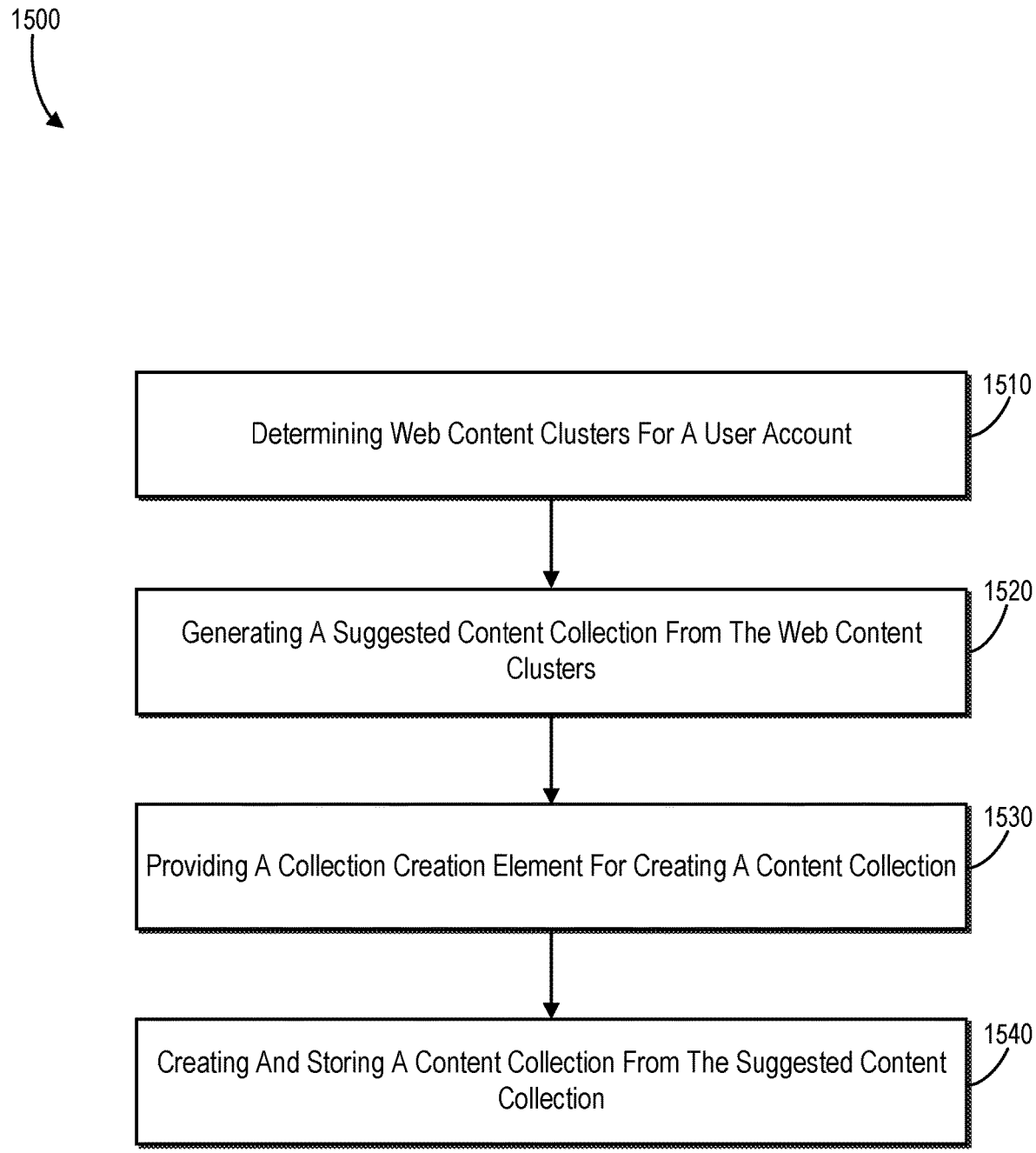
FIG. 15 illustrates an example flowchart of a series of acts for generating and storing content collections from content clusters in accordance with one or more embodiments.

While FIG. 15 illustrates acts according to certain implementations, alternative implementations may omit, add to, reorder, and/or modify any of the acts shown in FIG. 15. The acts of FIG. 15 can be performed as part of a method. Alternatively, a non-transitory computer readable medium can comprise instructions, that when executed by one or more processors, cause a computing device to perform the acts of FIG. 15. In still further implementations, a system can perform the acts of FIG. 15.

As illustrated in FIG. 15, the series of acts 1500 may include an act 1510 of determining web content clusters for a user account. In particular, the act 1510 can involve determining a plurality of web content clusters by grouping web content items according to topic-specific access patterns associated with a user account of a content management system. In addition, the series of acts 1500 can include an act 1520 of generating a suggested content collection from the web content clusters. For example, the act 1520 can involve generating a suggested content collection comprising a set of web content items from one or more of the plurality of web content clusters associated with a topic relevant to the user account. Additionally, the series of acts 1500 can include an act 1530 of providing a collection creation element for creating a content collection. Specifically, the act 1530 can involve providing, for display on a client device associated with the user account, a collection creation element selectable to create a content collection for the user account from the suggested content collection. Further, the series of acts 1500 can include an act 1540 of creating and storing a content collection from the suggested content collection. Particularly, the act 1540 can involve, in response to a user interaction selecting the collection creation element, creating and storing the content collection within the content management system for the user account.

In some embodiments, the series of acts 1500 can include an act of determining the plurality of web content clusters by grouping the web content items accessed by the user account by: determining, from a web access history of the user account, access patterns of the user account navigating web content items associated with one or more topics and grouping the web content items from the web access history of the user account into web content clusters according to the access patterns. In these or other embodiments, the series of acts 1500 can include an act of generating the suggested content collection by: determining relevance scores for the plurality of web content clusters in relation to the user account, comparing the relevance scores for the plurality of web content clusters with a relevance score threshold, and selecting, from a subset of web content clusters that satisfy the relevance score threshold, a set of web content items to include within the suggested content collection.

In at least one embodiment, the series of acts 1500 includes an act of determining the relevance scores by: identifying, from a web access history of the user account, accesses of web content items within a web content cluster relating to a certain topic, determining, from web access histories of one or more additional user accounts of the content management system in collaboration with the user account, accesses of the web content items within the web content cluster relating to the certain topic, and generating a relevance score for the web content cluster relating to the certain topic from the accesses by the user account and the accesses by the one or more additional user accounts in collaboration with the user account.

Additionally, the series of acts 1500 can include an act of generating the suggested content collection by: identifying one or more web content clusters from the plurality of web content clusters that are associated with a topic relevant to the user account, ranking web content items within the one or more web content clusters associated with a topic relevant to the user account according to relevance in relation to the user account, and selecting, from the one or more web content clusters associated with a topic relevant to the user account, a set of web content items to include within the suggested content collection according to the ranking of the web content items.

In certain embodiments, the series of acts 1500 can include an act of providing the collection creation element by modifying a web history interface of a web browser on the client device by: arranging, within the web history interface, a set of web access history events corresponding to the set of web content items within the suggested content collection into a shared interface portion and providing, within the shared interface portion, a selectable option to create the content collection by including the set of web content items corresponding to the set of web access history events within the content collection.

The series of acts 1500 can also include an act of providing the collection creation element by: providing, for display within a web browser on the client device, a smart homepage interface depicting a timeline of scheduled events associated with the user account and modifying the smart homepage interface to include the collection creation element at an interface location corresponding to a time when the user account accessed at least one web content item within the suggested content collection.

Storing and Restoring Desktop Scene Layouts

Figure 16:
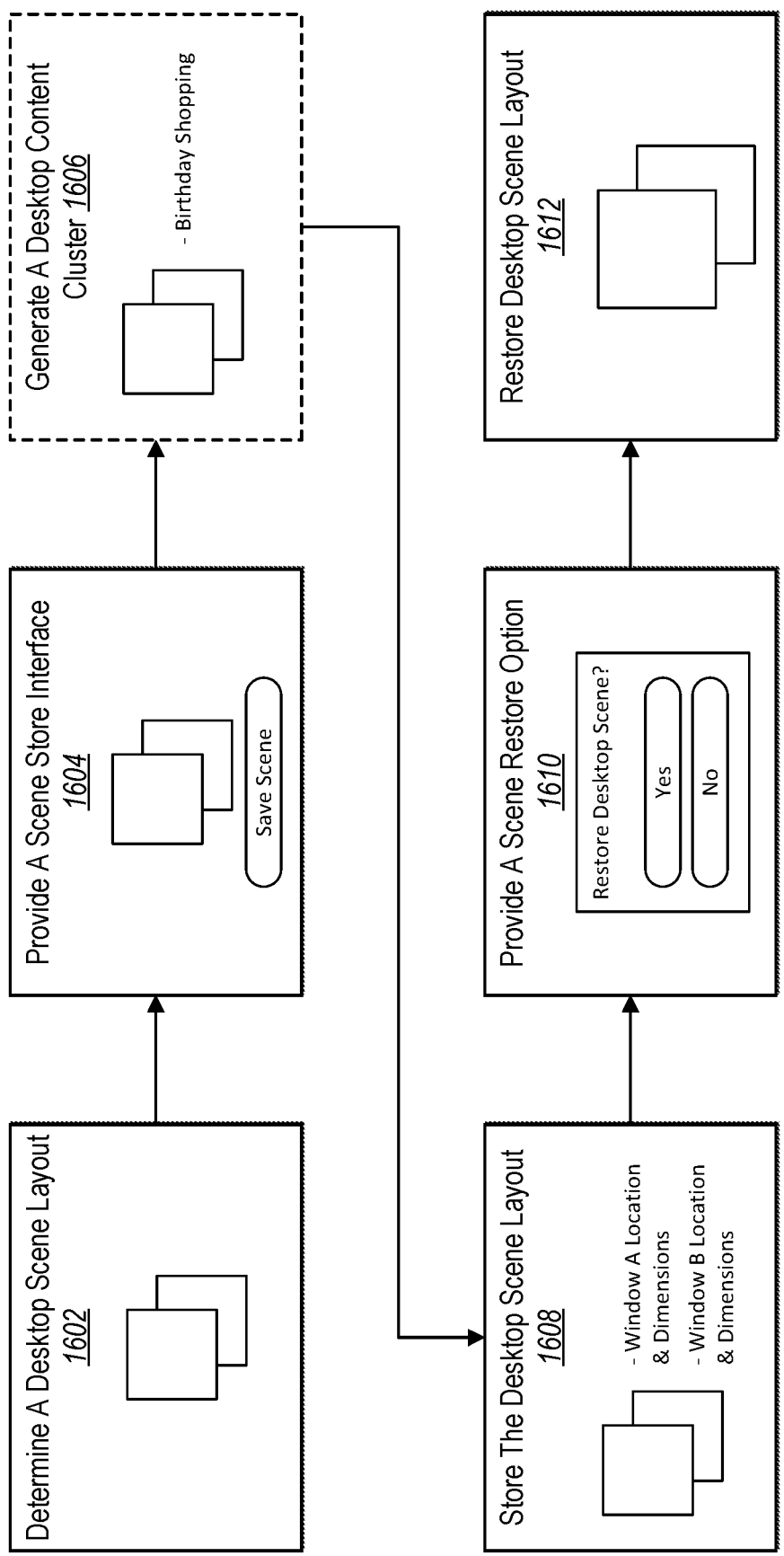
FIG. 16 illustrates an example overview of storing and restoring desktop scene layouts in accordance with one or more embodiments.

As mentioned above, in certain described embodiments, the content scene system 102 can store and restore desktop scene layouts. In particular, the content scene system 102 determines desktop scene layouts that indicate or define arrangements of application windows, including their locations and dimensions within a desktop interface. Thus, not only can the content scene system 102 "jump" between focus sessions by quickly accessing and providing (groups of) content items within content collections, as described above, but the content scene system 102 can also quickly "jump" between interface layouts for presenting the various content items as well. FIG. 16 illustrates an example overview for storing and restoring desktop scene interfaces in accordance with one or more embodiments. Additional detail regarding the various acts of FIG. 16 is provided thereafter with reference to subsequent figures.

As illustrated in FIG. 16, the content scene system 102 can perform an act 1602 to determine a desktop scene layout. More specifically, the content scene system 102 can determine an arrangement of application windows displayed in a desktop interface, including locations and dimensions of the application windows. For example, the content scene system 102 accesses application APIs and/or operating system data to determine locations and dimensions for application windows presented in a desktop interface.

In addition, the content scene system 102 performs an act 1604 to provide a scene store interface. In particular, the content scene system 102 provides a notification or a selectable option for display within the desktop interface of a client device whereby a user can save a desktop scene layout. For instance, the content scene system 102 detects a user input (e.g., a keyboard shortcut or hotkey) to save a desktop scene layout and the content scene system 102 provides a save option in response to the user input.

As further illustrated in FIG. 16, in some embodiments the content scene system 102 performs an act 1606 to generate a desktop content cluster. In particular, the content scene system 102 generates a desktop content cluster by clustering content items depicted or presented within application windows (or tabs) on a client device. For instance, the content scene system 102 utilizes the clustering techniques described above to generate content clusters specifically for content items presented within application windows on a client device. In some cases, the content scene system 102 clusters content items of application windows based on activity patterns associated with the particular application windows, where windows that are often used together (e.g., with frequenting focus switching back and forth between them) are more likely to be grouped together. As shown, the content scene system 102 generates a "Birthday Shopping" desktop content cluster.

Additionally, the content scene system 102 performs an act 1608 to store the desktop scene layout. To elaborate, the content scene system 102 receives a user interaction with a scene store interface to select a scene store option. In response, the content scene system 102 stores the desktop scene layout including the locations and dimensions of each of the application windows presented within a desktop interface of a client device.

In some embodiments, based on performing the act 1608, the content scene system 102 can further close application windows saved as part of a stored desktop scene layout. To elaborate, the content scene system 102 can preserve (or avoid the expense of) the processing power and memory required to maintain application windows displayed on a device by automatically closing applications (and their windows) that are part of a stored desktop scene layout. For instance, in response to storing a desktop scene layout, the content scene system 102 can close the application windows stored as part of the desktop scene layout to free up computing resources for other tasks. Thus, rather than expending computing resources by maintaining open application windows once the desktop scene layout is stored, the content scene system 102 can preserve the computing resources by closing the stored application windows.

Along these lines, the content scene system 102 can likewise preserve computing resources by closing applications (and their application windows) that are not part of a desktop cluster. For instance, the content scene system 102 can determine or generate a desktop cluster by determining topic-specific patterns for application windows based on topic data and focus data, as described above. The content scene system 102 can thus determine clusters of application windows to save as desktop scene layouts, and the content scene system 102 can close other application windows that are not part of a desktop cluster. Thus, the content scene system 102 can preserve computing resources by closing application windows that are not part of a desktop cluster and are therefore less likely to be used or receive interactions. Additional detail regarding determining and storing application windows for desktop clusters is provided below in relation to FIG. 23.

As further illustrated in FIG. 16, the content scene system 102 performs an act 1610 to provide a scene restore option. In particular, the content scene system 102 provides a scene restore option to restore a desktop scene for display on a client device. For instance, the content scene system 102 the content scene system 102 receives a user input (e.g., a keyboard shortcut or hotkey) to restore a stored desktop scene layout, and the content scene system 102 provides the scene restore option for display. In some cases, the content scene system 102 automatically (e.g., without a user input to prompt) provides a scene restore option in response to detecting a new user account login, a powerup of a client device, or a transition from one focus session to another (e.g., changing from working on a first project to a second project).

Further, the content scene system 102 performs an act 1612 to restore a desktop scene layout. More specifically, the content scene system 102 receives a user interaction selecting an option to restore a desktop scene layout. In response, the content scene system 102 restores the desktop scene layout by opening and/or arranging application windows for display on a client device to match locations and dimensions as stored for the desktop scene layout. In some cases, the content scene system 102 further closes and/or rearranges one or more currently open application windows as part of the restoring action. For instance, the content scene system 102 identifies one currently open application window that is part of a desktop scene to be restored, and the content scene system 102 thus arranges this window according to its stored arrangement. The content scene system 102 can further identify another currently open application window that is not part of the stored desktop scene layout, and the content scene system 102 can close this application window as part of restoring the scene layout. By storing and restoring desktop scene layouts, the content scene system 102 can quickly and efficiently navigate between application windows of different focus sessions with few user interactions or device inputs.

Figure 17:
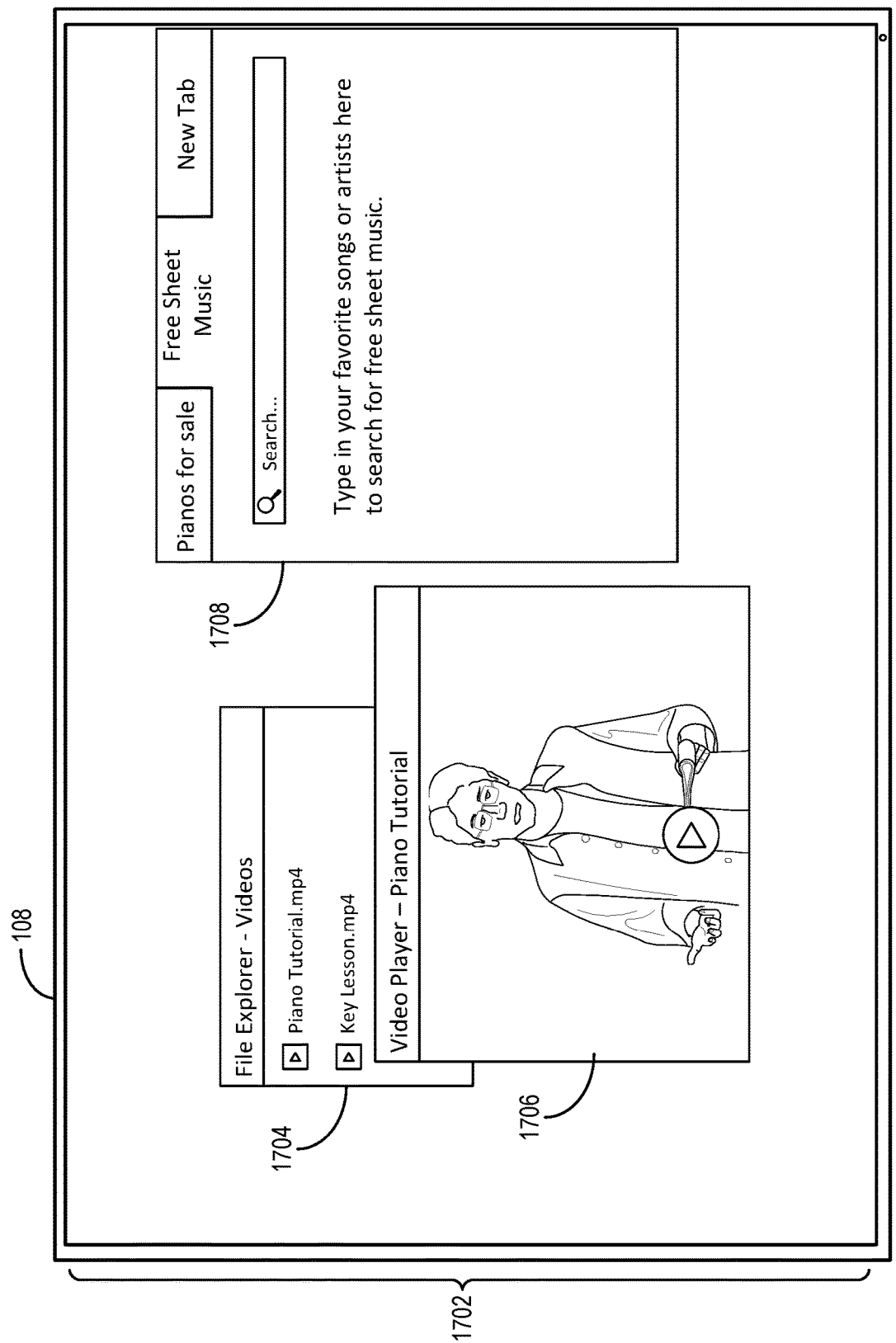
FIG. 17 illustrates an example desktop scene layout for an arrangement of application windows in accordance with one or more embodiments.

As mentioned above, in certain described embodiments, the content scene system 102 determines a desktop scene layout. In particular, the content scene system 102 determines an arrangement of application windows displayed within a desktop interface of a client device, including locations and dimensions of the application windows. FIG. 17 illustrates an example desktop scene layout in accordance with one or more embodiments.

As illustrated in FIG. 17, the client device 108 displays or presents a desktop interface 1702. The desktop interface 1702 includes three application windows, application window 1704 for a file explorer application, application window 1706 for a video player application, and application window 1708 for a web browser application. The content scene system 102 analyzes the application windows, accesses operating system data, and/or accesses application APIs to determine an arrangement of the application windows within the desktop interface 1702.

Specifically, the content scene system 102 determines locations of the application windows. For example, the content scene system 102 determines a coordinate location for the application window 1704. In some cases, the content scene system 102 determines a coordinate location for a corner (e.g., an upper left corner, a lower left corner, an upper right corner, or a lower right corner) of the application window 1704 within the desktop interface 1702. In other cases, the content scene system 102 determines a coordinate location of a center point of the application window 1704. In certain embodiments, the content scene system 102 determines coordinate locations by determining an x-coordinate value (e.g., in pixels) and a y-coordinate value (e.g., in pixels). The content scene system 102 likewise determines locations for the application window 1706 and the application window 1708 as well.

In addition to determining the location for the application window 1704, the content scene system 102 also determines dimensions of the application window 1704. More specifically, the content scene system 102 determines a height (e.g., a y-axis value) and a width (e.g., an x-axis value) for the application window 1704. For example, the content scene system 102 determines a number of pixels from a top of the application window 1704 to the bottom of the application window 1704. Similarly, the content scene system 102 also determines a number of pixels from a left edge of the application window 1704 to a right edge of the application window 1704. The content scene system 102 likewise determines dimensions for the application window 1706 and the application window 1708 as well.

In one or more embodiments, the content scene system 102 also determines applications associated with the application windows presented within the desktop interface 1702. For example, the content scene system 102 determines that the application window 1704 is for the File Explorer application, that the application window 1706 is for the Video Player application, and that the application window 1708 is for a web browser application.

As part of determining the arrangement for the desktop scene layout, the content scene system 102 can further determine depths or layers associated with application windows. More specifically, the content scene system 102 can determine which application windows are overlapping which other application windows. As shown in FIG. 17, for instance, the content scene system 102 determines that the application window 1706 is in a layer or depth above the application window 1704 and is overlapping a portion of the application window 1704.

In certain embodiments, as part of determining a desktop scene layout, the content scene system 102 not only determines an arrangement of application windows but further determines arrangements of digital content within the application windows. To elaborate, the content scene system 102 can determine that the application window 1704 is presenting a Videos folder that includes a couple of content items stored within the folder. The content scene system 102 can also determine which content items are presented within the Videos folder as well as the order or arrangement of the content items within the folder as presented.

In addition, the content scene system 102 determines that the application window 1706 is presenting a Piano Tutorial video. In some cases, the content scene system 102 determines a timestamp or a location within the video at a point when the content scene system 102 stores or saves a desktop scene layout. Further, the content scene system 102 determines an arrangement of digital content presented within the application window 1708. Specifically, the content scene system 102 determines that three tabs are open in the application window 1708, a Pianos for Sale tab, a Free Sheet Music tab, and a New Tab. The content scene system 102 can further analyze the content of each tab to determine its locations and dimensions. For instance, the content scene system 102 can determine that the Pianos for Sale tab is on the left, the Free Sheet Music tab is in the middle, and the New Tab is on the right. The content scene system 102 can further determine that the Free Sheet Music tab is currently active (e.g., viewed in the foreground) while the other two tabs are inactive. In some embodiments, the content scene system 102 determines locations and dimensions for content items (or portions of digital content) presented within various application windows.

Figure 18:
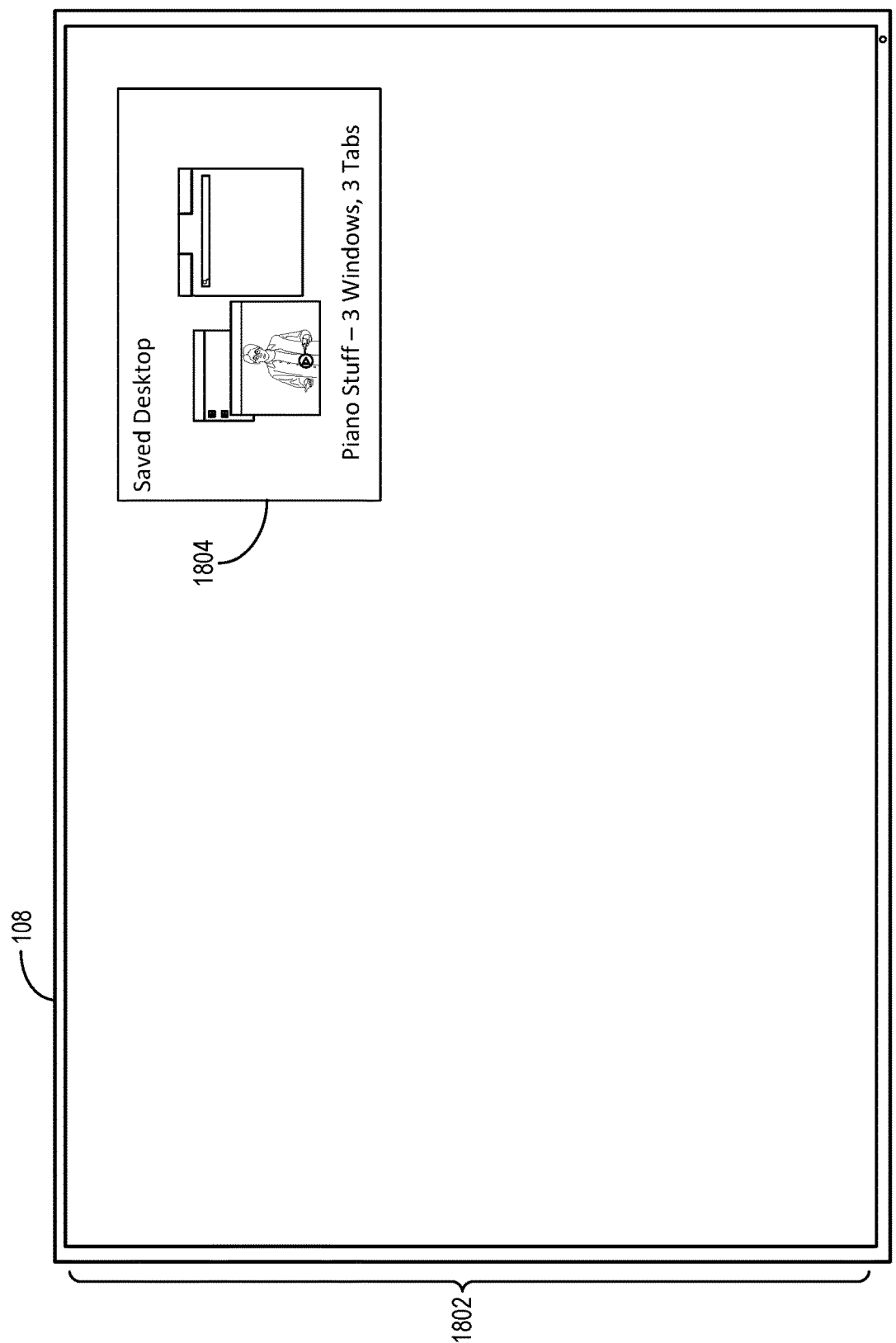
FIG. 18 illustrates an example stored desktop element for a stored desktop scene layout in accordance with one or more embodiments.

As mentioned above, in certain embodiments, the content scene system 102 stores a desktop scene layout. In particular, the content scene system 102 stores a desktop scene layout that defines an arrangement of application windows presented in a desktop interface. FIG. 18 illustrates an example stored desktop scene layout in accordance with one or more embodiments.

As illustrated in FIG. 18, the client device 108 presents or displays a desktop interface 1802. Within the desktop interface 1802, the content scene system 102 provides a stored desktop element 1804 that indicates or represents a stored desktop scene layout. For instance, the content scene system 102 takes a snapshot to store a desktop scene layout in response to a keyboard shortcut or a hotkey input. In some cases, the content scene system 102 provides a selectable option to save a desktop scene layout in response to a keyboard shortcut or hotkey. Based on storing a desktop scene layout, the content scene system 102 provides the stored desktop element 1804 to indicate a stored arrangement of application windows.

As shown, the stored desktop element 1804 indicates three application windows, where one of the application windows is a browser with three open tabs. The content scene system 102 can further indicate which application types (or application names) correspond to which application windows, along with the relative positioning and sizing of each of the application windows of the stored desktop scene layout. In some embodiments, the content scene system 102 further generates (or receives an input defining) a name for the desktop scene layout based on the topic data and/or the focus data of the content items within the various application windows. For instance, the content scene system 102 generates a name of "Piano Stuff" for the stored desktop scene layout.

Figure 19:
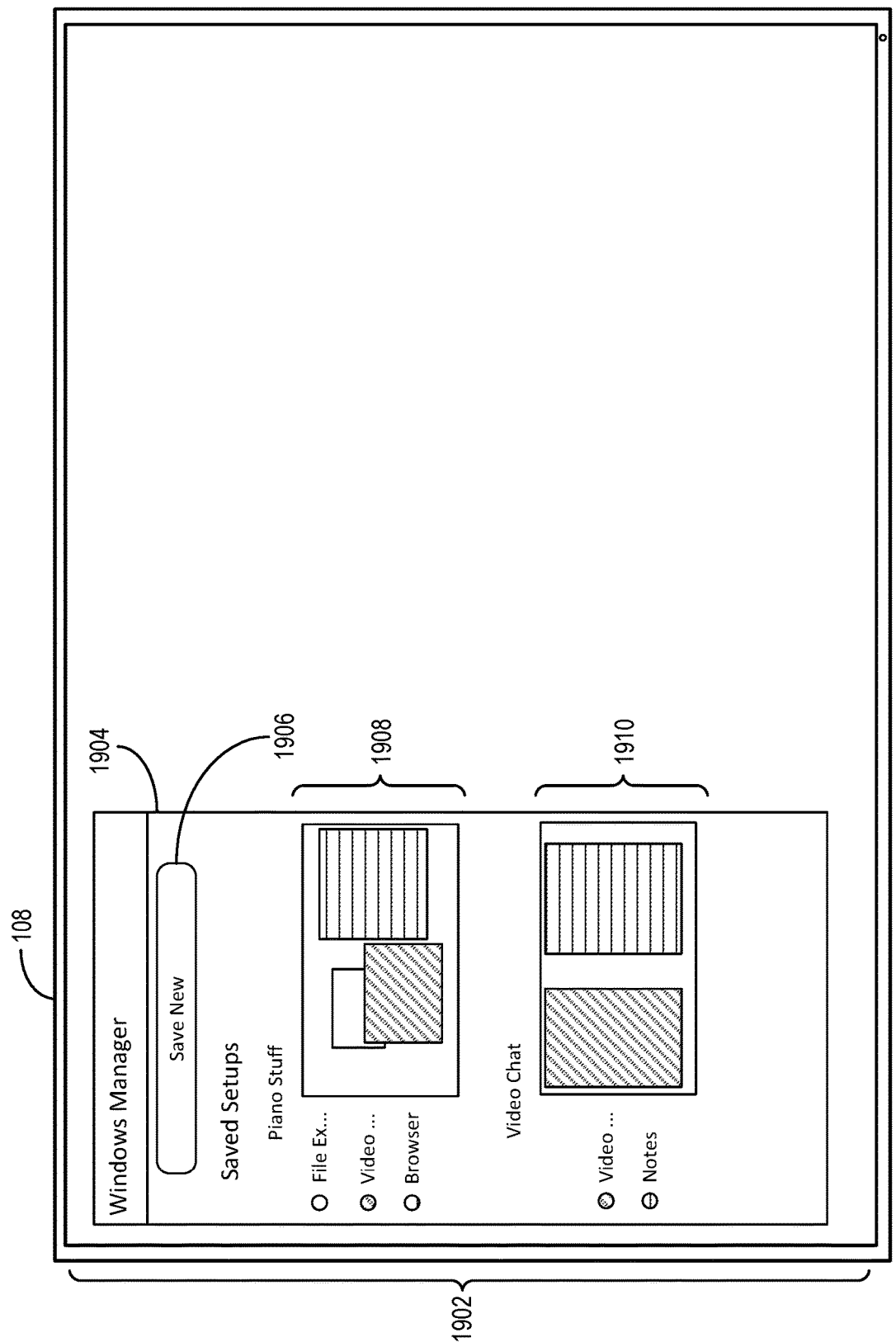
FIG. 19 illustrates an example desktop layout manager for modifying and storing desktop scene layouts in accordance with one or more embodiments.

In one or more embodiments, the content scene system 102 provides a desktop layout manager for display on a client device. In particular, in response to an input to save a desktop scene layout, the content scene system 102 provides a desktop layout manager for saving and defining a desktop scene layout. FIG. 19 illustrates an example desktop layout manager in accordance with one or more embodiments.

As illustrated in FIG. 19, the client device 108 presents or displays a desktop interface 1902 that includes a desktop layout manager 1904. Within the desktop layout manager 1904, the content scene system 102 provides tools and options for defining or modifying stored desktop scene layouts as well as for saving new desktop scene layouts. For example, the content scene system 102 provides visualizations of stored desktop scene layouts, such as the desktop scene layout 1908 and the desktop scene layout 1910. The content scene system 102 provides titles or topics for of the desktop scene layouts (e.g., "Piano Stuff" and "Video Chat") as well as indications of which applications are open and in which application windows. As shown, the content scene system 102 further indicates the arrangements of the application windows for each of the stored desktop scene layouts.

Within the desktop layout manager 1904, the content scene system 102 can receive user interaction to manipulate or edit stored desktop scene layouts. For example, the content scene system 102 can receive user interaction to move (e.g., click and drag) a miniature version of an application window within the desktop scene layout 1908 to relocate the window relative to the others (or to change the depth/layer of the window raise it above others or lower it below). The content scene system 102 can also select which application windows to store (or exclude from storing) as part of a desktop scene layout. For instance, the content scene system 102 can receive user interaction to select or deselect application windows within stored desktop scene layouts. Thus, based on edits made within the desktop layout manager 1904, the content scene system 102 can modify the corresponding stored desktop scene layouts in kind to reflect the changes.

In some cases, the content scene system 102 provides the desktop layout manager 1904 in response to an input or a request to store a desktop scene layout. From the desktop layout manager 1904, the content scene system 102 can receive a selection of the option 1906 to save a new desktop scene layout. In response, the content scene system 102 can provide a new layout manager for defining a new desktop scene layout.

Figure 20:
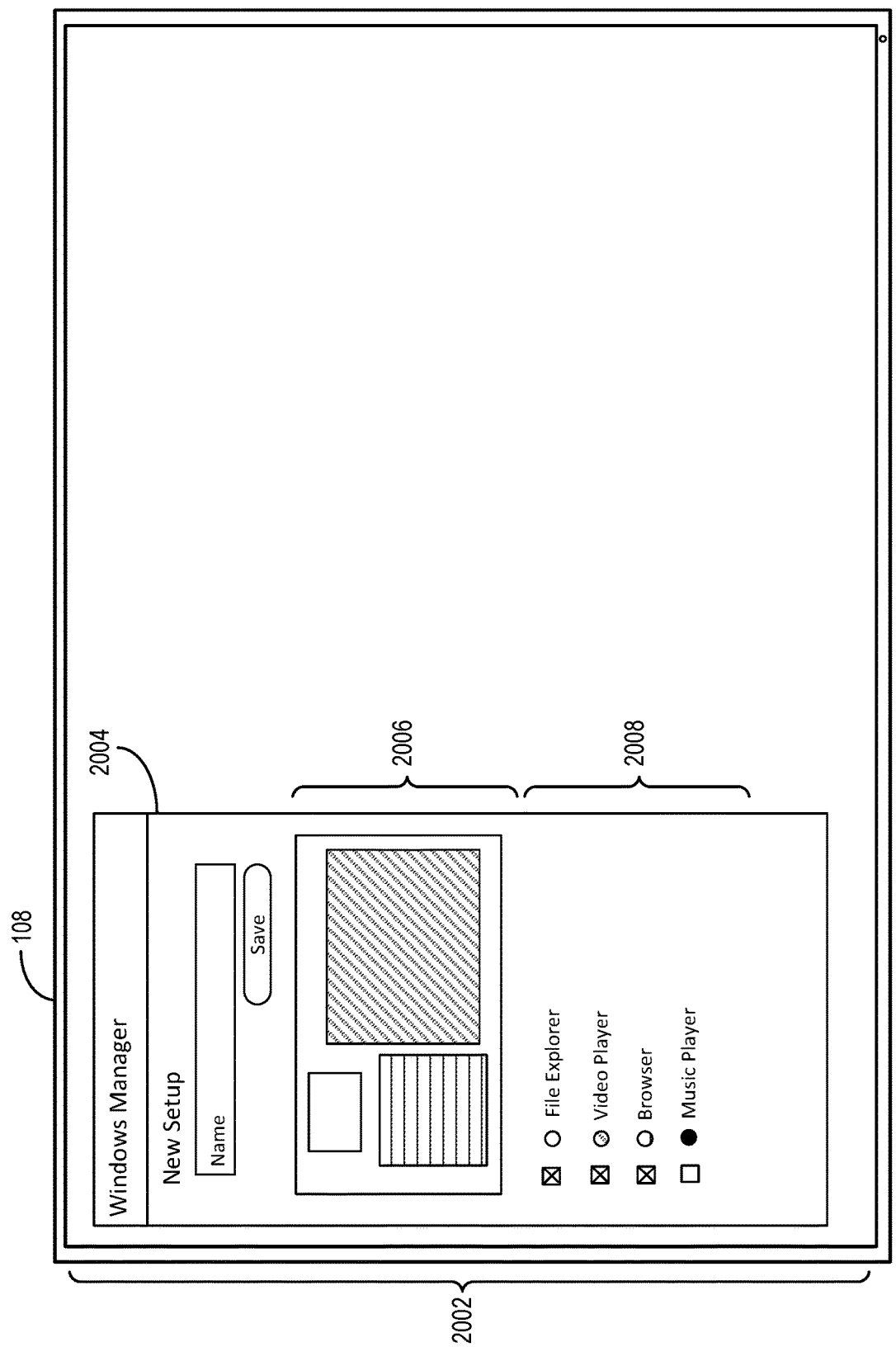
FIG. 20 illustrates an example new layout manager for generating and storing a desktop scene layout in accordance with one or more embodiments.

As just mentioned, the content scene system 102 can provide a new layout manager for creating a new desktop scene layout to store. In particular, the content scene system 102 can provide the new layout manager in response to a selection of the option 1906. FIG. 20 illustrates an example new layout manager in accordance with one or more embodiments.

As illustrated in FIG. 20, the client device 108 presents or displays a desktop interface 2002 that includes a new layout manager 2004. Within the new layout manager 2004, the content scene system 102 provides options for defining or customizing the desktop scene layout. Specifically, the content scene system 102 provides an option to ender a name for the new desktop scene layout. In addition, the content scene system 102 provides an arrangement element 2006 that is interactive to select and arrange (e.g., click and drag) different miniature versions of application windows, resize the miniature application windows, and change depths/layers of miniature application windows for defining a desktop scene layout. As shown, the content scene system 102 can provide colors, shading, or patterns to distinguish between different application windows or application windows of different types or computer programs/applications.

In some cases, the new layout manager 2004 includes a predefined template for application windows. For example, the content scene system 102 generates an application window template based on activity patterns with application windows (e.g., from the user account and/or other user accounts) and/or based on types of content depicted within the application windows. In some cases, the content scene system 102 generates different templates based on different types of application windows. In one or more embodiments, the content scene system 102 recognizes common arrangements of application windows for certain application types (e.g., browsers or document viewers or photo editors) and generates templates based on the common arrangements.

Additionally, the content scene system 102 provides a window selection portion 2008 whereby a user can select which application windows presented within a desktop interface to store as part of the desktop scene layout. As shown, the content scene system 102 receives selections (via checkboxes) of three application windows to include within a desktop scene layout, while excluding a fourth (e.g., "Music Player"). Based on receiving a selection of the "Save" option, the content scene system 102 further saves a desktop scene layout according to the parameters defined via the new layout manager 2004.

Figure 21A:
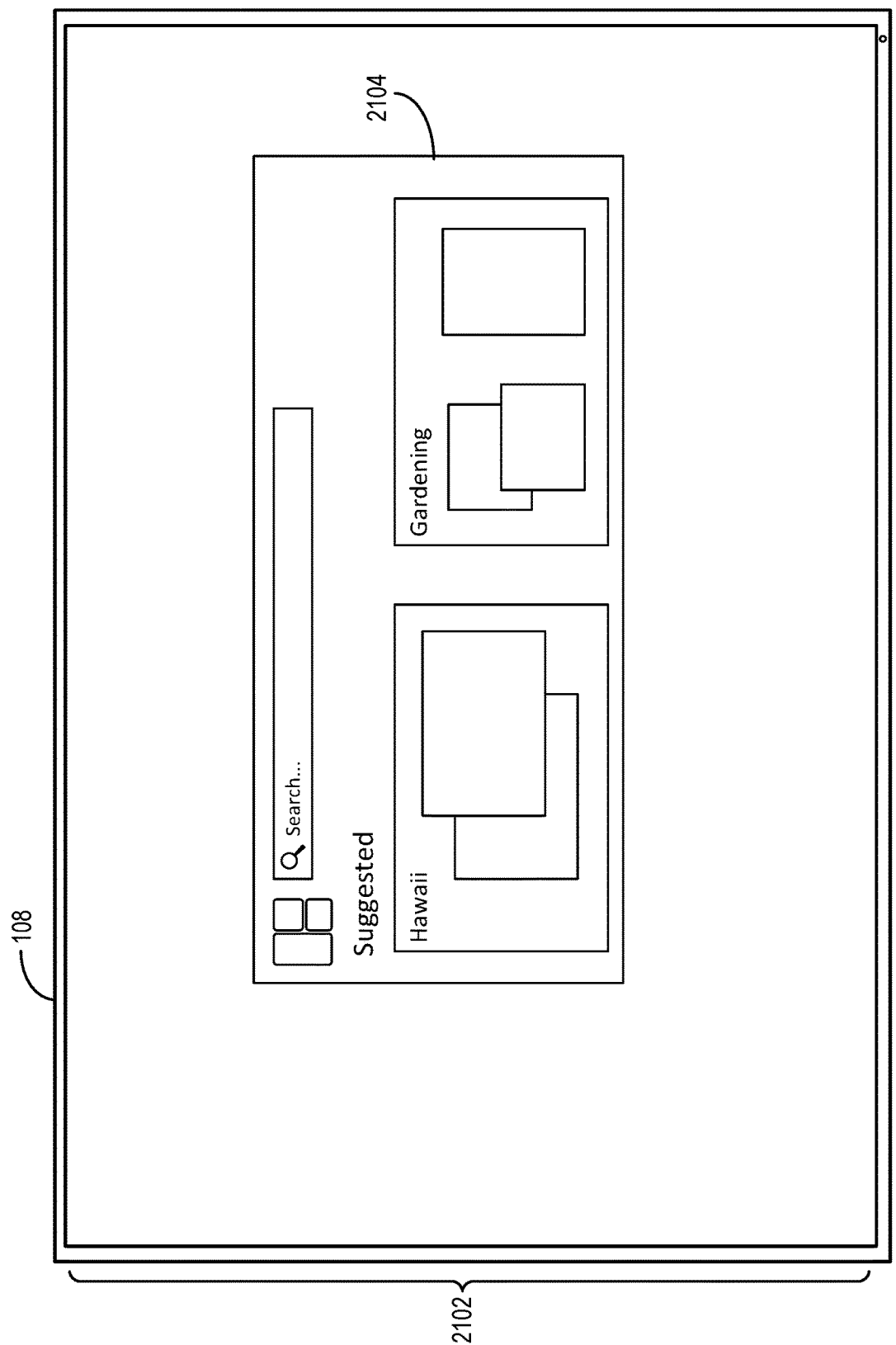
FIGS. 21A-21B illustrate example layout search interfaces for searching for stored desktop scene layouts in accordance with one or more embodiments.
Figure 21B:
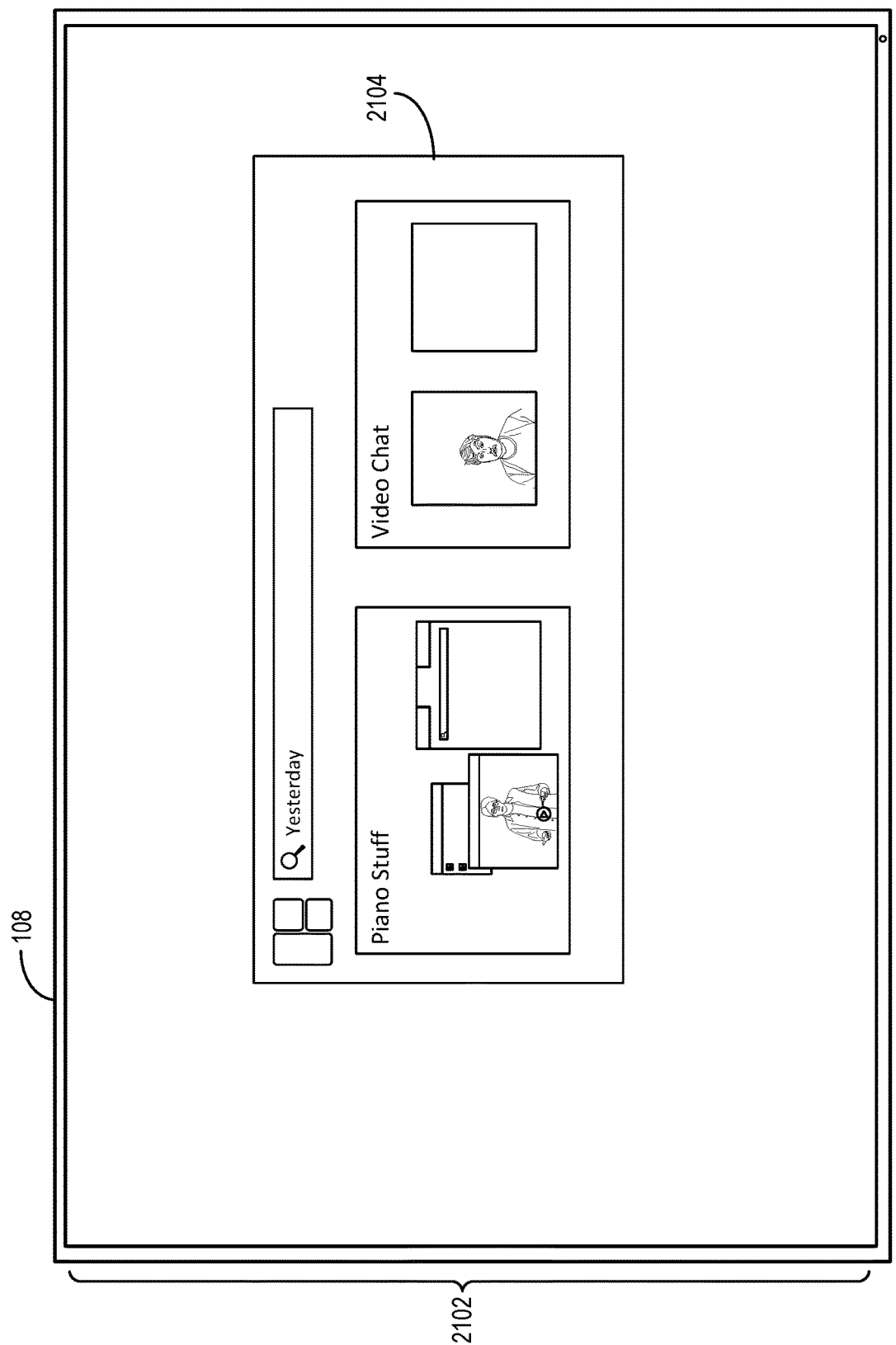

In at least one embodiment, the content scene system 102 enables searching for stored desktop scene layouts. In particular, the content scene system 102 can provide a layout search interface for searching for stored desktop layouts to restore within a desktop interface. FIGS. 21A-21B illustrate example layout search interfaces in accordance with one or more embodiments.

As illustrated FIG. 21A, the client device 108 presents or displays a desktop interface 2102 that includes a layout search interface 2104. As shown within the layout search interface 2104, the content scene system 102 generates and provides suggested content clusters or suggested desktop content clusters. Specifically, the content scene system 102 generates content clusters as described herein and/or generates desktop content clusters as described herein (e.g., in relation to FIG. 23). In addition, the content scene system 102 provides selectable elements for suggesting the content clusters or the desktop content clusters. In some cases, based on determining that no query has yet been entered into the search bar, the content scene system 102 generates and provides suggested (desktop) content clusters for a user account based on content items presented within application windows.

In one or more embodiments, the content scene system 102 provides access to content items within a suggested (desktop) content clusters. In particular, the content scene system 102 receives a user interaction selecting a suggested (desktop) content cluster. In response, the content scene system 102 accesses and provides the content items included within the suggested (desktop) content cluster. For example, the content scene system 102 provides the content items for display within respective tabs of a web browser. In some cases, based on receiving a user interaction selecting a suggested desktop content cluster element, the content scene system 102 opens and arranges particular application windows for the content items within the suggested desktop content cluster. Indeed, as described in further detail below, the content scene system 102 arranges application windows according to a particular scene layout indicated by a suggested desktop content cluster (which further includes a suggested desktop scene layout).

As illustrated in FIG. 21B, based on receiving a search query, the client device 108 presents or displays a desktop interface 2102 that includes an updated or modified layout search interface 2104. Within the layout search interface 2104, the content scene system 102 accepts user input to search for and select stored desktop scene layouts. For example, the content scene system 102 receives a layout query and identifies desktop scene layouts that correspond to the layout query. Specifically, the content scene system 102 identifies application windows and/or digital content within the application windows that corresponds to the layout query according to topic data and/or focus data.

As shown, the content scene system 102 identifies to provides a Piano Stuff desktop scene layout and a Video Chat desktop scene layout in response to receiving a layout query of "yesterday." For example, content scene system 102 determines or identifies stored desktop scene layouts that were generated or saved on the previous day (yesterday). In certain cases, the content scene system 102 identifies stored desktop scene layouts by determining topics associated with desktop scene layouts (as indicated by topic data of content items presented via the application windows) and comparing the topics with the layout query.

Figure 22:
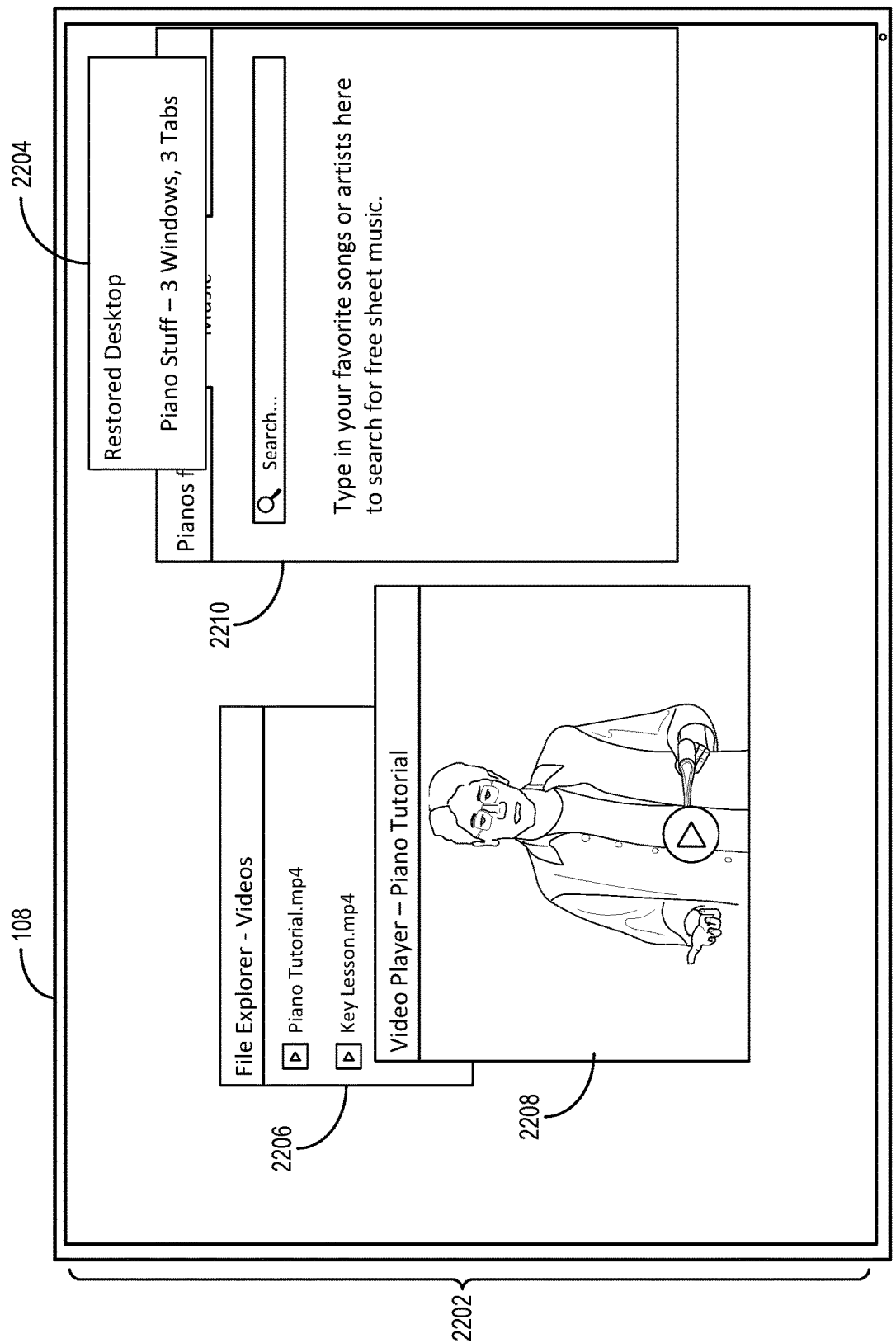
FIG. 22 illustrates an example restored desktop scene layout for an arrangement of application windows from a stored desktop scene layout in accordance with one or more embodiments.

As mentioned above, in certain described embodiments, the content scene system 102 restores desktop scene layout. In particular, the content scene system 102 restores a desktop scene layout by arranging (e.g., placing and sizing) a number of application windows as dictated by a stored desktop scene layout. FIG. 22 illustrates an example restored desktop scene layout in accordance with one or more embodiments.

As illustrated in FIG. 22, the client device 108 presents or displays a desktop interface 2202 that includes a number of application windows arranged by restoring a desktop scene layout. Indeed, the content scene system 102 can receive a user interaction to restore a desktop scene layout (e.g., from within a layout search interface, from a notification to restore a desktop scene layout, or via a keyboard hotkey/shortcut). For example, the content scene system 102 can provide a notification to restore a desktop scene layout in response to detecting a bootup of the client device 108, a new login of a user account (e.g., a new application session), and/or a new focus session as a user account accesses content items relating to a stored desktop scene layout (e.g., based on topic data and/or focus data).

In response to a user interaction to restore a desktop scene layout, the content scene system 102 can arrange the application window 2206, the application window 2208, and the application window 2210 as defined by a stored desktop scene layout. In addition, the content scene system 102 provides a restored layout element 2204 for display within the desktop interface 2202. The restored layout element 2204 indicates that the content scene system 102 has restored a desktop scene layout and further indicates which desktop scene layout was restored, along with how many application windows and tabs are presented as part of the desktop scene layout.

Not only does the content scene system 102 arrange application windows when restoring a desktop scene layout, but the content scene system 102 also arranges digital content presented within the application windows. To elaborate, the content scene system 102 determines (from the stored desktop scene layout) what tabs and other content items are presented within the various application windows and further opens and arranges (e.g., within the same tabs) the same content items for presentation as part of the restored desktop scene layout. In restoring a desktop scene layout, the content scene system 102 can open and arrange potentially large numbers of application windows (and tabs and other content therein) based on few (e.g., a single) user interactions.

Figure 23:
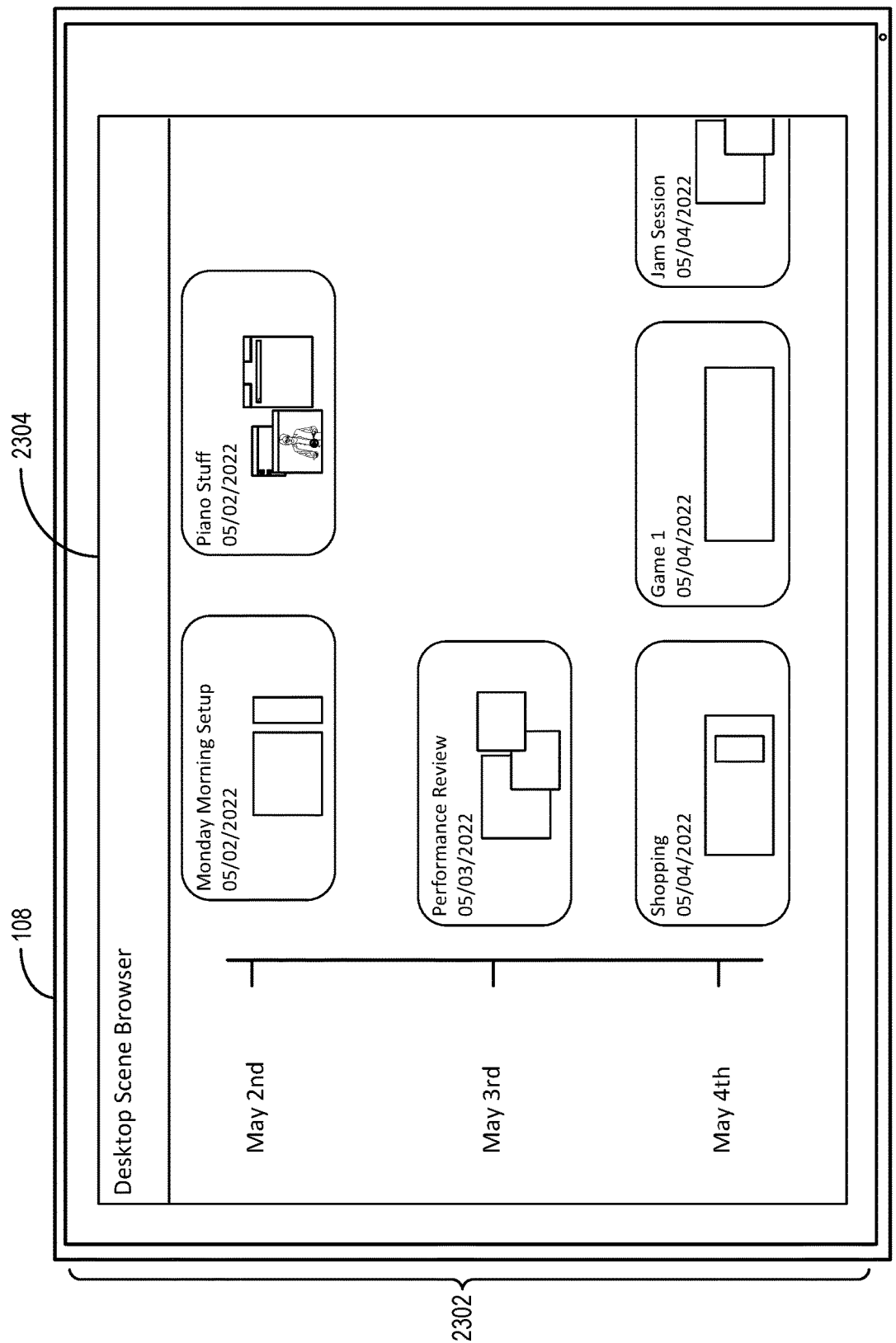
FIG. 23 illustrates an example desktop scene browser for desktop content clusters in accordance with one or more embodiments.

As mentioned above, in certain described embodiments, the content scene system 102 can generate desktop content clusters. In particular, the content scene system 102 can determine clusters of digital content items presented via application windows that are part of a desktop scene layout and/or that are presented within a desktop interface. FIG. 23 illustrates an example desktop cluster interface indicating desktop content clusters in accordance with one or more embodiments.

As illustrated in FIG. 23, the client device 108 presents or displays a desktop interface 2302 that includes a desktop scene browser 2304 that includes visual representations of desktop content clusters. More specifically, the content scene system 102 generates desktop content clusters (for suggested and/or saved content clusters) by clustering content items presenting within application windows according to topic data and focus data. Indeed, using the clustering techniques described above, the content scene system 102 generates content clusters organized according to topic-specific activity patterns or topic-specific focus sessions, where each of the clusters includes content items that were presented within respective application windows.

In certain embodiments, the content scene system 102 further generates the desktop content clusters to indicate desktop scene layouts of application windows associated with the content items within the clusters. Thus, the content scene system 102 not only clusters application windows according to topic data and focus data associated with the content items presented via the application windows but also stores the arrangement (e.g., locations and dimensions) of the application windows. Thus, the content scene system 102 can cluster one set of application windows (associated with a first topic-specific focus session) in a first desktop cluster and can cluster another set of application windows (associated with a second topic-specific focus session) in a second desktop cluster.

In some cases, the first and second sets of application windows can be displayed together in a desktop interface, while in other cases the application windows can be from different application sessions or otherwise displayed at different times. Indeed, the content scene system 102 can group content items accessed via application windows according to topic-specific focus sessions or topic-specific access patterns. As shown, the content scene system 102 generates desktop content clusters, including "Monday Morning Setup," "Piano Stuff," "Performance Review," and others. As also shown, the content scene system 102 generates the desktop scene browser 2304 to indicate dates and/or times associated with the topic-specific focus sessions for the different desktop content clusters and/or when the desktop content clusters were saved (e.g., as desktop scene layouts).

In some cases, the desktop scene browser 2304 is navigable for a user to select desktop content clusters to restore for display on the client device. For example, the content scene system 102 can receive user interactions to scroll (or otherwise navigate) through the desktop scene browser 2304. In some cases, the content scene system 102 also provides a layout search interface together with (or integrated as part of) the desktop scene browser 2304. Additionally, the content scene system 102 can receive an indication of a user interaction selecting a desktop content cluster from the desktop scene browser 2304, whereupon the content scene system 102 restores the corresponding application windows as described. Based on selecting a desktop content cluster (or a desktop scene layout), the content scene system 102 can further close, hide, or obfuscate application windows that are currently presented (or associated with another desktop content cluster). Accordingly, the content scene system 102 can facilitate seamless context switching between focus sessions by using very few interactions to swap between sets of application windows.

FIGS. 16-23, the corresponding text, and the examples provide a number of different systems and methods for storing and restoring desktop scene layouts. In addition to the foregoing, implementations can also be described in terms of flowcharts comprising acts steps in a method for accomplishing a particular result. For example, FIG. 24 illustrates an example series of acts for storing and restoring desktop scene layouts.

Figure 24:
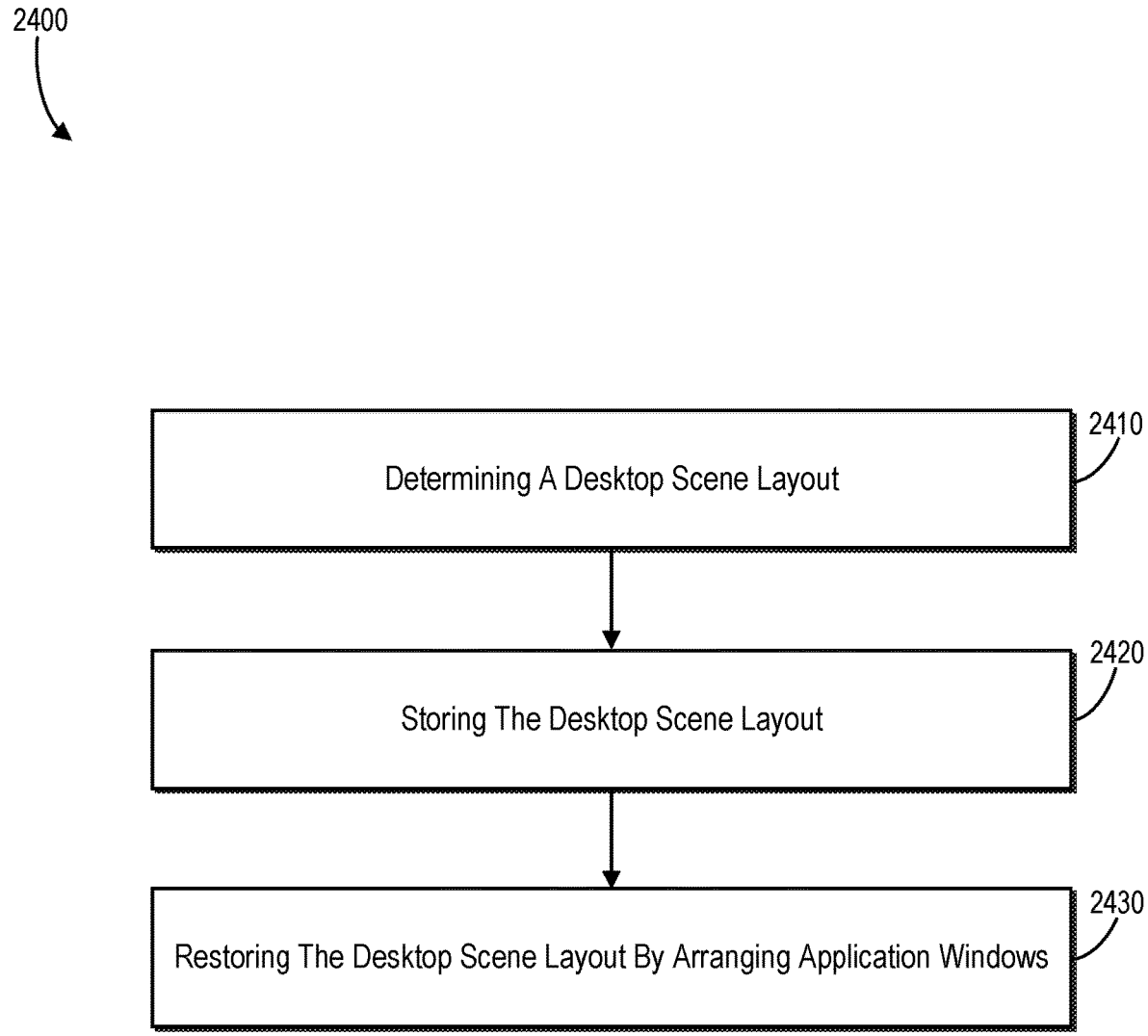
FIG. 24 illustrates an example flowchart of a series of acts for storing and restoring desktop scene layouts in accordance with one or more embodiments.

While FIG. 24 illustrates acts according to certain implementations, alternative implementations may omit, add to, reorder, and/or modify any of the acts shown in FIG. 24. The acts of FIG. 24 can be performed as part of a method. Alternatively, a non-transitory computer readable medium can comprise instructions, that when executed by one or more processors, cause a computing device to perform the acts of FIG. 24. In still further implementations, a system can perform the acts of FIG. 24.

As illustrated in FIG. 24, the series of acts 2400 may include an act 2410 of determining a desktop scene layout. For example, the act 2410 can involve determining a desktop scene layout representing an arrangement of application windows presented within a display of a client device. In addition, the series of acts 2400 may include an act 2420 of storing the desktop scene layout. Specifically, the act 2420 can involve, based on an indication to store the desktop scene layout, storing the desktop scene layout for access by the client device to rearrange a desktop view within the display according to the desktop scene layout. As shown, the series of acts 2400 can also include an act 2430 of restoring the desktop scene layout by arranging application windows. More particularly, the act 2430 can involve, based on a request to restore the desktop scene layout, restoring the desktop scene layout to present the arrangement of application windows within the display of the client device.

In one or more embodiments, the series of acts 2400 includes an act of determining the desktop scene layout by determining locations and dimensions of the application windows presented within the display of the client device. In addition, the series of acts 2400 can include an act of determining the desktop scene layout by determining locations and dimensions of digital content presented within the application windows associated with different applications within the display of the client device.

In some embodiments, the series of acts 2400 includes an act of storing the desktop scene layout by: providing, for display on the client device in response to the indication to store the desktop scene layout, a scene store interface comprising a visual representation of locations and dimensions of the application windows presented within the display of the client device and further comprising an option to store the desktop scene layout and by storing the desktop scene layout for the locations and dimensions of the application windows in response to an indication of a user interaction selecting the option to store the desktop scene layout.

In certain embodiment, the series of acts 2400 includes an act of restoring the desktop scene layout by: providing, for display on the client device, a scene restore option selectable to restore the desktop scene layout and, in response to an indication of user interaction selecting the scene restore option: opening one or more application windows and accessing digital content indicated by the desktop scene layout and arranging the application windows and the digital content to have locations and dimensions indicated by the desktop scene layout. In some cases, the act 2400 can involve, in response to an indication of user interaction selecting the scene restore option: identifying a first currently open application window that is part of the desktop scene layout and a second currently open application window that is not part of the desktop scene layout; closing the second currently open application window that is not part of the desktop scene layout; accessing digital content indicated by the desktop scene layout for the first currently open application window; and arranging the first currently open application window and the digital content to have locations and dimensions indicated by the desktop scene layout.

In one or more embodiments, the series of acts 2400 includes an act of generating a desktop content cluster by grouping digital content items accessed via one or more application windows according to a topic-specific access pattern. The series of acts 2400 can also include an act of storing a desktop cluster scene indicating an arrangement of the one or more application windows depicting digital content associated with the desktop content cluster. Further, the series of acts 2400 can include an act of, based on a request to restore the desktop cluster scene, restoring the desktop cluster scene to present, within the display of the client device, the arrangement of the one or more application windows depicting digital content associated with the desktop content cluster.

Storing and Arranging Video Call Scenes

Figure 25:
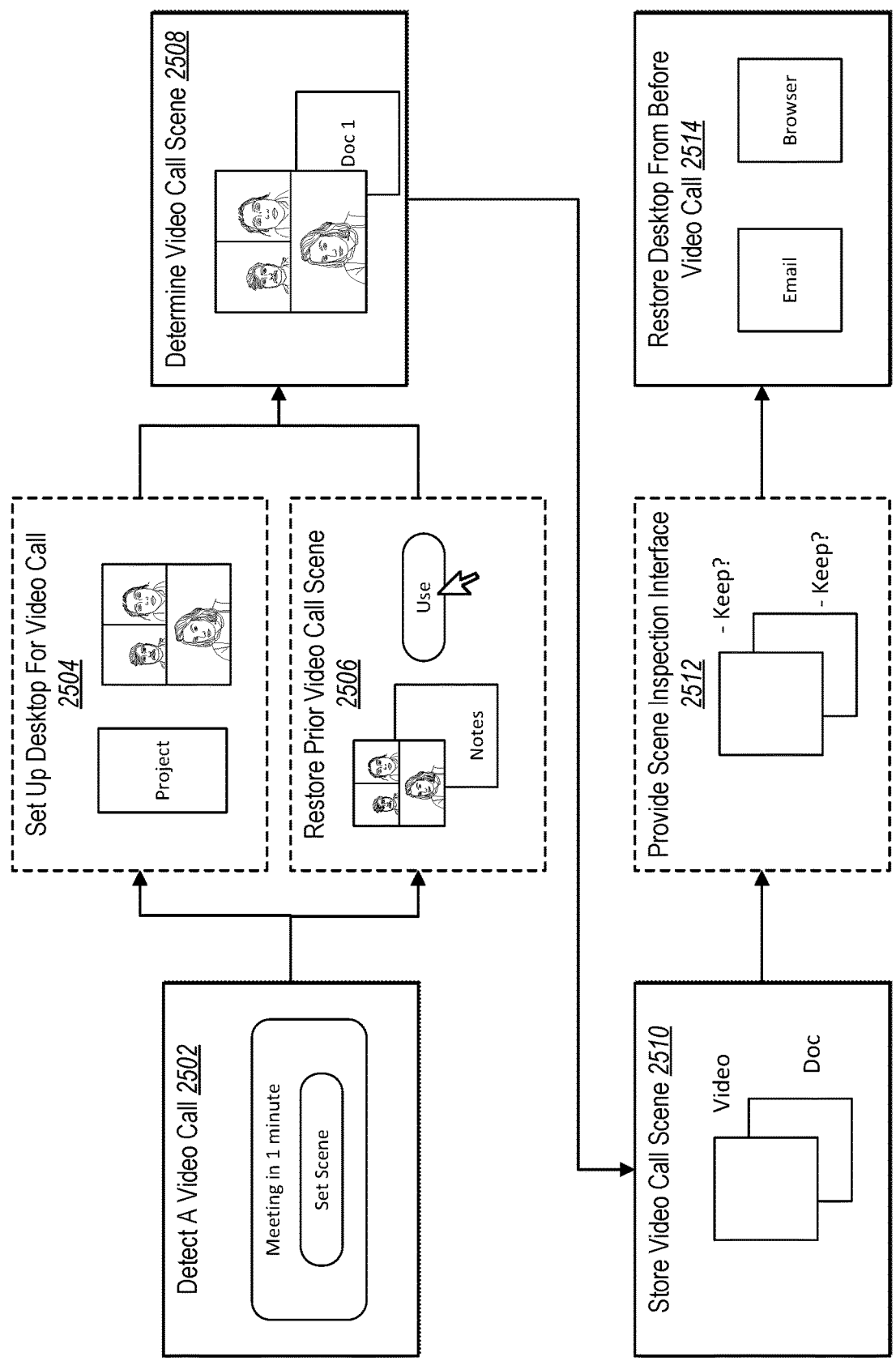
FIG. 25 illustrates an example overview of storing and arranging video call scenes in accordance with one or more embodiments.

As mentioned above, in certain described embodiments, the content scene system 102 stores and arranges video call scenes. In particular, the content scene system 102 can store and restore specialized versions of desktop scene layouts specifically for video calls, where the content scene system 102 arranges application windows for video call applications and/or other applications associated with video calls. FIG. 25 illustrates an example overview of storing and arranging video call scenes in accordance with one or more embodiments. Additional detail regarding the various acts of FIG. 25 is provided thereafter with reference to subsequent figures.

As illustrated in FIG. 25, the content scene system 102 performs an act 2502 to detect a video call. To elaborate, the content scene system 102 detects an ongoing or an upcoming video call associated with a user account of the content management system 106. For example, the content scene system 102 detects an incoming video call by accessing an API of a video call application to determine that the user account is receiving a video call. In some cases, the content scene system 102 accesses operating system information and/or analyzes pixels of a desktop interface (e.g., to identify an incoming call notification) to determine that a client device (or a user account) is receiving a video call. As another example, the content scene system 102 accesses calendar information to detect or identify a scheduled or upcoming video call at a particular time. In some embodiments, based on detecting a video call, the content scene system 102 generates and provides a call setup element for display on a client device, where the call setup element is selectable to arrange application windows for the video call.

As further illustrated in FIG. 25, in one or more embodiments, the content scene system 102 performs an act 2504 to set up a desktop interface for the video call. More particularly, the content scene system 102 arranges application windows for the video call (e.g., in response to user interaction selecting a call setup element). For example, the content scene system 102 identifies or determines computer applications that are associated with the video call, such as a video call application, a notetaking application, and/or a presentation application used in preparation for the video call. In some cases, the content scene system 102 determines relationships between content items of the user account and the video call to identify content items to open within various application windows as part of the video call scene. The content scene system 102 can further place and size the application windows for the video call by, for example, opening applications and presenting content items associated with the video call in respective application windows.

In some embodiments, the content scene system 102 performs an act 2506 to restore a prior video call scene. To elaborate, the content scene system 102 accesses a stored video call scene saved by a user account from a previous video call. The content scene system 102 can receive a user interaction selecting an option to restore the stored video call scene for the new video call. In response to the user interaction, the content scene system 102 further arranges application windows for display within a desktop interface according to the stored video call scene by placing and sizing application windows as defined by the stored video call scene.

As further illustrated in FIG. 25, the content scene system 102 performs an act 2508 to determine a video call scene. More specifically, the content scene system 102 determines a video call scene associated with the video call. For instance, the content scene system 102 determines placements, sizes, and depths of application windows as presented during the video call. In addition, the content scene system 102 determines arrangements of digital content presented within the various application windows, including partitions or divisions between video call streams and portions of other content items presented in other application windows.

Additionally, the content scene system 102 performs an act 2510 to store a video call scene. In particular, the content scene system 102 receives an indication of a user interaction to store or save a video call scene associated with the video call. For instance, the content scene system 102 stores an arrangement of application windows (including placement, dimensions, and/or depths) as determined via the act 2508. Thus, the content scene system 102 can utilize the stored video call scene for subsequent video calls.

As further illustrated in FIG. 25, in some embodiments, the content scene system 102 performs an act 2512 to provide a scene inspection interface. Specifically, in response to user interaction requesting to store a video call scene, the content scene system 102 provides a scene inspection interface whereby a user can select which application windows to include within the video call scene. Additionally, the content scene system 102 can enable manipulation of locations and/or dimensions of application windows via the scene inspection interface. Based on the arrangement and selection of application windows within the scene inspection interface, the content scene system 102 can save a modified video call scene for the video call.

In addition, the content scene system 102 performs an act 2514 to restore a desktop from before the video call. To elaborate, upon detecting that the video call has ended, the content scene system 102 can automatically (e.g., within user interaction for prompting), or in response to a user interaction to request, rearrange application windows presented in a desktop interface to appear as they were before the video call started. In some embodiments, the content scene system 102 can thus restore the desktop interface to a visual state as the desktop interface appeared immediately before the application windows were arranged for the video call.

Figure 26:
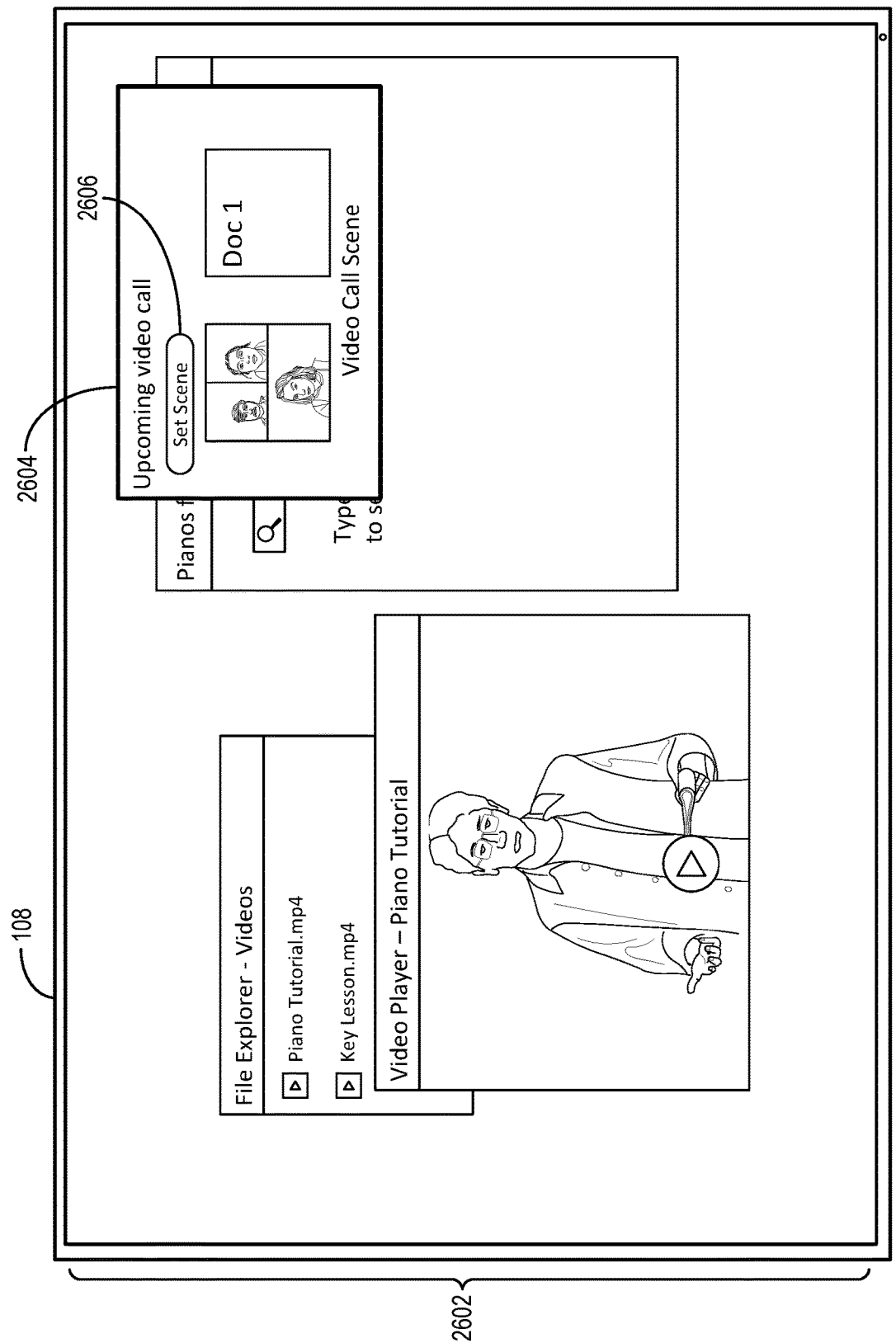
FIG. 26 illustrates an example desktop scene layout including a video call notification in accordance with one or more embodiments.

As mentioned above, in certain described embodiments, the content scene system 102 detects or determines a video call associated with a user account. In particular, the content scene system 102 detects an upcoming (or initiated) video call for a user account by accessing video call application data, calendar data, and/or operating system data. FIG. 26 illustrates an example call setup element for an upcoming video call in accordance with one or more embodiments.

As illustrated in FIG. 26, the client device 108 presents or displays a desktop interface 2602 that includes a number of application windows along with a video call notification 2604. More specifically, the content scene system 102 generates and provides the video call notification 2604 in response to detecting an upcoming video call. For example, the content scene system 102 detects an upcoming video call by accessing data (e.g., via an API) for a video call application to determine that a video call is scheduled and/or initialized (e.g., by detecting an incoming request signal). As another example, the content scene system 102 detects an upcoming video call by analyzing data from a calendar application (or a calendar associated with a user account) to determine that a video call is upcoming with a threshold timeframe (e.g., within five minutes or within one minute).

The content scene system 102 further provides the video call notification 2604 in response to detecting the video call. Within the video call notification 2604, the content scene system 102 provides a video call setup element 2606 that is selectable to arrange application windows for the video call. As shown, the content scene system 102 can further generate the video call notification 2604 to visually represent or depict a video call scene that would be implemented upon selection of the video call setup element 2606. For example, the content scene system 102 presents an arrangement of application windows that will be opened and placed for the video call. In some cases, the video call notification 2604 is interactive and enables a user to move application window representations within the video call notification 2604 to define the arrangement for the video call scene (which will be applied upon selection of the video call setup element 2606).

In certain cases, the content scene system 102 generates the video call notification 2604 based on a default arrangement for video calls. For instance, the content scene system 102 determines or generates a default video call scene as a desktop scene layout specifically for video calls. Specifically, the content scene system 102 determines that video calls use a video call application which will be presented in a particular location with particular dimensions. In addition, the content scene system 102 determines that video calls use one or more additional applications, such as notetaking applications or presentation applications that will each have their own locations and dimensions. In some embodiments, the content scene system 102 determines that an application window for a video call application should be most prominently displayed and therefore sizes it larger than (and/or above or on top of) other application windows to be included a video call scene.

In some cases, the content scene system 102 determines different default arrangements for different types of video calls. For example, the content scene system 102 analyzes video call data to determine that a video call is a business call or a personal call. In some cases, the content scene system 102 identifies work contacts or personal contacts as participants in the video call to determine the video call type. In these or other cases, the content scene system 102 analyzes subject matter associated with the video call by analyzing a video call title and/or by analyzing content items associated with the video call (e.g., a presentation or notes associated with the video call). Based on determining that a video call is a business video call, the content scene system 102 determines a video call scene that includes a video call application window, a notetaking application window, and/or other work-related application windows in a particular arrangement. Conversely, based on determining that a video call is a personal video call, the content scene system 102 determines a video call scene that includes only a video call application window (and/or other related application windows for personal use).

In one or more embodiments, the content scene system 102 generates the video call notification 2604 based on a stored video call scene. For example, the content scene system 102 accesses a stored video call scene to determine an arrangement of application windows from the stored video call scene (e.g., as saved from a prior video call). In one or more embodiments, the content scene system 102 automatically selects a stored video call scene for a newly detected video call. For instance, the content scene system 102 accesses a stored video call scene for a recurring video call (e.g., a regularly scheduled video call) or for a video call with participants matching a prior call and utilizes the video call scene for a new video call. In certain cases, the content scene system 102 receives a user interaction selecting a stored video call scene.

Figure 27:
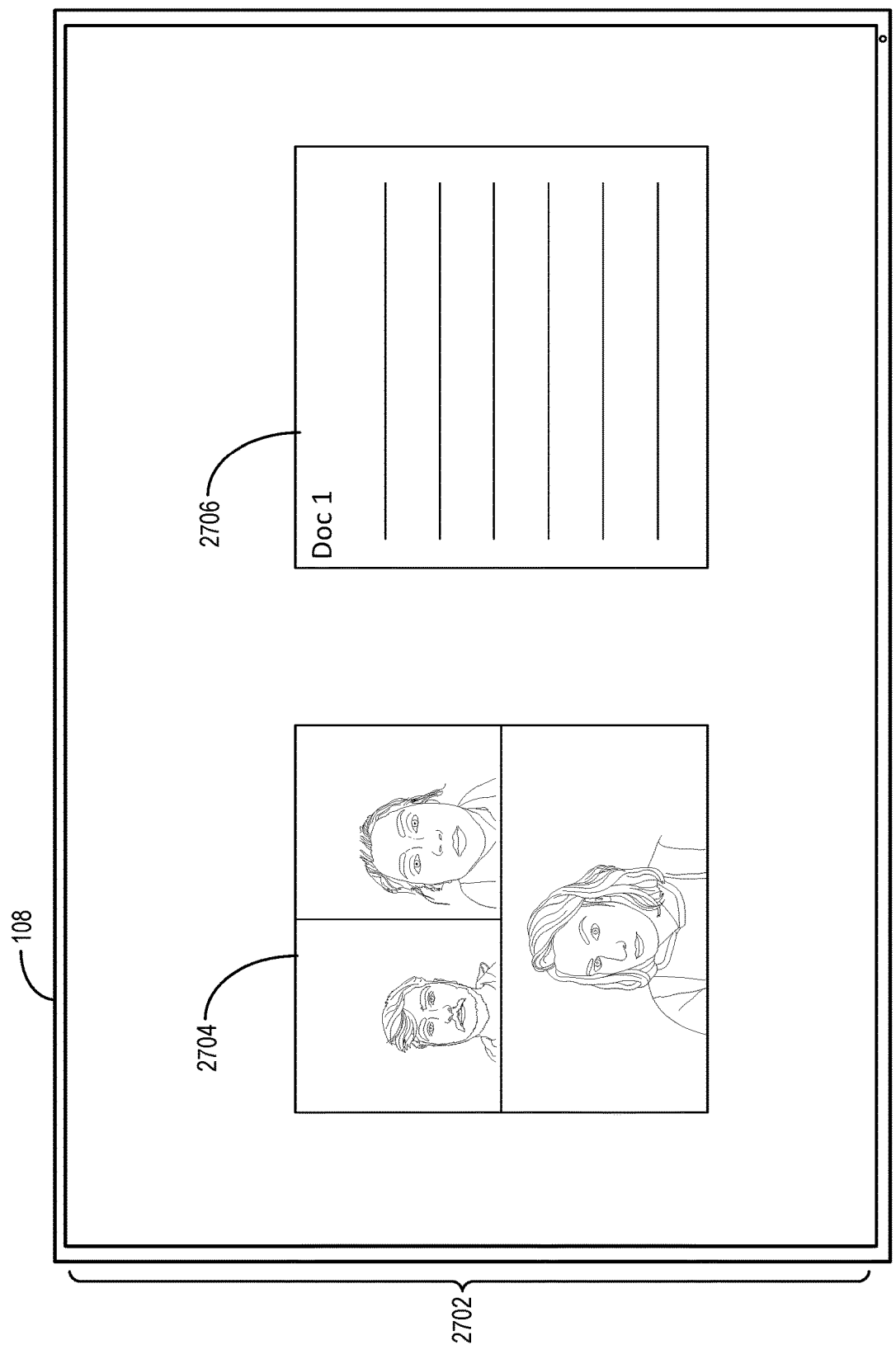
FIG. 27 illustrates an example video call scene in accordance with one or more embodiments.

As mentioned above, in certain embodiments, the content scene system 102 arranges application windows according to a video call scene. In particular, the content scene system 102 arranges application windows for a video call according to a stored video call scene and/or according to default settings for video calls. FIG. 27 illustrates an example video call scene in accordance with one or more embodiments.

As illustrated in FIG. 27, the client device 108 presents or displays a desktop interface 2702 that includes or depicts a video call scene. To elaborate, the content scene system 102 stages the desktop interface 2702 by arranging an application window 2704 and an application window 2706 within the desktop interface 2702 for a video call scene. For example, the content scene system 102 utilizes a default video call scene or a stored video call scene to determine the arrangement of the application window 2704 and the application window 2706. Based on the video call scene, the content scene system 102 opens or accesses a video call application and arranges the application window 2704 for the video call application to have a particular location, dimensions, and/or depth within the desktop interface 2702. Likewise, the content scene system 102 opens or accesses a notetaking application and arranges the application window 2706 for the notetaking application to have a particular location, dimensions, and/or depth within the desktop interface 2702.

In one or more embodiments, the content scene system 102 also identifies and accesses content items to present within the application windows 2704 and/or the application window 2706 as part of arranging a video call scene. For example, based on topic data and/or focus data, the content scene system 102 can determine which other user accounts should be involved in the video call (e.g., from prior video calls associated with the same topic and/or at similar times of the day or week). Accordingly, the content scene system 102 can provide, within the application window 2704, selectable options to call the indicated user accounts for the video call. As another example, the content scene system 102 can determine a document to present within the application window 2706, such a notes document to continue from a previous video call (e.g., where the previous call was indicated to be part one of a two-part discussion).

In some cases, the content scene system 102 can also place and size content items within the application window 2704 (e.g., video stream sizes) and the application window 2706 (e.g., different portions of a document) based on topic data and/or focus data. For instance, the content scene system 102 can identify a participant for the video call whose use account indicates they are a team lead for the user account of the client device 108. Accordingly, the content scene system 102 can size the video stream area of the application window 2704 for the team lead to be larger than other video stream areas. As another example, the content scene system 102 can identify a most prominent topic mentioned from a previous and related video call and can accordingly place content within the application window 2706 corresponding to that topic at the top of the document (or in a larger font size or highlighted or otherwise emphasized).

In one or more embodiments, the content scene system 102 hides or obfuscates one or more application windows during a video call. For example, the content scene system 102 determines application windows that are open when a video call begins. The content scene system 102 further identifies open application windows that are not associated with the video call and closes, minimizes, hides, blurs, or otherwise obfuscates the unrelated application windows.

Figure 28:
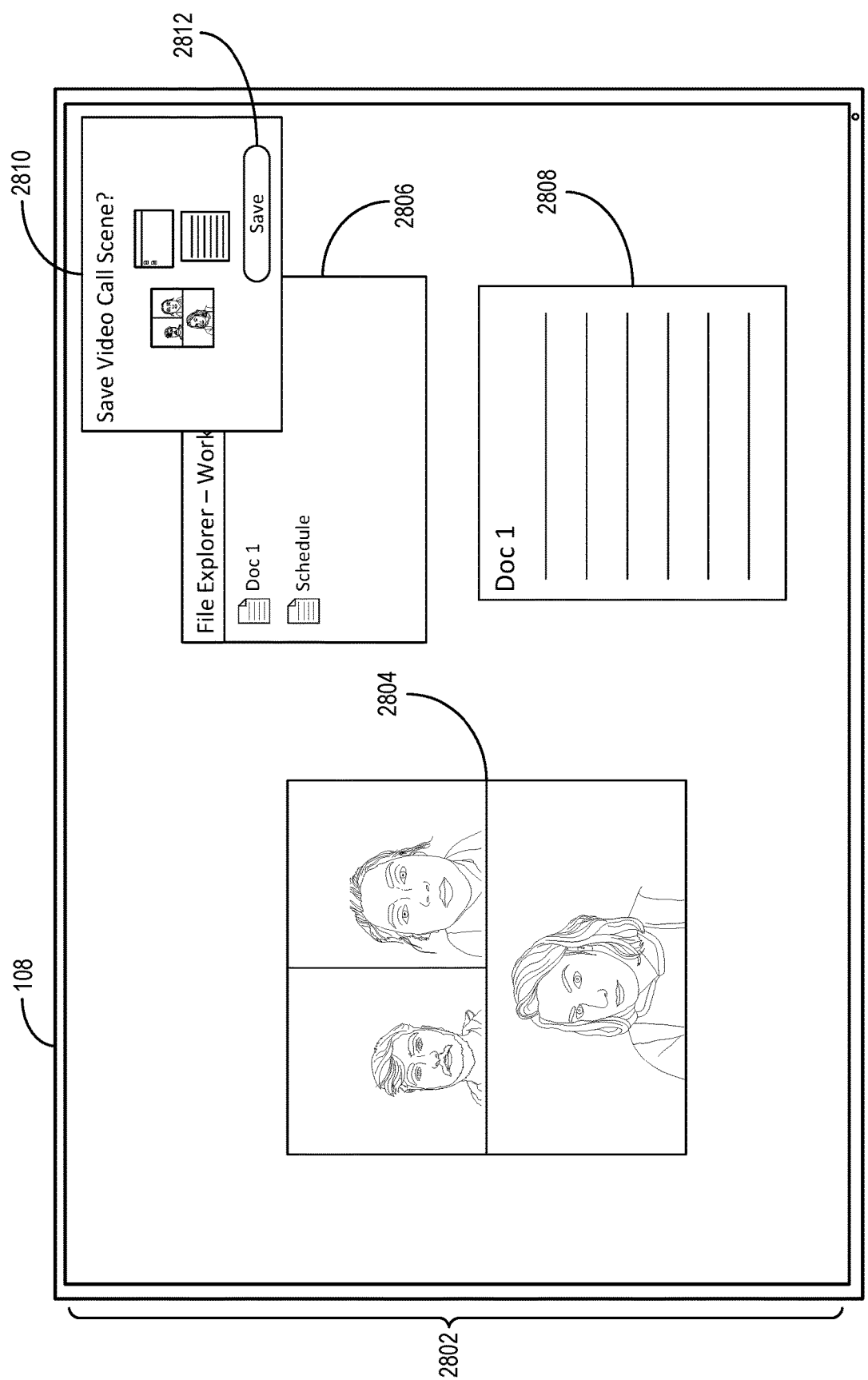
FIG. 28 illustrates an example video call scene including a video call scene storage option in accordance with one or more embodiments.

As mentioned above, the content scene system 102 can save a video call scene for a video call. In particular, the content scene system 102 can save or store an arrangement of application windows, including their locations, dimensions, and/or depths, for a user account of the content management system 106. FIG. 28 illustrates an example video call scene storage option for storing a video call scene in accordance with one or more embodiments.

As illustrated in FIG. 28, the client device 108 presents or displays a desktop interface 2902 that includes a number of application windows associated with a video call. Specifically, the content scene system 102 arranges the application window 2804, the application window 2806, and the application window 2808 for a video call. For instance, the content scene system 102 arranges the application windows to have particular locations, dimensions, and depths within the desktop interface 2802.

In addition, the content scene system 102 provides a video call scene storage option 2810 for display within the desktop interface 2802. For example, the content scene system 102 detects that a video call is taking place on the client device 108 and further detects user interactions to size and/or place the application windows in a certain arrangement for the video call. Based on detecting the video call and/or the arranging of the application windows, the content scene system 102 generates and provides the video call scene storage option 2810. In some embodiments, the content scene system 102 provides the video call scene storage option 2810 in response to a keyboard shortcut or a hotkey to save a video call scene. Within the video call scene storage option 2810, the content scene system 102 provides a selectable save option 2812 to confirm saving the video call scene for the displayed arrangement of the application window 2804, the application window 2806, and the application window 2808. The content scene system 102 further saves or stores the video call scene in response to receiving a user interaction with the selectable save option 2812.

Figure 29:
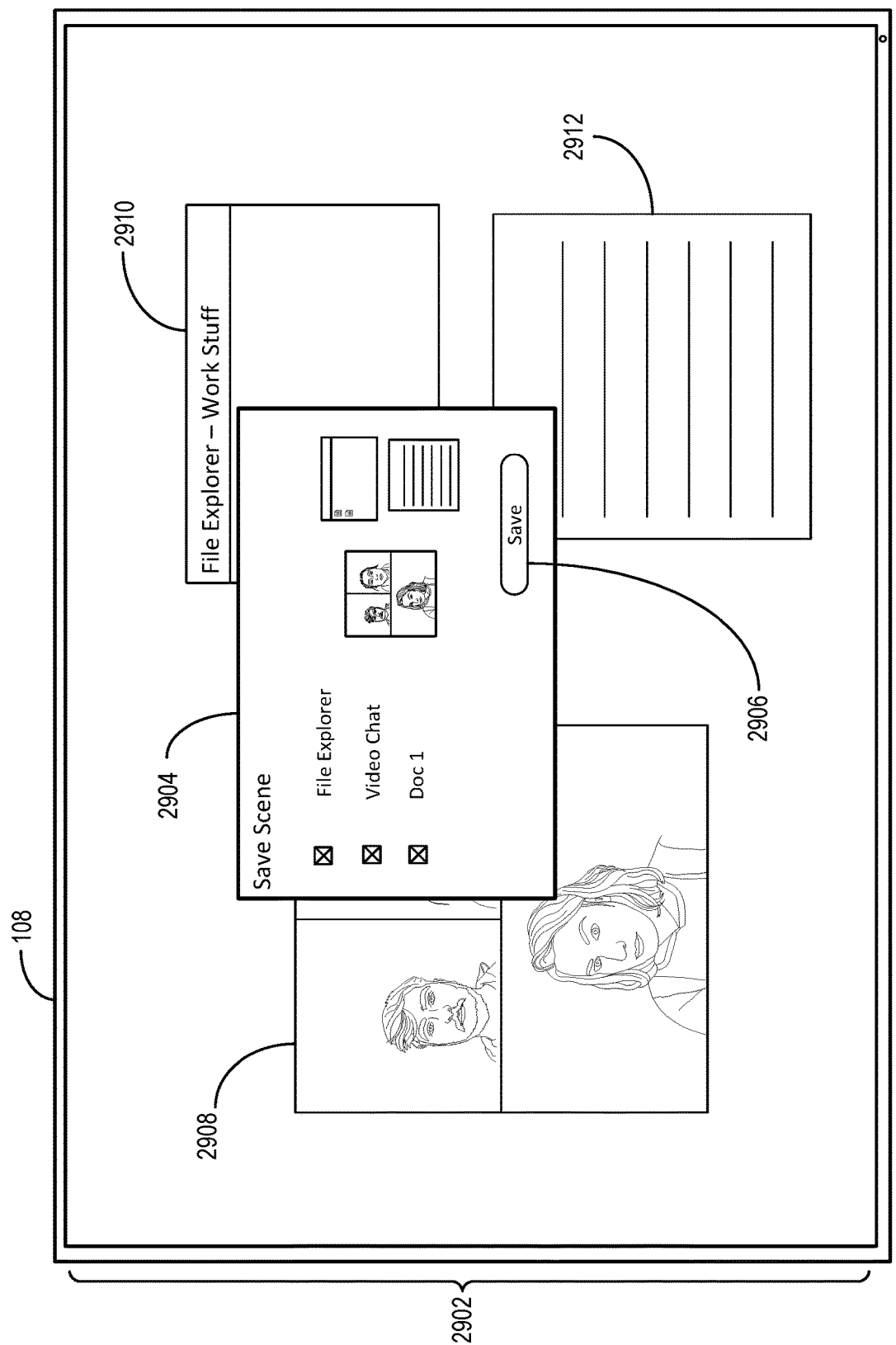
FIG. 29 illustrates an example scene inspection interface in accordance with one or more embodiments.

In one or more embodiments, the content scene system 102 provides a scene inspection interface in response to receiving a user interaction with the video call scene storage option 2810 or the selectable save option 2812. In particular, the content scene system 102 provides a scene inspection interface for modifying or customizing application windows to include within a saved video call scene. FIG. 29 illustrates an example scene inspection interface in accordance with one or more embodiments.

As illustrated in FIG. 29, the client device 108 presents or displays a desktop interface 2902 that includes a scene inspection interface 2904. Within the scene inspection interface 2904, the content scene system 102 provides a visualization of application windows corresponding to the application windows presented within the desktop interface 2902, including the application window 2908, the application window 2910, and the application window 2912. In some embodiments, the content scene system 102 enables selection (or omission) of various application windows and further enables manipulating the miniaturized versions of the application windows to have different locations, dimensions, and/or depths. The content scene system 102 also provides a selectable save option 2906 within the scene inspection interface 2904. In response to receiving a user interaction selecting the scene inspection interface 2904, the content scene system 102 stores or saves a customized or modified video call scene.

In one or more embodiments, the content scene system 102 trains and utilizes a desktop scene machine learning model to determine desktop scene layouts. In particular, the content scene system 102 determines engagement levels associated with application windows that are open for accessing content items. For example, the content scene system 102 determines an engagement level based on a number of user actions (from the user and/or similar users) and/or a time spent focusing on an application window. In certain cases, the content scene system 102 determines which application windows (and their arrangements) to include within the scene inspection interface 2904 (and which to omit) based on engagement levels. For instance, if a client device displays four application windows during a video call but a user only engages with three of them, then the content scene system 102 may only provide the three engaged application windows for display within the scene inspection interface 2904. In some cases, the content scene system 102 will automatically save the video call scene based on user engagement, or the content scene system 102 may automatically select checkboxes for certain application windows within the scene inspection interface 2904 based on engagement with application windows.

Figure 30:
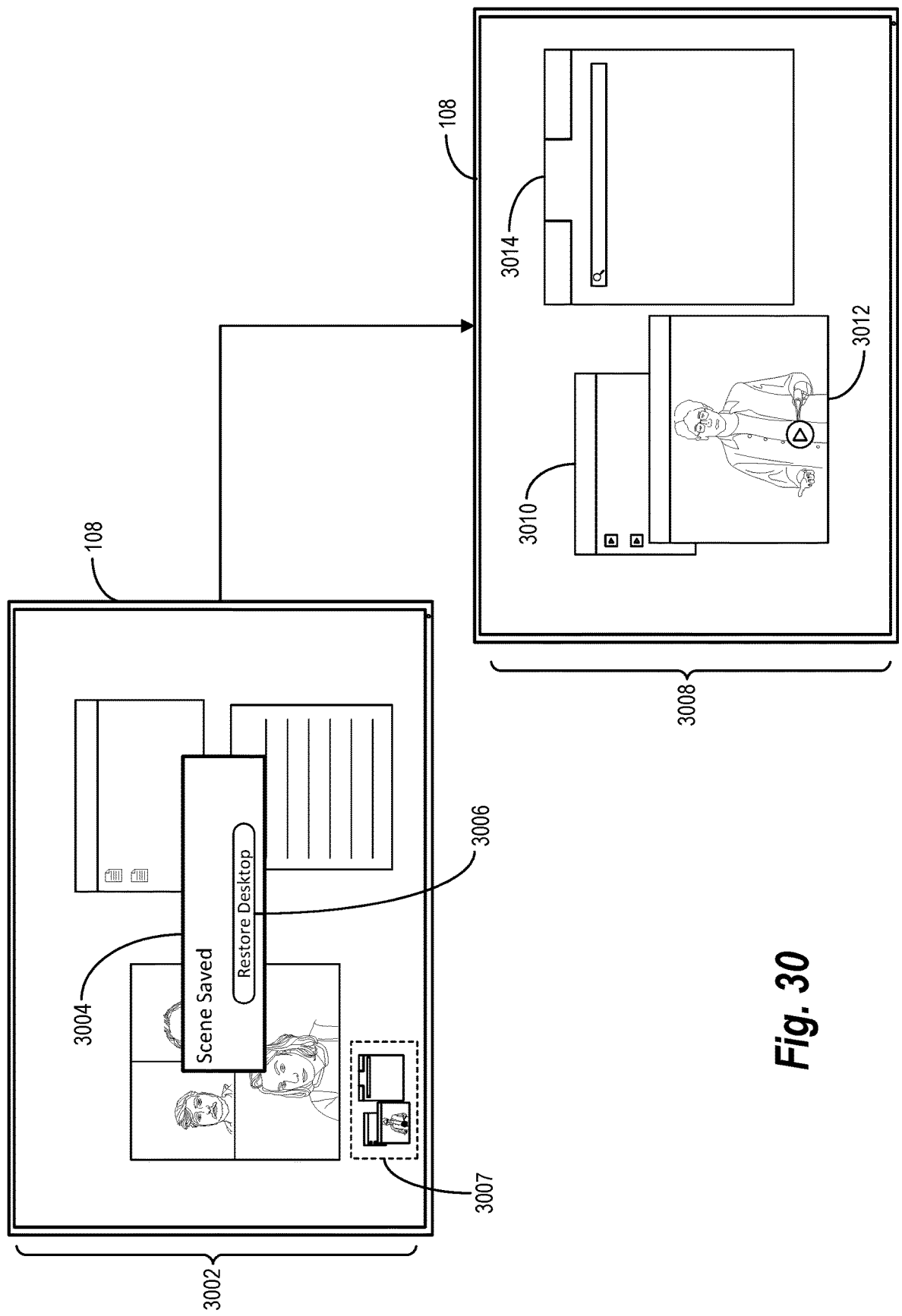
FIG. 30 illustrates an example diagram for restoring a desktop scene layout after a video call in accordance with one or more embodiments.

As mentioned above, in certain described embodiments, the content scene system 102 restores a desktop interface after a video call. In particular, the content scene system 102 reverts or restores application windows to a state as they appeared before arranging a video call scene for a video call. FIG. 30 illustrates an example diagram for restoring a desktop after a video call in accordance with one or more embodiments.

As illustrated in FIG. 30, content scene system 102 transitions from providing a desktop interface 3002 including application windows arranged for a video call scene to providing a desktop interface 3008 including application windows arranged from before the video call scene. To elaborate, the content scene system 102 detects that a video call has ended and/or that a user has saved a video call scene. Based on such detection, the content scene system 102 further provides a scene restore element 3004 for display in the desktop interface 3002. As shown, the scene restore element 3004 includes a selectable restore option 3006. The content scene system 102 can thus restore a desktop scene interface by arranging application windows as presented prior to the video call. In some embodiments, the content scene system 102 provides an alternative type of scene restore element, such as the scene restore element 3007 which visually depicts the stored desktop scene layout that will be restored upon its selection (e.g., the desktop scene layout from before the start of the video call).

In one or more embodiments, the content scene system 102 does not necessarily require a user interaction with a scene restore option to restore a desktop scene interface. Rather, the content scene system 102 detects the end of a video call and automatically (e.g., without additional user interaction to prompt) restores a desktop scene layout to arrange application windows as they appeared before the video call. In these or other embodiments, the content scene system 102 restores a desktop scene layout after providing a scene inspection interface whereby a user can inspect, select, and modify application windows to store as part of a video call scene. Accordingly, the content scene system 102 restores a desktop scene layout to arrange an application window 3010, an application window 3012, and an application window 3014 as they appeared prior to the video call.

FIGS. 25-30, the corresponding text, and the examples provide a number of different systems and methods for storing and arranging video call scenes. In addition to the foregoing, implementations can also be described in terms of flowcharts comprising acts steps in a method for accomplishing a particular result. For example, FIG. 31 illustrates an example series of acts for storing and arranging video call scenes.

Figure 31:
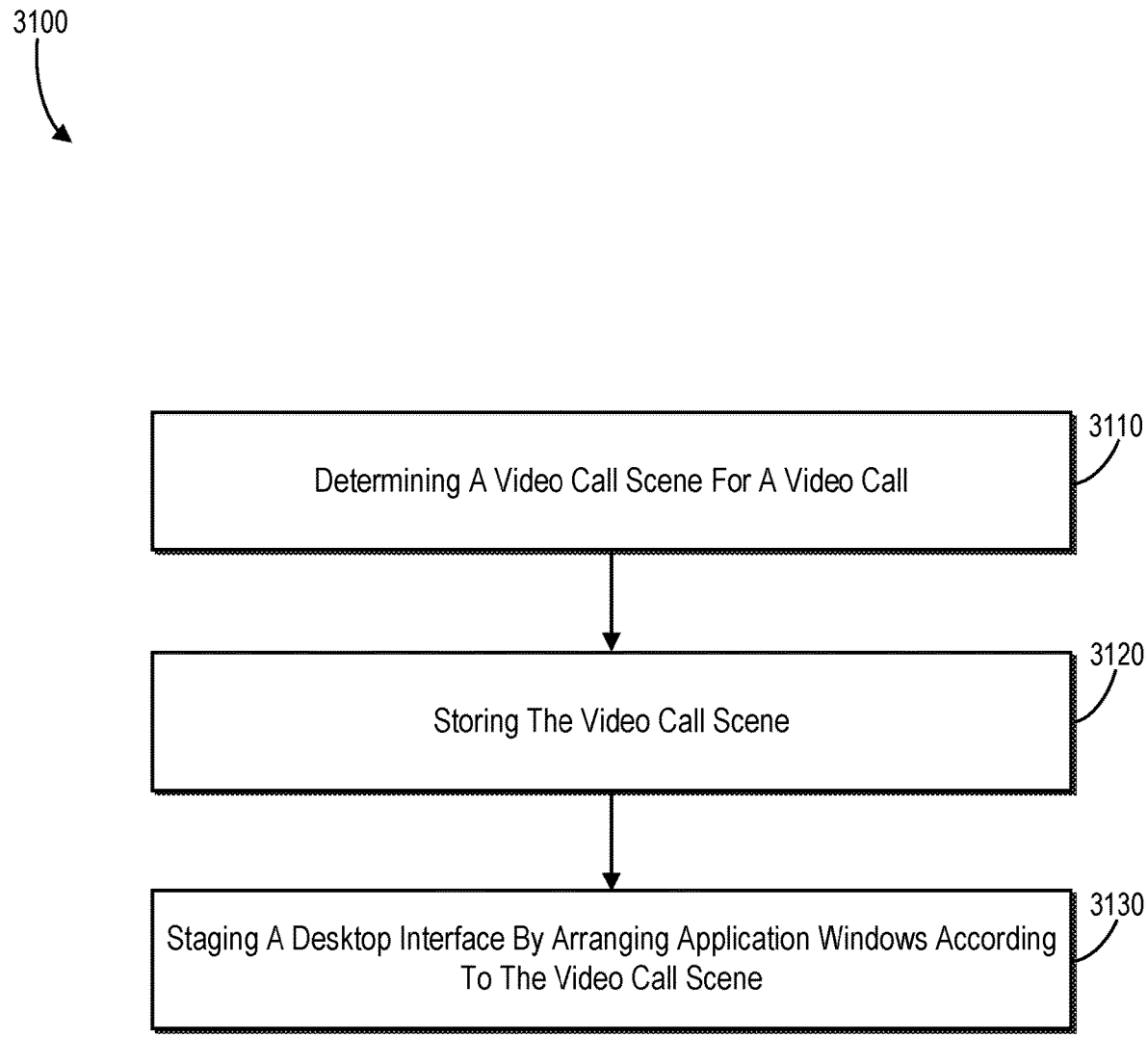
FIG. 31 illustrates an example flowchart of a series of acts for storing and arranging video call scenes in accordance with one or more embodiments.

While FIG. 31 illustrates acts according to certain implementations, alternative implementations may omit, add to, reorder, and/or modify any of the acts shown in FIG. 31. The acts of FIG. 31 can be performed as part of a method. Alternatively, a non-transitory computer readable medium can comprise instructions, that when executed by one or more processors, cause a computing device to perform the acts of FIG. 31. In still further implementations, a system can perform the acts of FIG. 31.

As illustrated in FIG. 31, the series of acts 3100 may include an act 3110 of determining a video call scene for a video call. In particular, the act 3110 can involve, based on detecting a video call associated with a user account of a content management system, determining a video call scene indicating an arrangement of application windows displayed on a client device associated with the user account during the video call. The series of acts 3100 can also include an act 3120 of storing the video call scene. Specifically, the act 3120 can involve storing the video call scene based on receiving an indication to store the video call scene indicating the arrangement of application windows displayed during the video call. In addition, the series of acts 3100 can include an act 3130 of staging a desktop interface by arranging application windows according to the video call scene. For instance, the act 3130 can involve, in response to a request to stage a desktop interface of the client device for the video call, staging the desktop interface by arranging the application windows displayed on the client device according to the video call scene.

In one or more embodiments, the series of acts 3100 includes an act of, based on detecting the video call associated with the user account, providing a video call scene storage option for display on the client device and selectable to store the video call scene. In these or other embodiments, the series of acts 3100 includes an act of determining the video call scene by: determining a location and dimensions associated with a video call application window and determining locations and dimensions of video call content within the video call application window.

In certain embodiments, the series of acts 3100 includes an act of arranging the application windows displayed on the client device according to the video call scene by: placing a first application window associated with the video call for display at a certain location on the client device and obfuscating a second application window not associated with the video call. In one or more embodiments, the series of acts 3100 includes an act of, based on detecting the video call associated with the user account, providing, for display on the client device, a video call setup element selectable to arrange one or more application windows displayed on the client device for the video call.

The series of acts 3100 can include an act of identifying a content item associated with the video call and stored for the user account within the content management system. Additionally, the series of acts 3100 can include an act of, in response to an indication of a user interaction selecting the video call setup element, arranging the one or more application windows for the video call by placing a video call application window at a first location and placing a content item application window presenting the content item associated with the video call at a second location.

In certain cases, the series of acts 3100 includes an act of providing, for display on the client device, a scene restore element selectable to restore a prior arrangement of application windows displayed on the client device before the video call. The series of acts 3100 can also include an act of, in response to a user interaction selecting the scene restore element, restoring the application windows displayed on the client device before the video call to the prior arrangement.

The components of the content scene system 102 can include software, hardware, or both. For example, the components of the content scene system 102 can include one or more instructions stored on a computer-readable storage medium and executable by processors of one or more computing devices. When executed by one or more processors, the computer-executable instructions of the content scene system 102 can cause a computing device to perform the methods described herein. Alternatively, the components of the content scene system 102 can comprise hardware, such as a special purpose processing device to perform a certain function or group of functions. Additionally or alternatively, the components of the content scene system 102 can include a combination of computer-executable instructions and hardware.

Furthermore, the components of the content scene system 102 performing the functions described herein may for example, be implemented as part of a stand-alone application, as a module of an application, as a plug-in for applications including content management applications, as a library function or functions that may be called by other applications, and/or as a cloud-computing model. Thus, the components of the content scene system 102 may be implemented as part of a stand-alone application on a personal computing device or a mobile device.

Embodiments of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed by a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multiprocessor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 32:
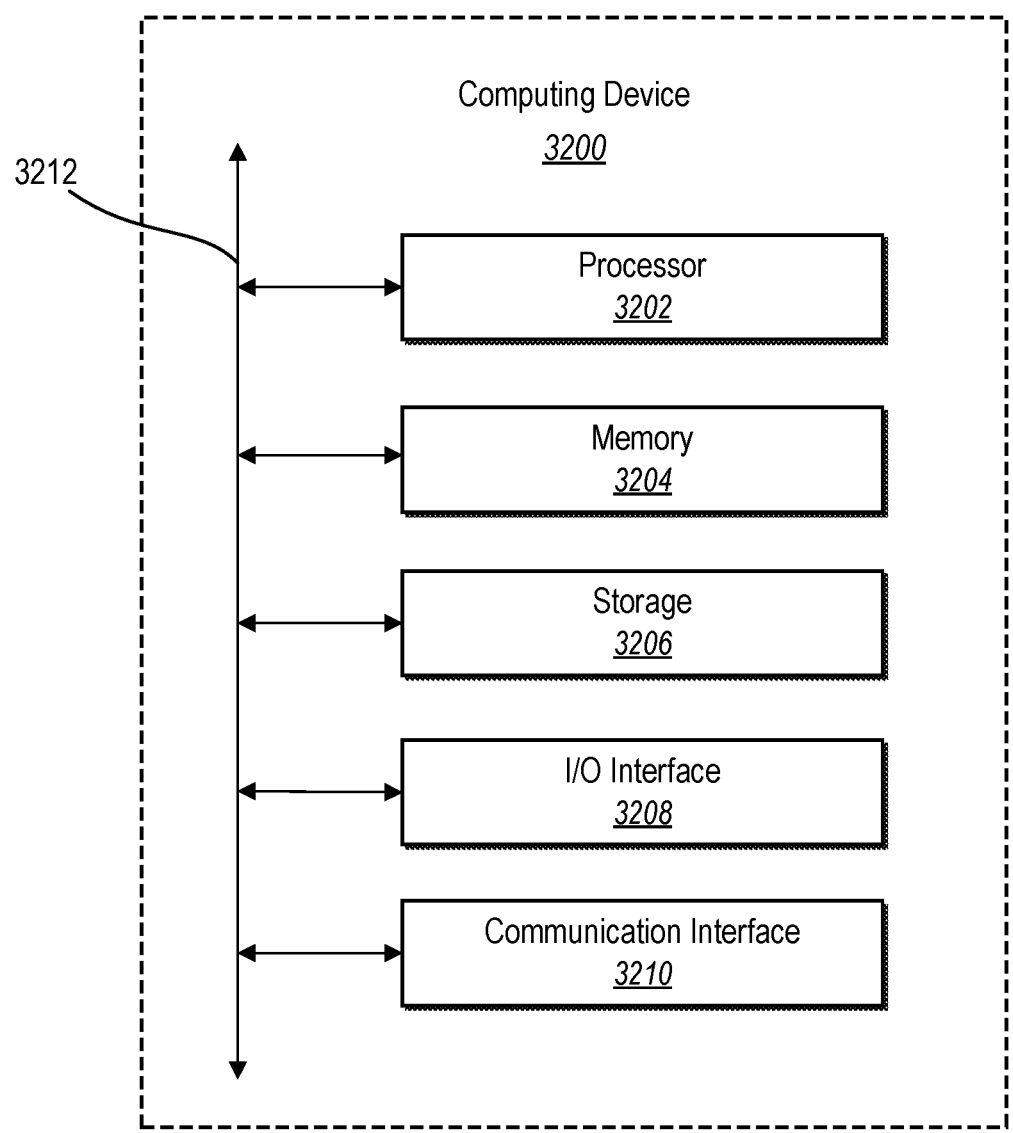
FIG. 32 illustrates a block diagram of an exemplary computing device in accordance with one or more embodiments.

FIG. 32 illustrates a block diagram of exemplary computing device 3200 (e.g., the server(s) 104 and/or the client device 108) that may be configured to perform one or more of the processes described above. One will appreciate that server(s) 104 and/or the client device 108 may comprise one or more computing devices such as computing device 3200. As shown by FIG. 32, computing device 3200 can comprise processor 3202, memory 3204, storage device 3206, I/O interface 3208, and communication interface 3210, which may be communicatively coupled by way of communication infrastructure 3212. While an exemplary computing device 3200 is shown in FIG. 32, the components illustrated in FIG. 32 are not intended to be limiting. Additional or alternative components may be used in other implementations. Furthermore, in certain implementations, computing device 3200 can include fewer components than those shown in FIG. 32. Components of computing device 3200 shown in FIG. 32 will now be described in additional detail.

In particular implementations, processor 3202 includes hardware for executing instructions, such as those making up a computer program. As an example and not by way of limitation, to execute instructions, processor 3202 may retrieve (or fetch) the instructions from an internal register, an internal cache, memory 3204, or storage device 3206 and decode and execute them. In particular implementations, processor 3202 may include one or more internal caches for data, instructions, or addresses. As an example and not by way of limitation, processor 3202 may include one or more instruction caches, one or more data caches, and one or more translation lookaside buffers (TLBs). Instructions in the instruction caches may be copies of instructions in memory 3204 or storage device 3206.

Memory 3204 may be used for storing data, metadata, and programs for execution by the processor(s). Memory 3204 may include one or more of volatile and non-volatile memories, such as Random Access Memory ("RAM"), Read Only Memory ("ROM"), a solid state disk ("SSD"), Flash, Phase Change Memory ("PCM"), or other types of data storage. Memory 3204 may be internal or distributed memory.

Storage device 3206 includes storage for storing data or instructions. As an example and not by way of limitation, storage device 3206 can comprise a non-transitory storage medium described above. Storage device 3206 may include a hard disk drive (HDD), a floppy disk drive, flash memory, an optical disc, a magneto-optical disc, magnetic tape, or a Universal Serial Bus (USB) drive or a combination of two or more of these. Storage device 3206 may include removable or non-removable (or fixed) media, where appropriate. Storage device 3206 may be internal or external to computing device 3200. In particular implementations, storage device 3206 is non-volatile, solid-state memory. In other implementations, Storage device 3206 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

I/O interface 3208 allows a user to provide input to, receive output from, and otherwise transfer data to and receive data from computing device 3200. I/O interface 3208 may include a mouse, a keypad or a keyboard, a touch screen, a camera, an optical scanner, network interface, modem, other known I/O devices or a combination of such I/O interfaces. I/O interface 3208 may include one or more devices for presenting output to a user, including, but not limited to, a graphics engine, a display (e.g., a display screen), one or more output drivers (e.g., display drivers), one or more audio speakers, and one or more audio drivers. In certain implementations, I/O interface 3208 is configured to provide graphical data to a display for presentation to a user. The graphical data may be representative of one or more graphical user interfaces and/or any other graphical content as may serve a particular implementation.

Communication interface 3210 can include hardware, software, or both. In any event, communication interface 3210 can provide one or more interfaces for communication (such as, for example, packet-based communication) between computing device 3200 and one or more other computing devices or networks. As an example and not by way of limitation, communication interface 3210 may include a network interface controller (NIC) or network adapter for communicating with an Ethernet or other wire-based network or a wireless NIC (WNIC) or wireless adapter for communicating with a wireless network, such as a WI-FI.

Additionally or alternatively, communication interface 3210 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, communication interface 3210 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, communication interface 3210 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

Communication infrastructure 3212 may include hardware, software, or both that couples components of computing device 3200 to each other. As an example and not by way of limitation, communication infrastructure 3212 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 33:
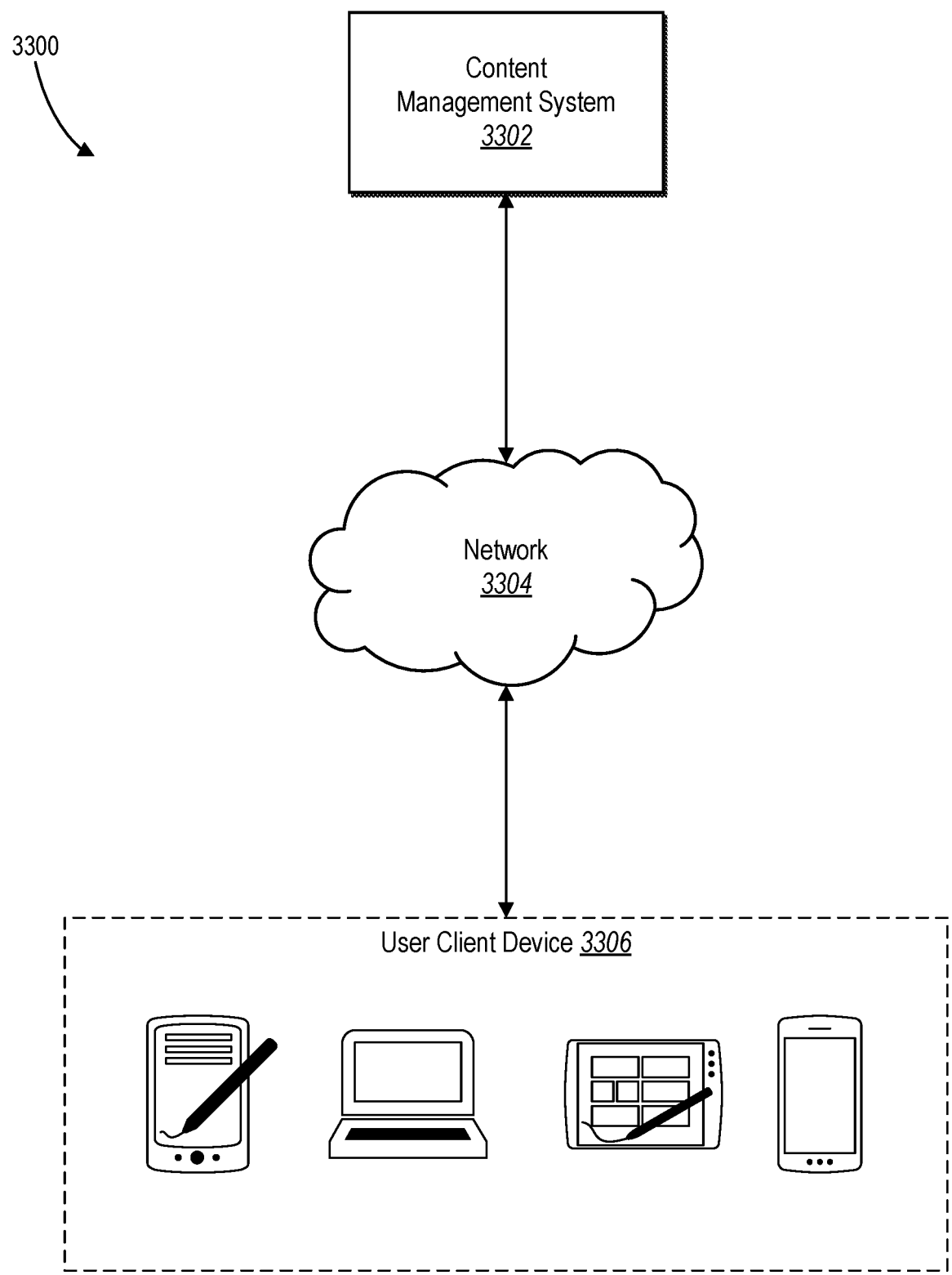
FIG. 33 illustrates an example environment of a networking system having the content scene system in accordance with one or more embodiments.

FIG. 33 is a schematic diagram illustrating environment 3300 within which one or more implementations of the content scene system 102 can be implemented. For example, the content scene system 102 may be part of a content management system 3302 (e.g., the content management system 106). Content management system 3302 may generate, store, manage, receive, and send digital content (such as digital content items). For example, content management system 3302 may send and receive digital content to and from client devices 3306 by way of network 3304. In particular, content management system 3302 can store and manage a collection of digital content. Content management system 3302 can manage the sharing of digital content between computing devices associated with a plurality of users. For instance, content management system 3302 can facilitate a user sharing a digital content with another user of content management system 3302.

In particular, content management system 3302 can manage synchronizing digital content across multiple client devices 3306 associated with one or more users. For example, a user may edit digital content using client device 3306. The content management system 3302 can cause client device 3306 to send the edited digital content to content management system 3302. Content management system 3302 then synchronizes the edited digital content on one or more additional computing devices.

In addition to synchronizing digital content across multiple devices, one or more implementations of content management system 3302 can provide an efficient storage option for users that have large collections of digital content. For example, content management system 3302 can store a collection of digital content on content management system 3302, while the client device 3306 only stores reduced-sized versions of the digital content. A user can navigate and browse the reduced-sized versions (e.g., a thumbnail of a digital image) of the digital content on client device 3306. In particular, one way in which a user can experience digital content is to browse the reduced-sized versions of the digital content on client device 3306.

Another way in which a user can experience digital content is to select a reduced-size version of digital content to request the full- or high-resolution version of digital content from content management system 3302. In particular, upon a user selecting a reduced-sized version of digital content, client device 3306 sends a request to content management system 3302 requesting the digital content associated with the reduced-sized version of the digital content. Content management system 3302 can respond to the request by sending the digital content to client device 3306. Client device 3306, upon receiving the digital content, can then present the digital content to the user. In this way, a user can have access to large collections of digital content while minimizing the amount of resources used on client device 3306.

Client device 3306 may be a desktop computer, a laptop computer, a tablet computer, a personal digital assistant (PDA), an in- or out-of-car navigation system, a handheld device, a smart phone or other cellular or mobile phone, or a mobile gaming device, other mobile device, or other suitable computing devices. Client device 3306 may execute one or more client applications, such as a web browser (e.g., Microsoft Windows Internet Explorer, Mozilla Firefox, Apple Safari, Google Chrome, Opera, etc.) or a native or special-purpose client application (e.g., Dropbox Paper for iPhone or iPad, Dropbox Paper for Android, etc.), to access and view content over network 3304.

Network 3304 may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which client devices 3306 may access content management system 3302.

In the foregoing specification, the present disclosure has been described with reference to specific exemplary implementations thereof. Various implementations and aspects of the present disclosure(s) are described with reference to details discussed herein, and the accompanying drawings illustrate the various implementations. The description above and drawings are illustrative of the disclosure and are not to be construed as limiting the disclosure. Numerous specific details are described to provide a thorough understanding of various implementations of the present disclosure.

The present disclosure may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the present application is, therefore, indicated by the appended claims rather than by the foregoing description. All changes that come within the meaning and range of equivalency of the claims are to be embraced within their scope.

The foregoing specification is described with reference to specific exemplary implementations thereof. Various implementations and aspects of the disclosure are described with reference to details discussed herein, and the accompanying drawings illustrate the various implementations. The description above and drawings are illustrative and are not to be construed as limiting. Numerous specific details are described to provide a thorough understanding of various implementations.

The additional or alternative implementations may be embodied in other specific forms without departing from its spirit or essential characteristics. The described implementations are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A method comprising:
   generating a content cluster comprising a set of content items by analyzing focus data for content items associated with a user account, the focus data indicating activity patterns with respect to the content items associated with the user account;
   associating a desktop cluster scene with the content cluster, the desktop cluster scene representing:
     an arrangement of application windows for presenting the set of content items within the content cluster; and
     an arrangement of the set of content items as presented within the application windows;
   providing, for display on a client device associated with the user account, a desktop scene element corresponding to the desktop cluster scene; and
   based on receiving an indication of a selection of the desktop scene element, providing, for display on the client device, the set of content items within the desktop cluster scene.

2. The method of claim 1, wherein associating the desktop cluster scene with the content cluster comprises:
   determining a set of application windows that present the set of content items within the content cluster; and
   storing an arrangement for the set of application windows, the arrangement indicating one or more of placements, sizes, or depths for application windows within the set of application windows.

3. The method of claim 1, wherein associating the desktop cluster scene with the content cluster comprises determining, for a content item within the set of content items, one or more of a location or a dimension of all or part of the content item within the arrangement of the set of content items.

4. The method of claim 1, further comprising:
   generating, for storage in a database, a first desktop cluster scene based on the focus data for the user account indicating a first activity pattern among the content items associated with the user account, wherein the first desktop cluster scene represents an arrangement of a first set of application windows corresponding to the first activity pattern; and
   generating, for storage in the database, a second desktop cluster scene based on the focus data for the user account indicating a second activity pattern among the content items associated with the user account, wherein the second desktop cluster scene represents an arrangement of a second set of application windows corresponding to the second activity pattern.

5. The method of claim 1, wherein providing the set of content items for display based on the selection of the desktop scene element comprises causing the client device to place the application windows according to the arrangement and to present the set of content items within the application windows in response to the selection of the desktop scene element.

6. The method of claim 1, further comprising providing, for display on the client device, an interface element for navigating among stored desktop cluster scenes for the user account, wherein the interface element includes individual desktop scene elements that are selectable to restore corresponding desktop cluster scenes from among the stored desktop cluster scenes.

7. The method of claim 1, wherein providing the desktop scene element comprises:
   detecting, from the focus data, a change in an activity pattern of the user account from a first focus session to a second focus session; and
   providing the desktop scene element for display on the client device in response to detecting the change in the activity pattern, wherein the desktop scene element corresponds to the second focus session.

8. A system comprising:
   at least one processor; and
   a non-transitory computer readable medium comprising instructions that, when executed by the at least one processor, cause the system to:
     generate a content cluster comprising a set of content items by analyzing focus data for content items associated with a user account, the focus data indicating activity patterns with respect to the content items associated with the user account;

associate a desktop cluster scene with the content cluster, the desktop cluster scene representing:
an arrangement of application windows for presenting the set of content items within the content cluster; and
an arrangement of the set of content items as presented within the application windows;
receive, from a client device associated with the user account, an indication of a selection of the desktop cluster scene; and
based on receiving the indication of the selection of the desktop cluster scene, provide, for display on the client device, the set of content items within the desktop cluster scene.

9. The system of claim 8, further comprising instructions that, when executed by the at least one processor, cause the system to associate the desktop cluster scene with the content cluster by:
determining a set of application windows that present the set of content items within the content cluster; and
storing an arrangement for the set of application windows, the arrangement indicating one or more of placements, sizes, or depths for application windows within the set of application windows.

10. The system of claim 8, further comprising instructions that, when executed by the at least one processor, cause the system to generate the content cluster by determining that the set of content items share a common activity pattern indicated by the focus data of the user account.

11. The system of claim 8, further comprising instructions that, when executed by the at least one processor, cause the system to:
generate, for storage in a database, a first desktop cluster scene based on the focus data for the user account indicating a first activity pattern among the content items associated with the user account, wherein the first desktop cluster scene represents an arrangement of a first set of application windows corresponding to the first activity pattern; and
generate, for storage in the database, a second desktop cluster scene based on the focus data for the user account indicating a second activity pattern among the content items associated with the user account, wherein the second desktop cluster scene represents an arrangement of a second set of application windows corresponding to the second activity pattern.

12. The system of claim 8, further comprising instructions that, when executed by the at least one processor, cause the system to provide the set of content items for display based on the selection of the desktop cluster scene by causing the client device to place the application windows according to the arrangement and to present the set of content items within the application windows in response to the selection of the desktop cluster scene.

13. The system of claim 8, further comprising instructions that, when executed by the at least one processor, cause the system to provide, for display on the client device, an interface element for navigating among stored desktop cluster scenes for the user account, wherein the interface element includes individual desktop scene elements that are selectable to restore corresponding desktop cluster scenes from among the stored desktop cluster scenes.

14. The system of claim 8, further comprising instructions that, when executed by the at least one processor, cause the system to provide, for display on the client device, a desktop scene element corresponding to the desktop cluster scene by:
detecting, from the focus data, a change in an activity pattern of the user account from a first focus session to a second focus session; and
providing the desktop scene element for display on the client device in response to detecting the change in the activity pattern, wherein the desktop scene element corresponds to the second focus session.

15. A non-transitory computer readable medium comprising instructions that, when executed by at least one processor, cause the at least one processor to:
generate a content cluster comprising a set of content items by analyzing focus data for content items associated with a user account, the focus data indicating activity patterns with respect to the content items associated with the user account;
associate a desktop cluster scene with the content cluster, the desktop cluster scene representing:
an arrangement of application windows for presenting the set of content items within the content cluster; and
an arrangement of the set of content items as presented within the application windows;
receive, from a client device associated with the user account, an indication of a selection of the desktop cluster scene; and
based on receiving the indication of the selection of the desktop cluster scene, provide, for display on the client device, the set of content items within the desktop cluster scene.

16. The non-transitory computer readable medium of claim 15, further comprising instructions that, when executed by the at least one processor, cause the at least one processor to associate the desktop cluster scene with the content cluster by:
determining a set of application windows that present the set of content items within the content cluster; and
storing an arrangement for the set of application windows, the arrangement indicating one or more of placements, sizes, or depths for application windows within the set of application windows.

17. The non-transitory computer readable medium of claim 15, further comprising instructions that, when executed by the at least one processor, cause the at least one processor to generate the content cluster by determining that the set of content items share a common activity pattern indicated by the focus data of the user account.

18. The non-transitory computer readable medium of claim 15, further comprising instructions that, when executed by the at least one processor, cause the at least one processor to:
generate, for storage in a database, a first desktop cluster scene based on the focus data for the user account indicating a first activity pattern among the content items associated with the user account, wherein the first desktop cluster scene represents an arrangement of a first set of application windows corresponding to the first activity pattern; and
generate, for storage in the database, a second desktop cluster scene based on the focus data for the user account indicating a second activity pattern among the content items associated with the user account, wherein the second desktop cluster scene represents an arrangement of a second set of application windows corresponding to the second activity pattern.

19. The non-transitory computer readable medium of claim 15, further comprising instructions that, when executed by the at least one processor, cause the at least one processor to provide the set of content items for display based on the selection of the desktop cluster scene by causing the client device to place the application windows according to the arrangement and to present the set of content items within the application windows in response to the selection of the desktop cluster scene.

20. The non-transitory computer readable medium of claim 15, further comprising instructions that, when executed by the at least one processor, cause the at least one processor to provide, for display on the client device, an interface element for navigating among stored desktop cluster scenes for the user account, wherein the interface element includes individual desktop scene elements that are selectable to restore corresponding desktop cluster scenes from among the stored desktop cluster scenes.

\* \* \* \* \*